US010823813B2

(12) United States Patent
Parent et al.

(10) Patent No.: US 10,823,813 B2
(45) Date of Patent: Nov. 3, 2020

(54) ELECTROMAGNETIC VECTOR SENSOR (EMVS)

(71) Applicant: The Government of the United States of America, as represented by the Secretary of the Navy, Arlington, VA (US)

(72) Inventors: Mark G. Parent, Port Tobacco, MD (US); William Lee, Beltsville, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 268 days.

(21) Appl. No.: 15/607,527

(22) Filed: May 28, 2017

(65) Prior Publication Data

US 2017/0363705 A1    Dec. 21, 2017

Related U.S. Application Data

(63) Continuation-in-part of application No. 14/020,871, filed on Sep. 8, 2013, now Pat. No. 9,664,771.
(Continued)

(51) Int. Cl.
*G01S 3/40* (2006.01)
*G01S 19/40* (2010.01)
(Continued)

(52) U.S. Cl.
CPC ............ *G01S 3/40* (2013.01); *G01S 3/143* (2013.01); *G01S 19/40* (2013.01); *G01S 19/47* (2013.01);
(Continued)

(58) Field of Classification Search
CPC . G01S 3/40; G01S 3/143; G01S 19/47; G01S 19/40; H01Q 21/26; H01Q 21/24;
(Continued)

(56) References Cited

U.S. PATENT DOCUMENTS 3,284,801 A *  11/1966  Bryant .................... H01Q 7/00
                                                       343/742
3,517,560 A *   6/1970  Jacobs .................. G01P 15/08
                                                       73/514.27
(Continued)

*Primary Examiner* — Frank J McGue
(74) *Attorney, Agent, or Firm* — US Naval Research Laboratory; William Ladd

(57) ABSTRACT

An electromagnetic vector sensor (EMVS) system, having a plurality of EMVS devices consisting of a plurality of loop antenna elements spatially orthogonally integrated with and electrically isolated from a plurality of dipole antenna elements, mounted on a rotatably adjustable platform having a true north orientation, including active circuitry residing in antenna housings, and external executing software programs causing the active circuitry in cooperation with the EMVS device and receivers to determine angle of arrival and resolution of incoming wave vectors and polarization of incoming signals and to perform accurate high frequency geolocation signal processing; the programs which perform calibration and antenna element placement determination operations, also cause the system to collect data of known transmitted high frequency skywave signals, and estimate direction of arrival of unknown signals by detecting, resolving and measuring components of an electric field and a magnetic field at a single point.

20 Claims, 58 Drawing Sheets

Related U.S. Application Data

(60) Provisional application No. 62/484,924, filed on Apr. 13, 2017, provisional application No. 61/788,650, filed on Mar. 15, 2013.

(51) Int. Cl.

| | | |
|---|---|---|
| *G01S 19/47* | (2010.01) | |
| *H01Q 7/00* | (2006.01) | |
| *H01Q 9/22* | (2006.01) | |
| *H01Q 21/24* | (2006.01) | |
| *H01Q 1/12* | (2006.01) | |
| *H01Q 21/26* | (2006.01) | |
| *G01S 3/14* | (2006.01) | |
| *H01Q 21/06* | (2006.01) | |

(52) U.S. Cl.
CPC ............ *H01Q 1/125* (2013.01); *H01Q 7/00* (2013.01); *H01Q 9/22* (2013.01); *H01Q 21/24* (2013.01); *H01Q 21/26* (2013.01); *H01Q 21/06* (2013.01)

(58) Field of Classification Search
CPC ............ H01Q 9/22; H01Q 1/125; H01Q 7/00; H01Q 21/06
USPC .................................................. 342/357.23
See application file for complete search history.

(56) References Cited

U.S. PATENT DOCUMENTS

| | | | | |
|---|---|---|---|---|
| 5,546,309 | A  * | 8/1996 | Johnson | G01S 3/7862 244/164 |
| 2007/0055468 | A1* | 3/2007 | Pylvanainen | G01P 15/18 702/92 |
| 2007/0118286 | A1* | 5/2007 | Wang | G01C 21/165 342/357.59 |
| 2007/0152804 | A1* | 7/2007 | Breed | B60N 2/2863 340/435 |
| 2012/0038508 | A1* | 2/2012 | Mizuochi | G01S 19/26 342/357.23 |
| 2015/0009067 | A1* | 1/2015 | Rudow | G01S 19/41 342/357.51 |

* cited by examiner

BASE PLATE 702

DIPOLE ANTENNA
SUPPORT COLUMN 1302

DIPOLE BALUN CIRCUITRY 1502

EMVS POLARIZATION

2D EMVS ARRAY MANIFOLD VECTOR

ELECTROMAGNETIC VECTOR SENSOR 100 (EMVS) DESIGN

ELECTROMAGNETIC VECTOR SENSOR 100 (EMVS) DESIGN

ELECTROMAGNETIC VECTOR SENSOR 100 (EMVS) DESIGN

ELECTROMAGNETIC VECTOR SENSOR 100 (EMVS) DESIGN

ELECTROMAGNETIC VECTOR SENSOR (EMVS)

RELATED APPLICATIONS

This U.S. patent application is a continuation-in-part of U.S. patent application Ser. No. 14/020,871, filed on Sep. 8, 2013, which claims the benefit of U.S. Provisional Application No. 61/788,650, filed on Mar. 15, 2013, and the instant application further claims the benefit of U.S. Provisional Application No. 62/484,924, filed on Apr. 13, 2017, and all of the above applications are hereby incorporated by reference in their entireties.

FIELD OF THE INVENTION

The present invention relates in general to radio communications and antenna devices which can be used in direction finding applications. More particularly, this invention provides a simple means to integrate a series of dipole elements with a series of loop elements such that electromagnetic interactions between the dipole and loop elements are minimized.

BACKGROUND OF THE INVENTION

The ability to discriminate polarization states of an incoming wavefront has led to the development of various sensor designs which can be utilized to extract polarization information from an incoming signal. With advances in detection processing techniques, these sensors can also be used to provide increased accuracy in determining the direction-of-arrival of unknown signals. The development of electromagnetic vector sensors, as disclosed herein, enables new processing techniques to be utilized in real life situations.

Current direction finding devices, used in the field having mutual orthogonal axial elements, include vector sensors. There have been several multi-element sensing antennas designed and utilized in the field that provide HF radio wave direction finding capabilities. in addition, these multi-element sensing devices utilize various processing algorithms to accurately determine angle of arrival and thus require the multiple elements to be spatially orthogonal to each other, which in turn requires a high degree of isolation between the multiple loop and dipole antenna elements. However, current devices exhibit poor isolation characteristics between the multiple antenna elements (i.e., the dipole and loop elements) and inadequately resolve incoming wave vectors in elevation and azimuth directions, because of the requirement that the multiple elements be spatially and electrically orthogonal.

Therefore, the need exists for an electromagnetic vector sensor device which facilitates data collection of known transmitted high frequency skywave signals for purposes of achieving high frequency geolocation signal processing, using electromagnetic vector sensors (EMVS) direction-of-arrival estimation of unknown signals, by measuring three complete components of the electric field and three components of the magnetic field at a single point.

Furthermore, the need exists for an electromagnetic vector sensor device having a series of loops and a series of dipoles configured spatially orthogonal to each other in such a manner as to maintain a high degree of isolation between the dipole and loop elements.

Further, the need exists for the electromagnetic vector sensor device to utilize various processing algorithms to accurately determine angle of arrival and to be able to clearly resolve, to a high degree of accuracy, incoming wave vectors and polarization of incoming signals, by minimizing interactions between dipole and loop elements.

SUMMARY OF THE INVENTION

An electromagnetic vector sensor (EMVS) system, as disclosed herein, comprises a plurality of EMVS devices each consisting of a plurality of loop antenna elements spatially and orthogonally integrated with a plurality of dipole antenna elements, while maintaining electrical isolation from the plurality of dipole antenna elements. This EMVS configuration of spatially orthogonally integrated antenna elements is mounted on a rotatably adjustable platform having a true north orientation; further having active circuitry residing in antenna holding housings to couple the RF signals from the loops/dipoles to various receivers. Also having program code and executable instructions in a plurality of computer processors communicatively coupled with and causing the active circuitry in cooperation with the EMVS device to determine angle of arrival and resolution of incoming wave vectors and polarization of incoming signals and to perform accurate high frequency geolocation through signal processing. Furthermore, the program code and executable instructions which perform calibration and antenna element placement determination also cause the system to collect data of known transmitted high frequency skywave signals, and estimate direction of arrival of unknown signals by detecting, resolving and measuring components of an electric field and a magnetic field at a single point.

Figure 8:
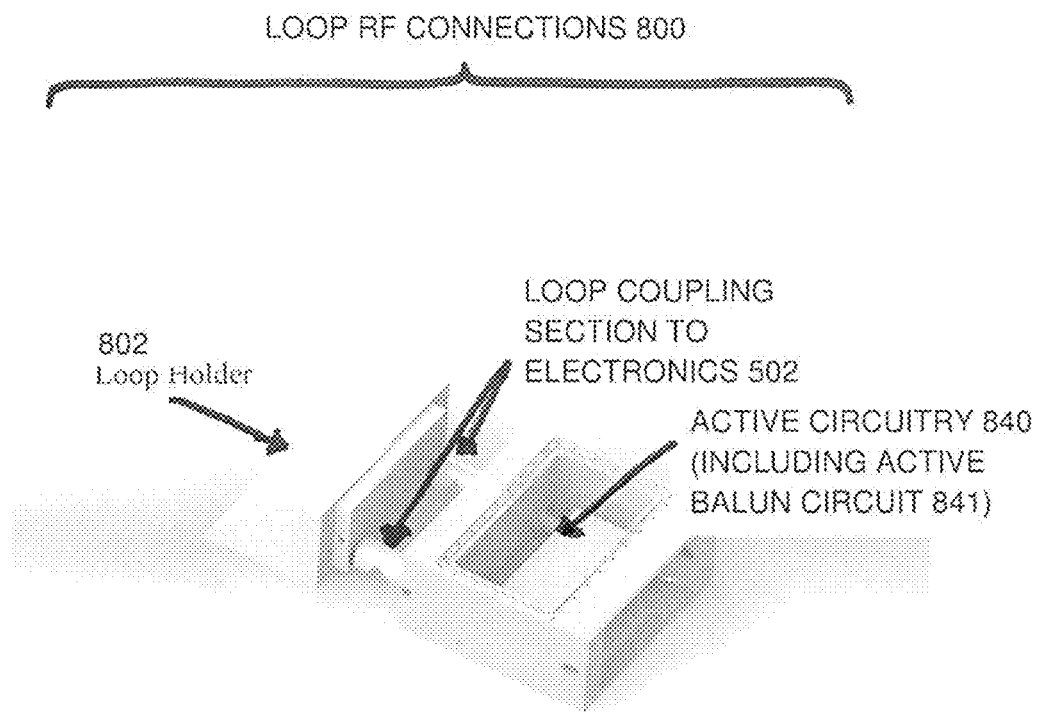

FIG. 8 illustrates loop RF connections 800 for the loop element(s) 204, as contained in a portion of the base plate 702, where portions of the base plate 702 platform include a loop holder 802, the loop coupling section to electronics 502 and active circuitry 840.

Figure 9:
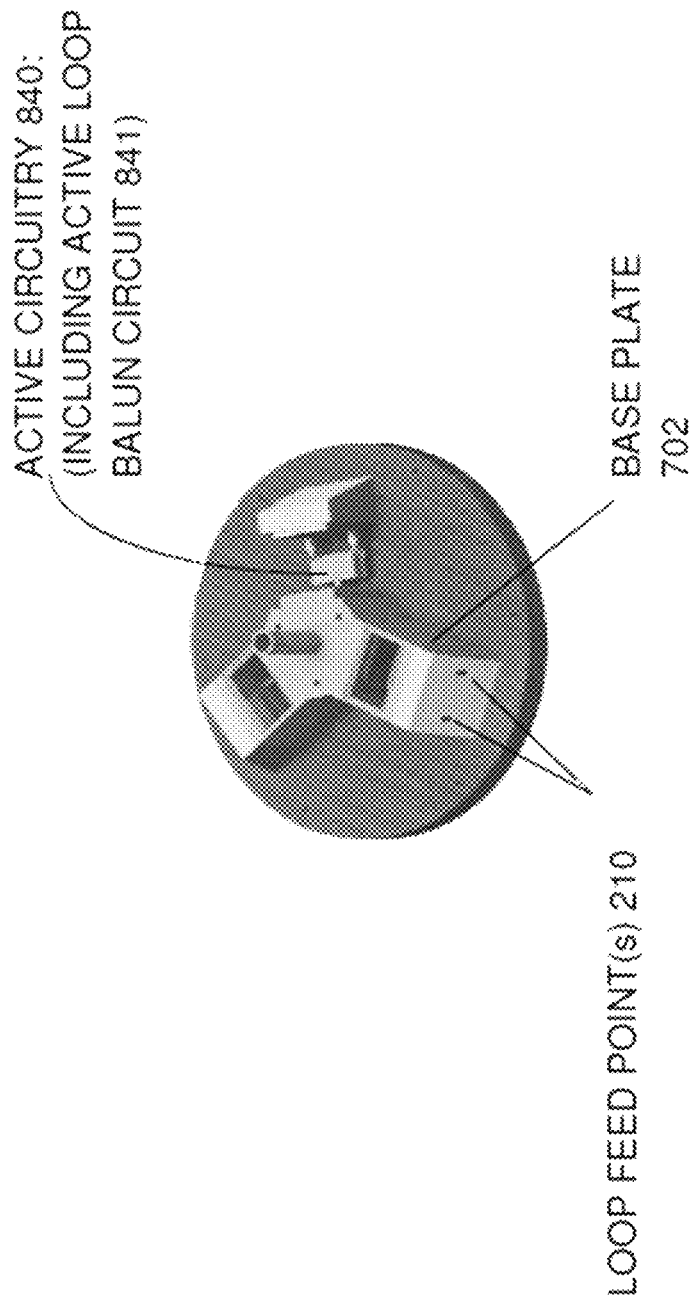
Figure 31A:
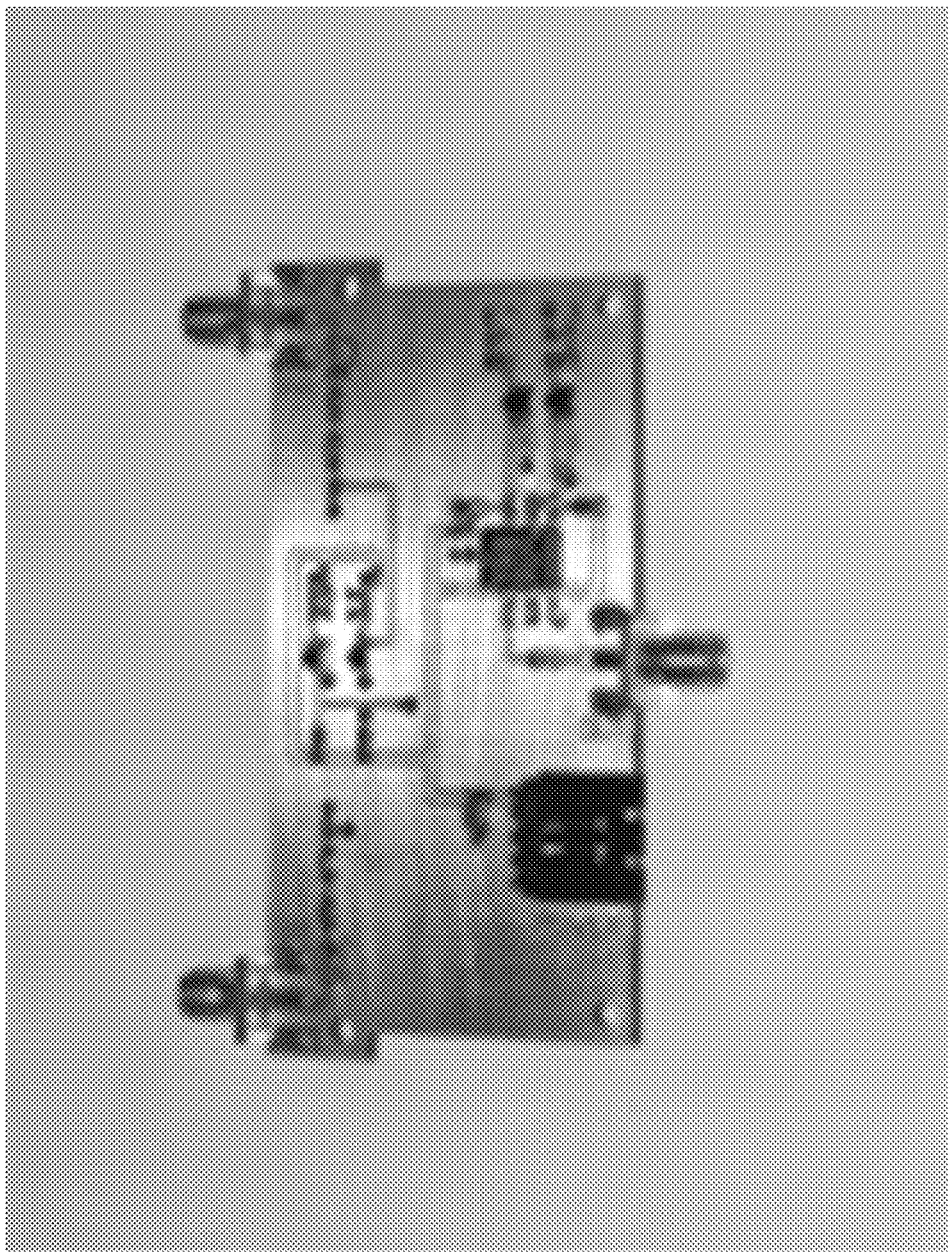
Figure 31B:
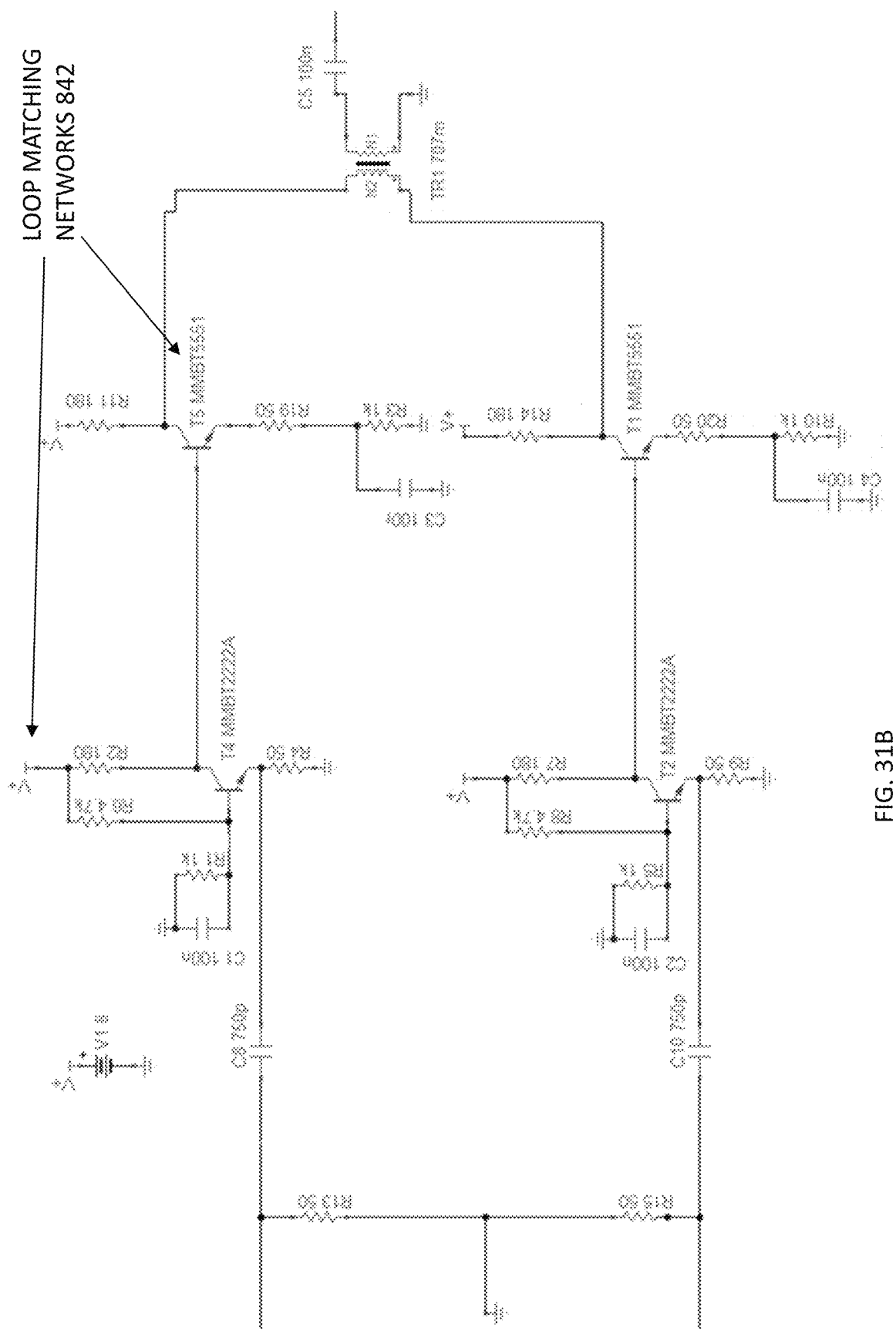

FIG. 9 illustrates loop antenna active circuitry and feed point(s) 210, as configured in portions of the base plate platform, where active circuitry 840 can include active loop balun circuit(s) 841 and active loop matching networks 842 (low impedance—see FIG. 31A and FIG. 31B).

Figure 10:
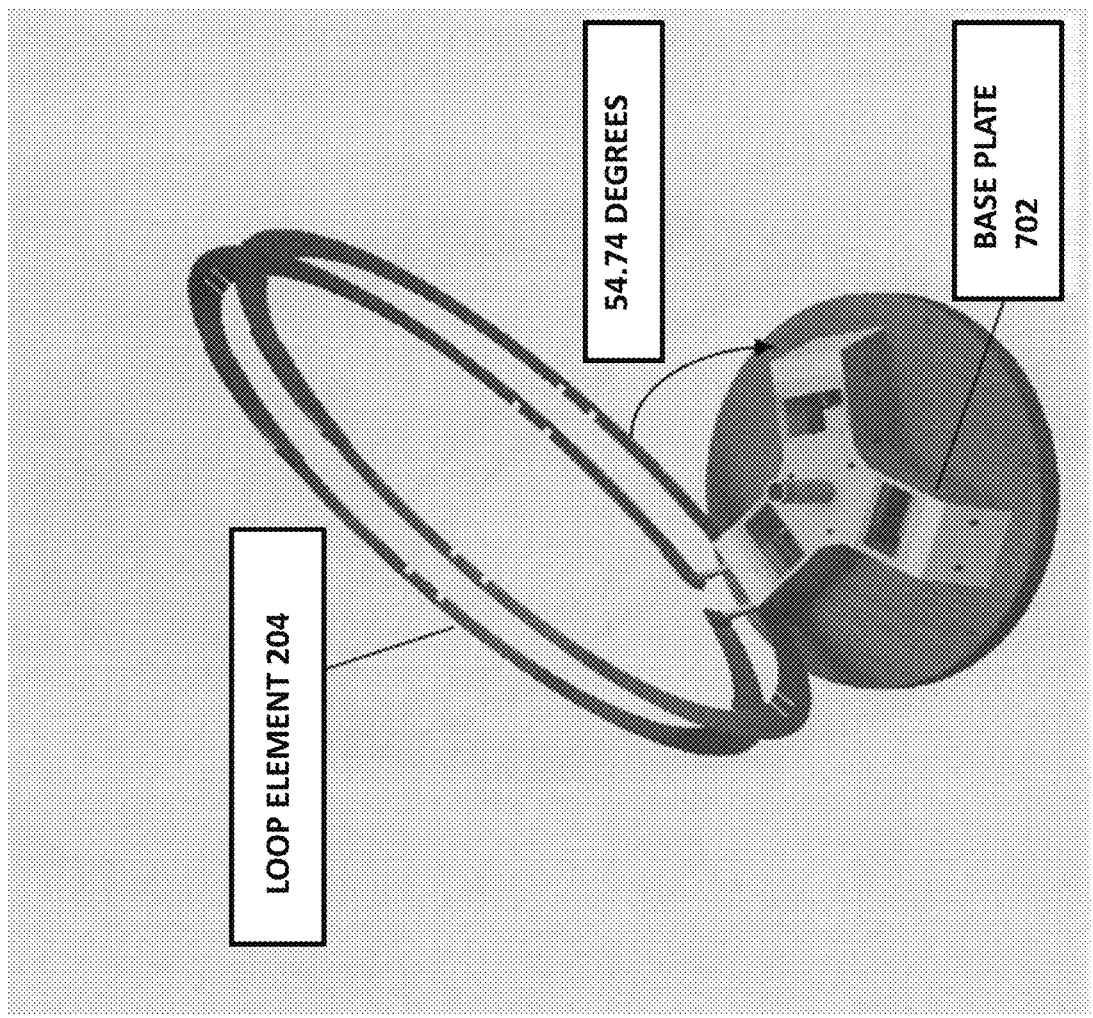

FIG. 10 illustrates configuration and orientation of a first loop antenna element, such as loop element 204, as mounted in the base plate 702. The angle of the loop pairs (i.e., loop element 204) relative to the base plate 702 mounting platform is 54.74 degrees (i.e., the tilt angle of each loop pair is 54.74 degrees from the base plate of the loop holder assembly).

Figure 11:
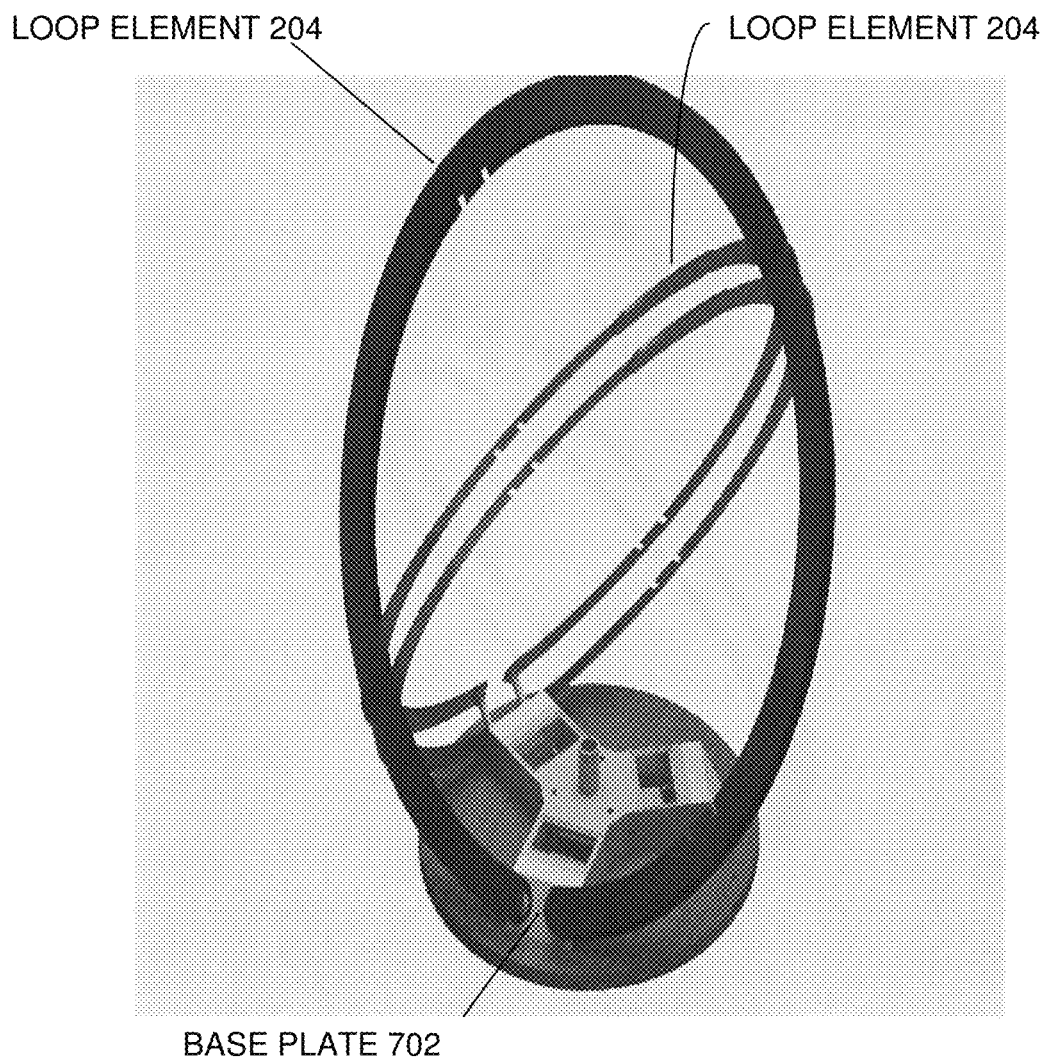

FIG. 11 illustrates configuration and orientation of the first loop antenna and a second loop antenna Loop Element(s) 204 of a plurality of antennae, as mounted in the base plate 702.

Figure 12:
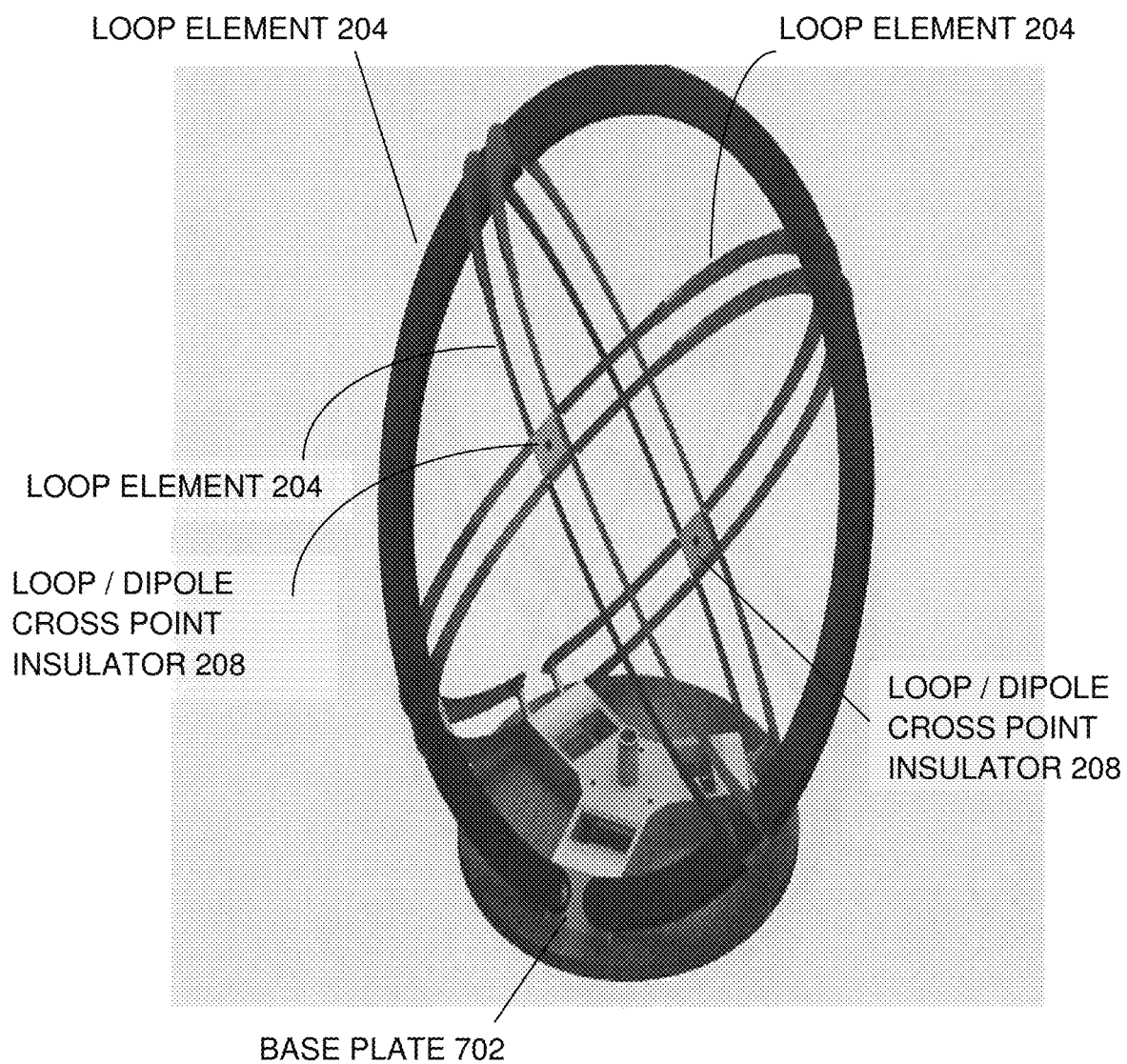

FIG. 12 illustrates configuration and orientation of the first loop antenna, the second loop antenna and a third loop antenna, as mounted in the base plate 702. Also, Loop/Dipole Cross Point Insulator(s) 208 are mounted, on the loop antenna elements.

Figure 13:
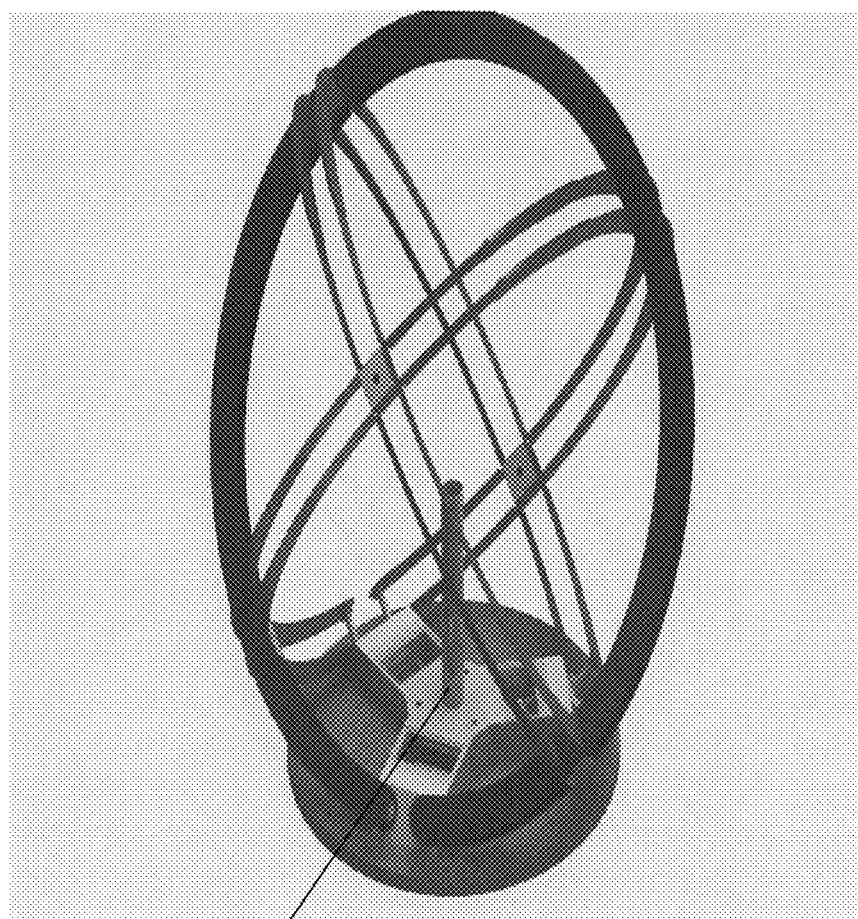

FIG. 13 illustrates a dipole antenna support column 1302 vertically positioned in the bottom center of the base plate of the electromagnetic vector sensor 100 apparatus and provides support for the dipole antenna section.

Figure 14:
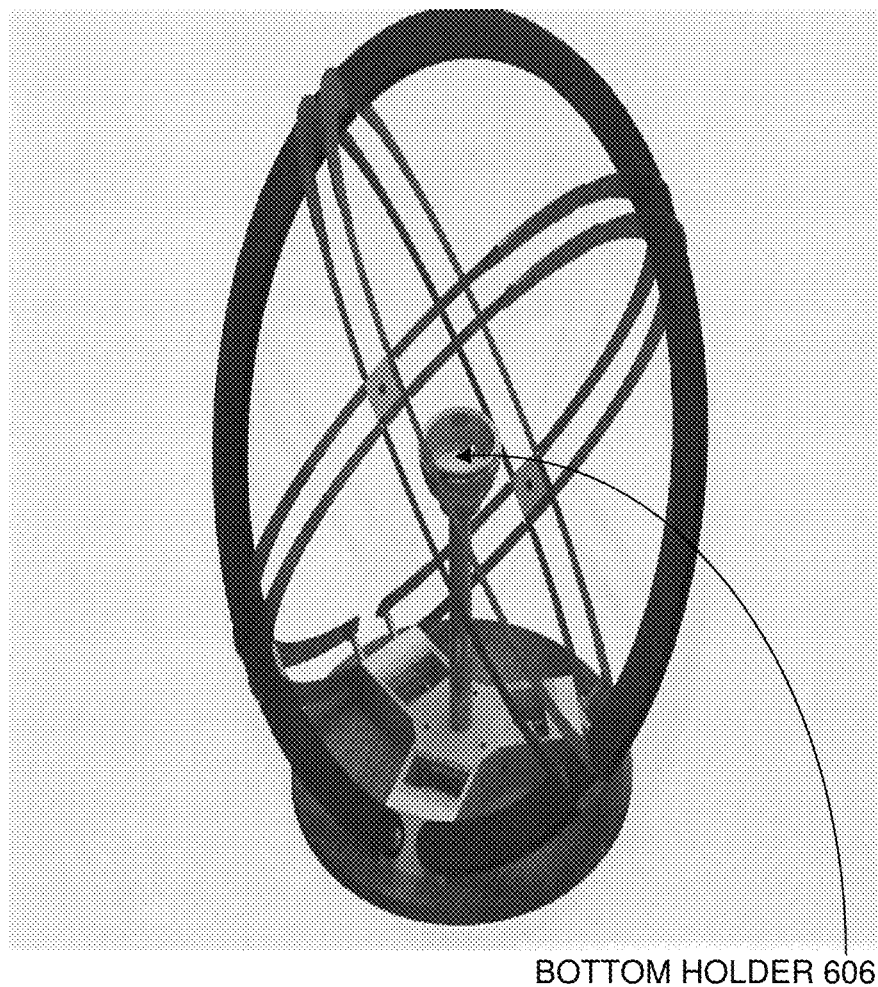

FIG. 14 illustrates a bottom holder 606 (also called a bottom or lower dipole cap) section for mounting dipole antenna element(s) 204.

Figure 15:
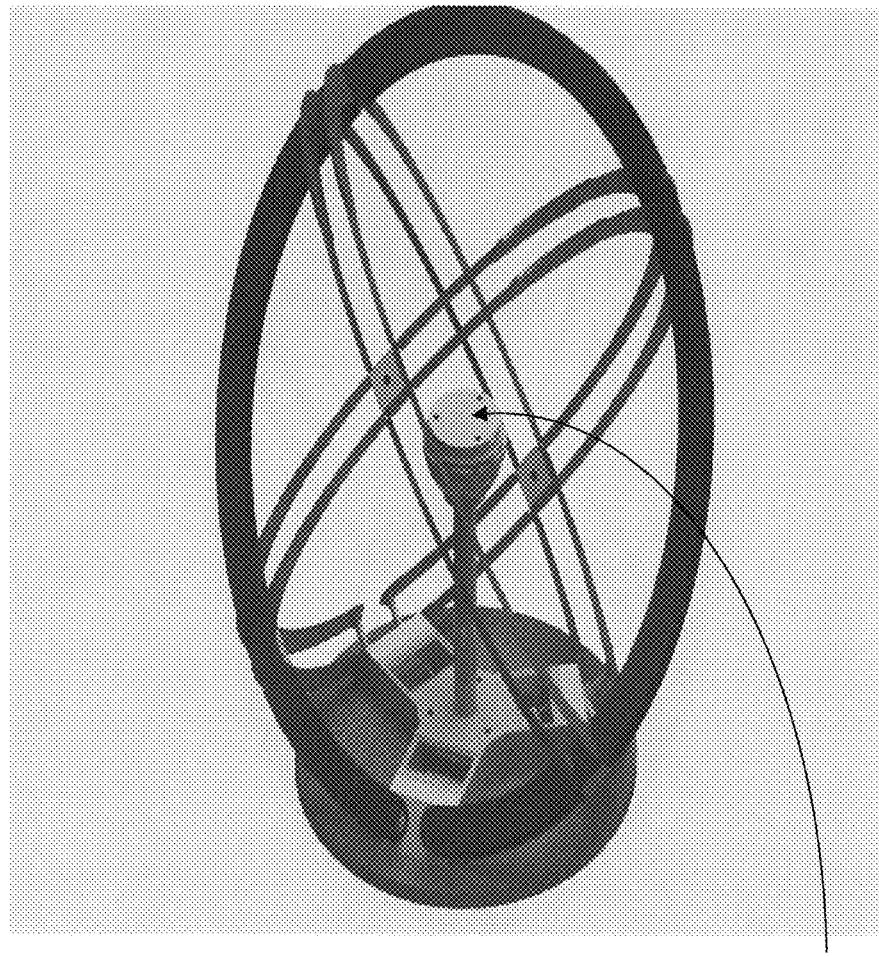

FIG. 15 illustrates balun circuitry 1502 for dipole antenna elements.

Figure 16:
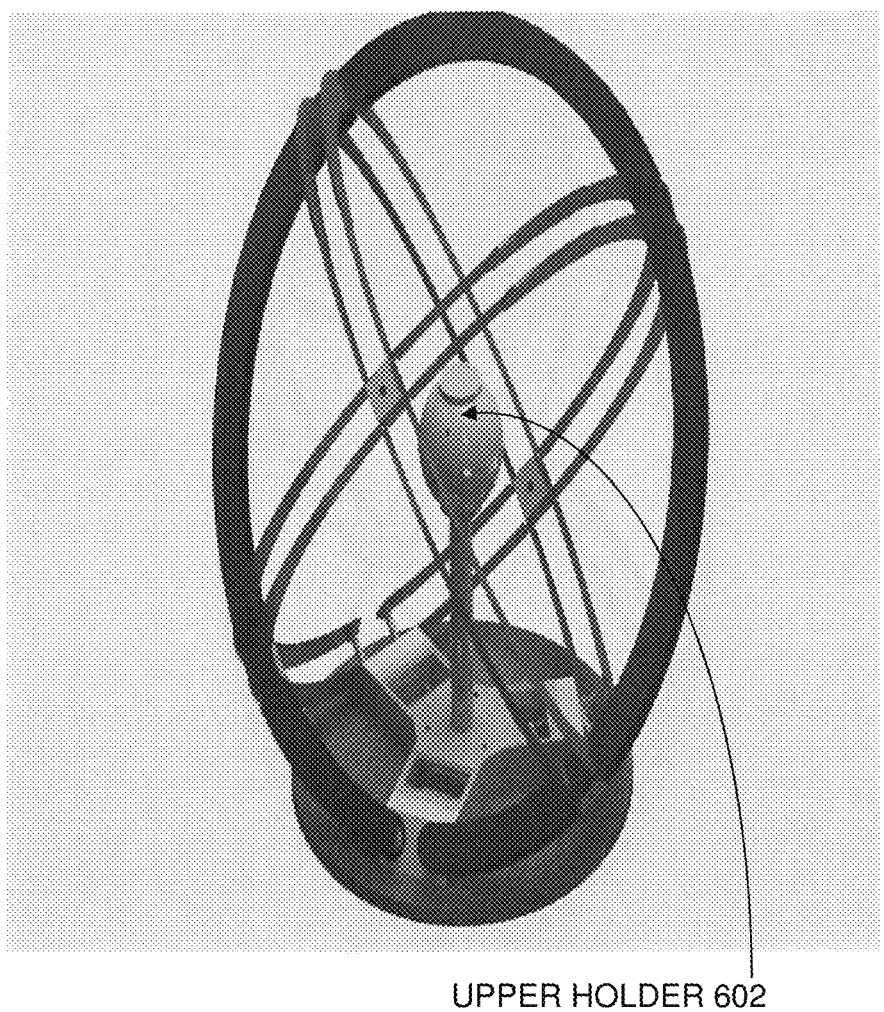

FIG. 16 illustrates an upper holder 602 section (also called an upper dipole cap) attached to the bottom holder 606 section, where both the upper holder 602 section and the bottom holder 606 section can be configured to hold a plurality of dipole antenna elements mounted in the electromagnetic vector sensor apparatus.

Figure 17:
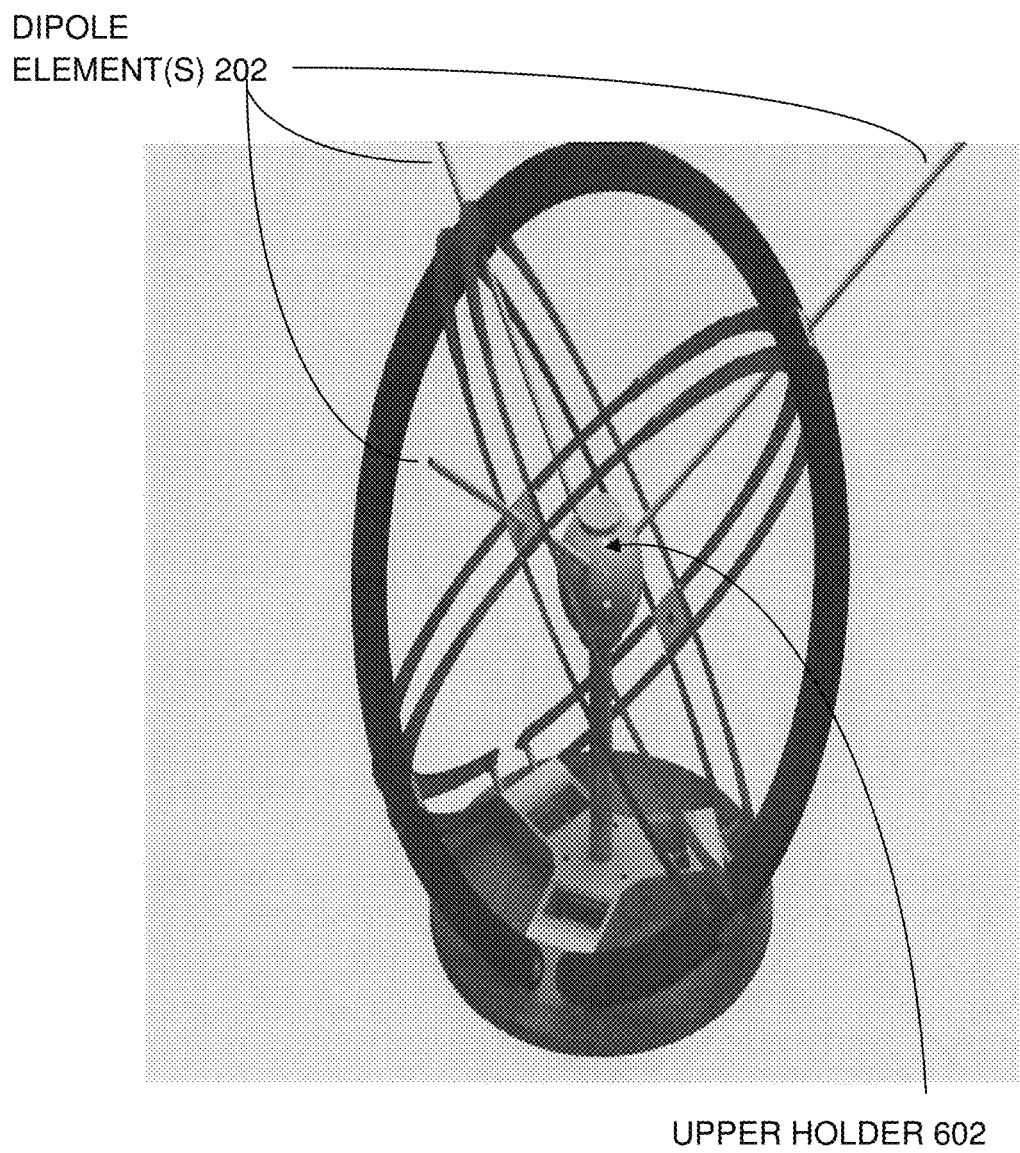

FIG. 17 illustrates at least three dipole antenna elements, such as dipole element(s) 202 of a plurality of dipole element(s) 202 mounted in the upper holder 602 section.

Figure 18:
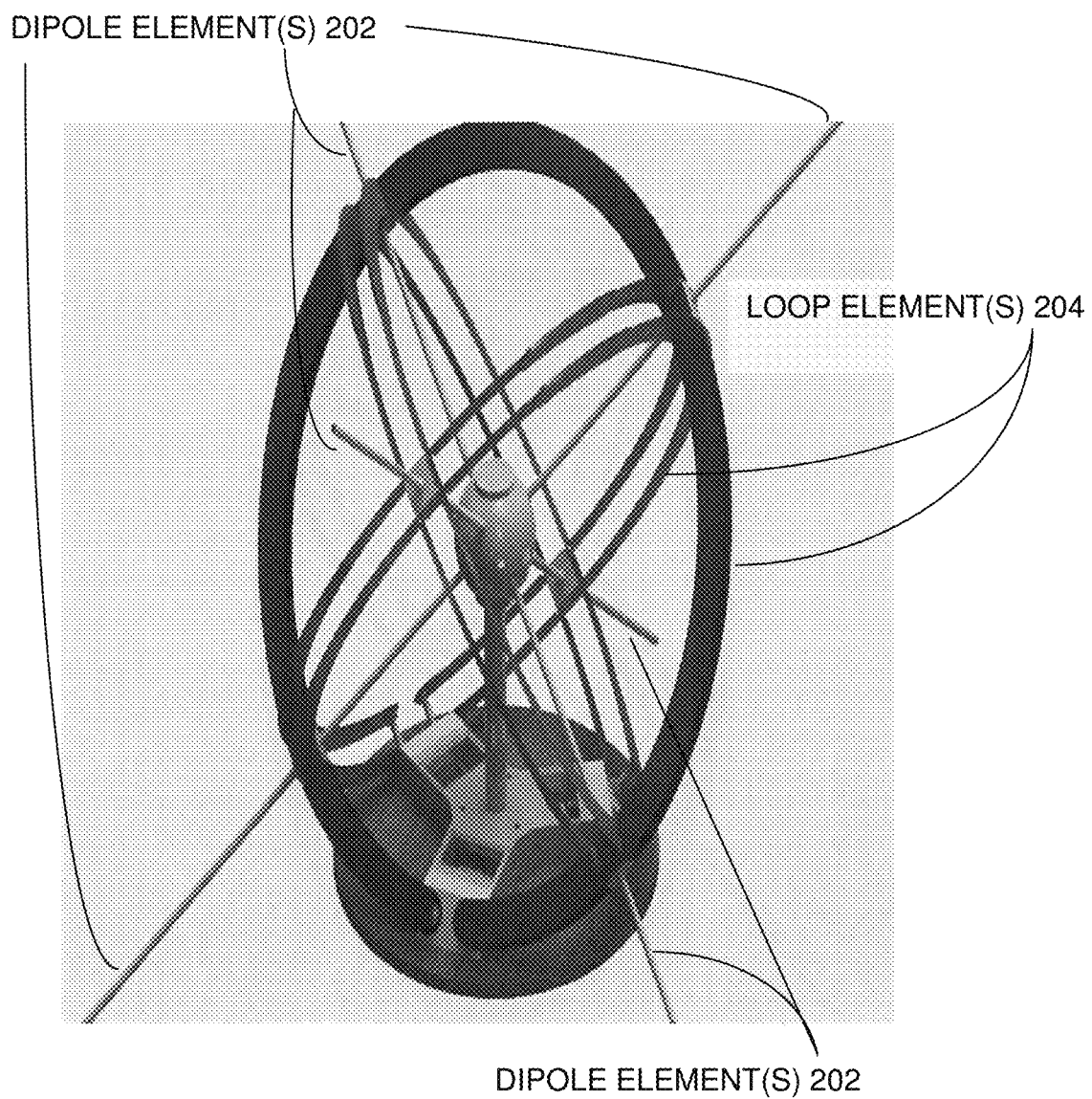

FIG. 18 illustrates a completed electromagnetic vector apparatus assembled with a plurality of loop and dipole antenna elements.

Figure 19:
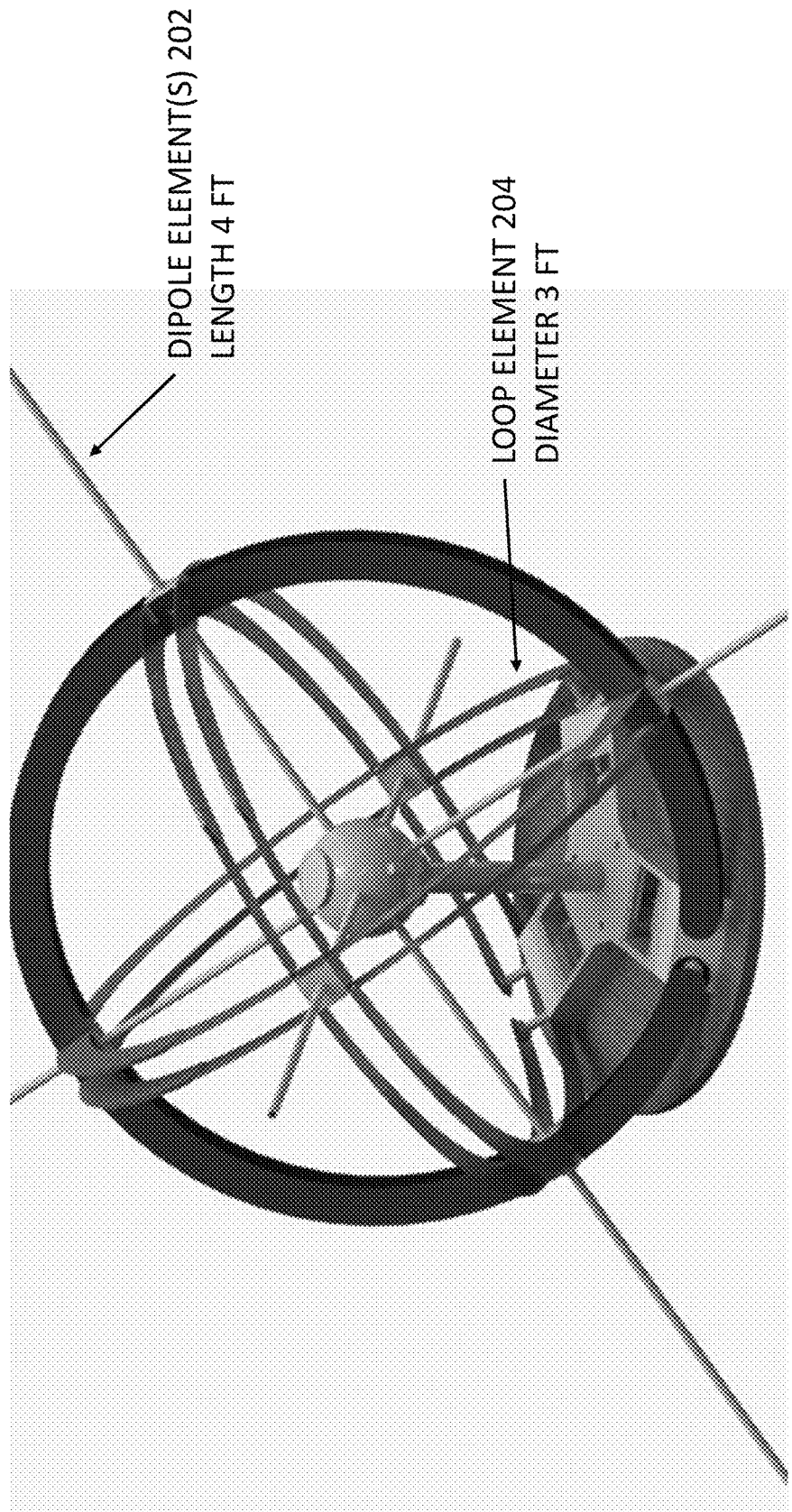

FIG. 19 illustrates the completed electromagnetic vector sensor 100 apparatus assembled and fielded, showing the length of a dipole element 202 being four feet (4') long and the diameter of a loop element 204 being three feet (3').

Figure 20:
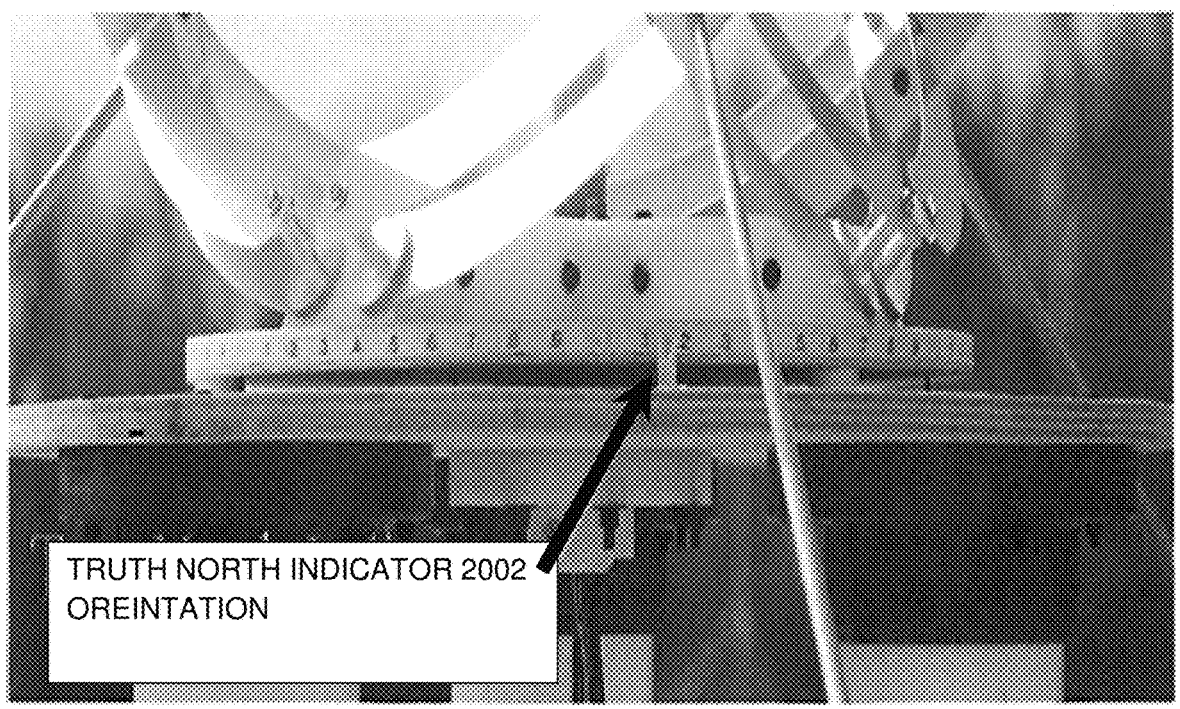

FIG. 20 illustrates the completed electromagnetic vector sensor 100 apparatus assembled, fielded, mounted on a three legged platform, and directionally situated having a true north indicator 2002 orientation.

Figure 21:
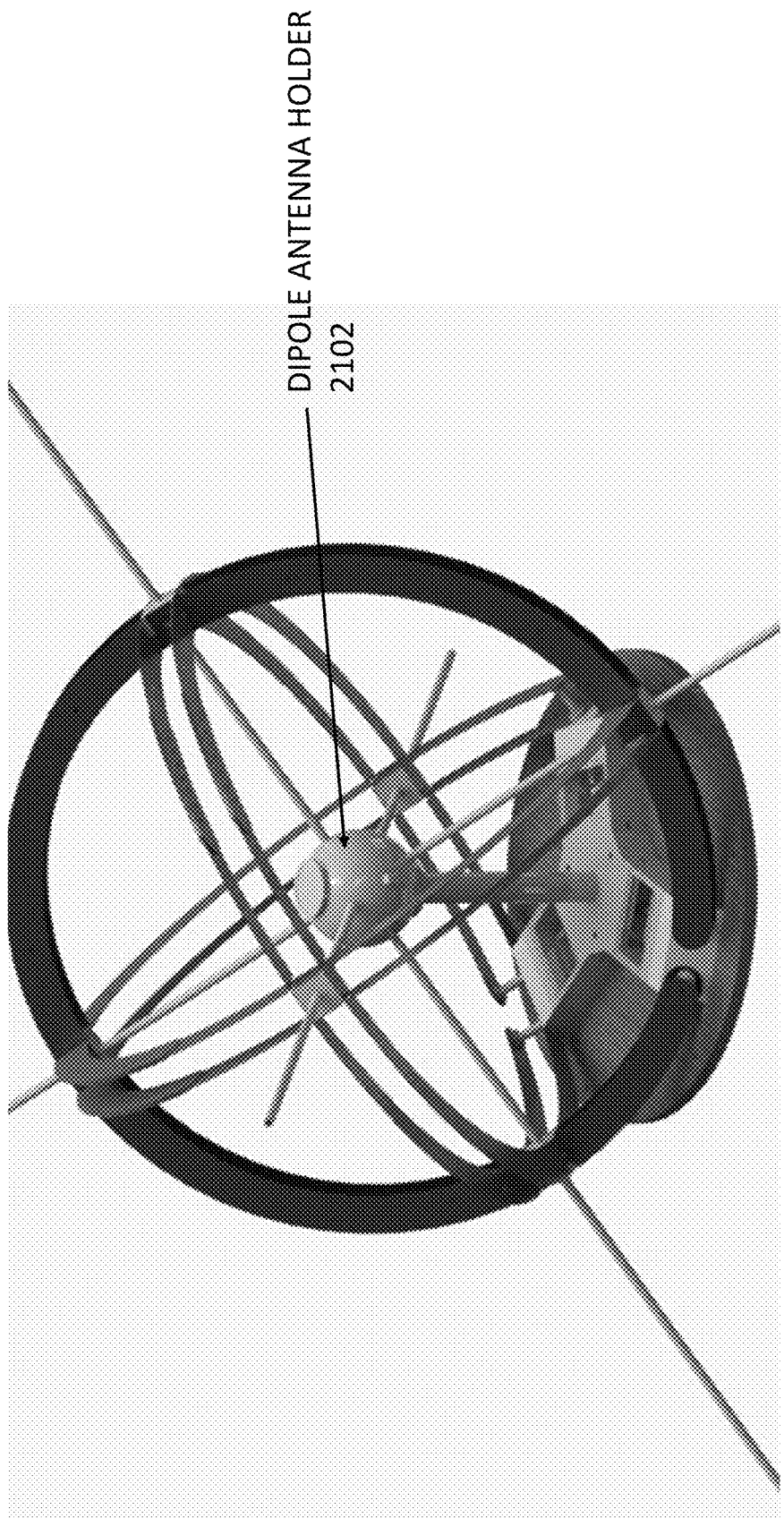

FIG. 21 illustrates a close-in view of the completed dipole antenna holder 2102 where the upper holder 602 has been connected to and on top of the bottom holder 606 by use of a collar assembly, and where the completed dipole antenna holder 2102 contains the plurality of dipole antenna elements, such as dipole element(s) 202, as preferably mounted in the electromagnetic vector sensor 100 apparatus; and contains dipole active circuitry 604.

Figure 22:
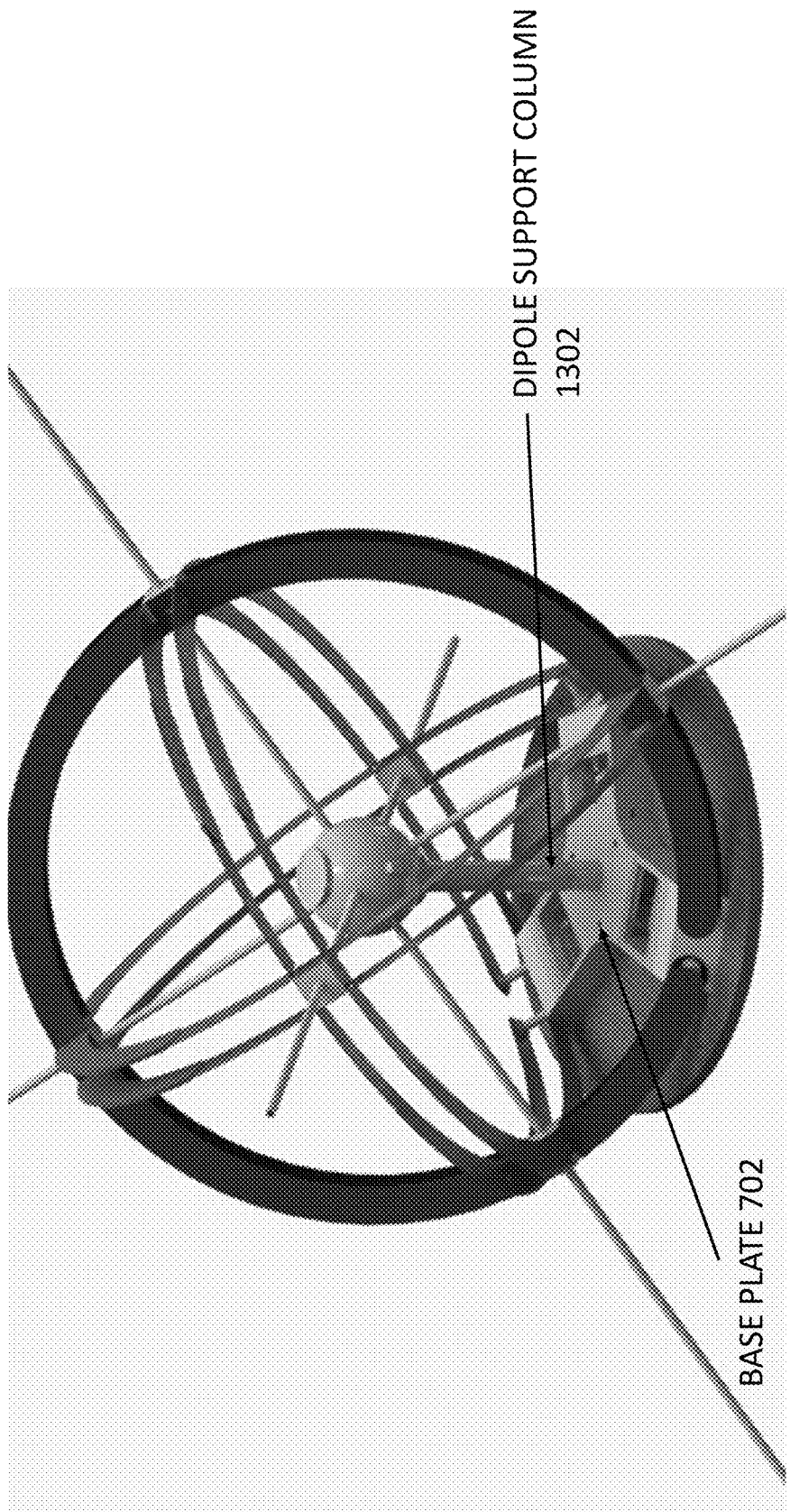

FIG. 22 illustrates a close-in view of the dipole antenna support column 1302 vertically positioned in the bottom center of the base plate 702 of the electromagnetic vector sensor 100 apparatus, where these portions of the base plate 702 contain active loop circuitry 840.

Figure 23A:
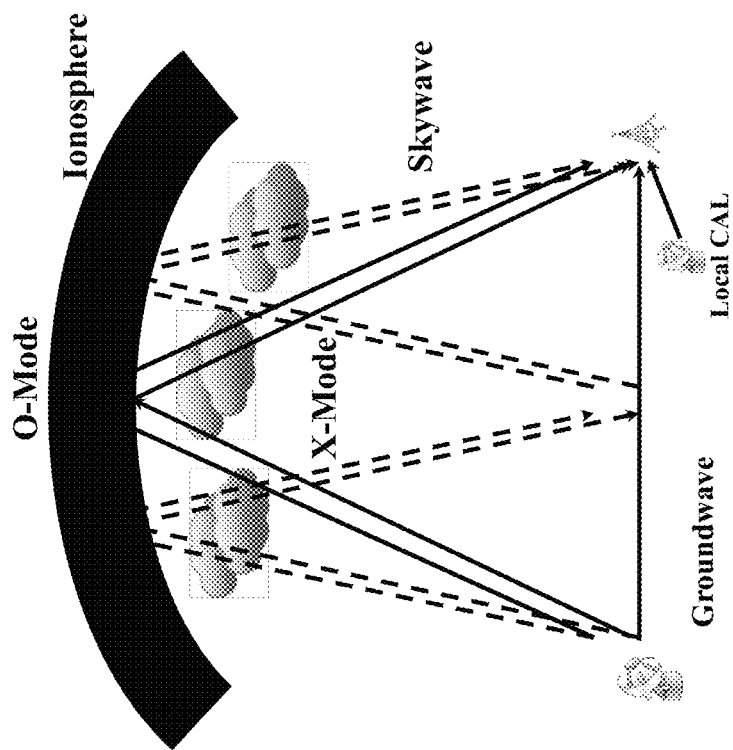

FIG. 23A illustrates one way EM propagation.

Figure 23B:
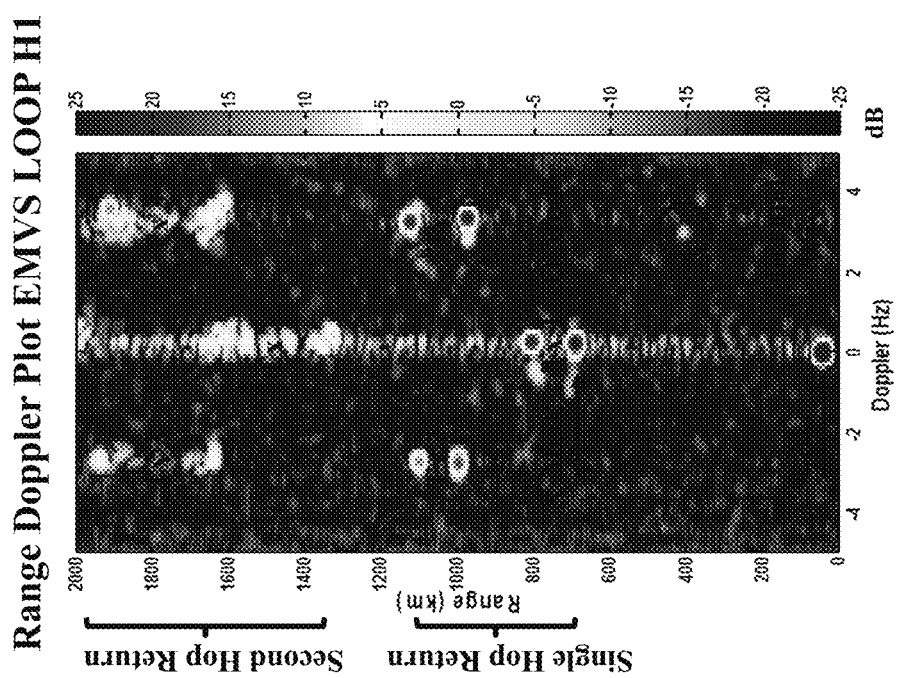

FIG. 23B illustrates a Range Doppler Plot with range separated ground wave, one-hop O and X, and two hop O and X modes.

Figure 24:
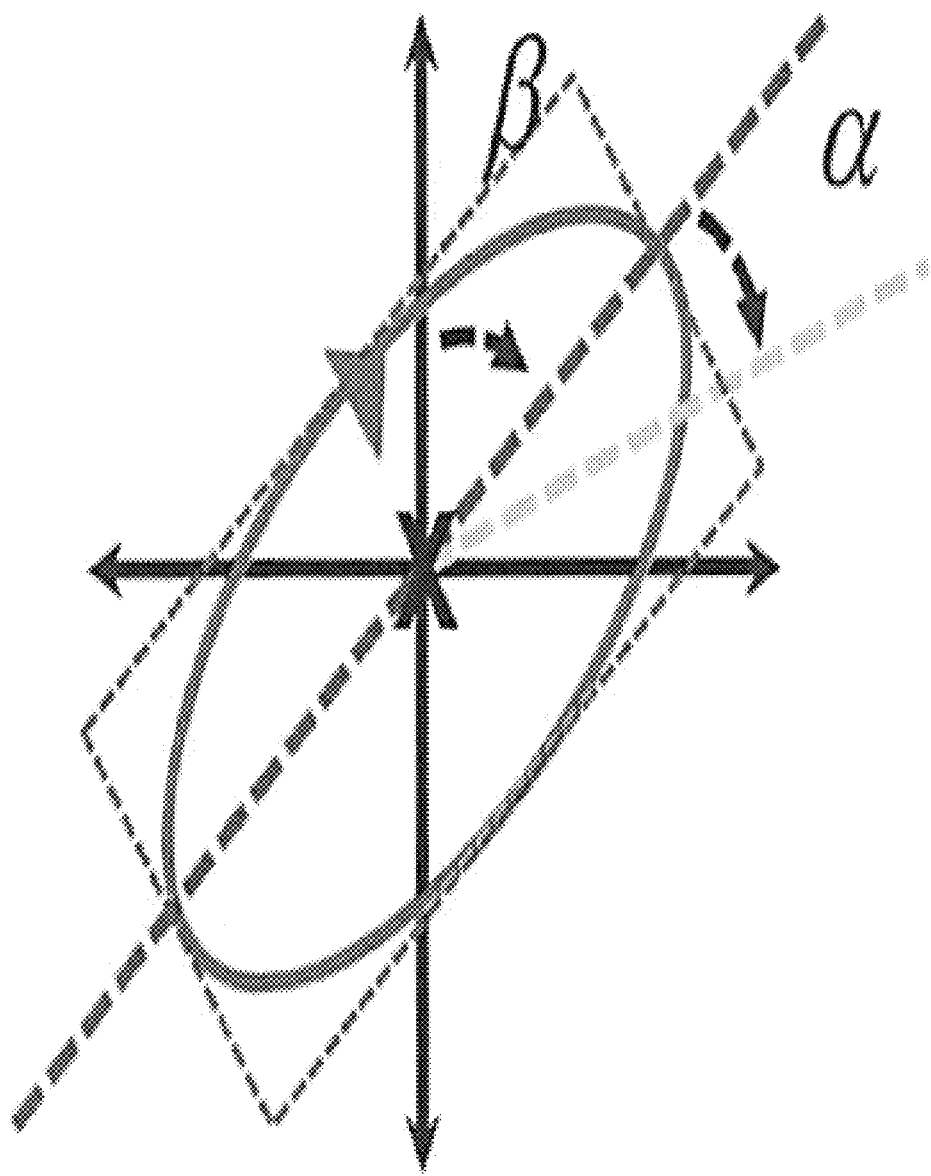

FIG. 24 illustrates a description of the polarization state as the rotation of the E-field vector in the plane orthogonal to the direction of propagation where polarization is elliptical and is described by an ellipticity angle alpha ($\alpha$) in radians and orientation angle beta ($\beta$) in radians.

Figure 25:
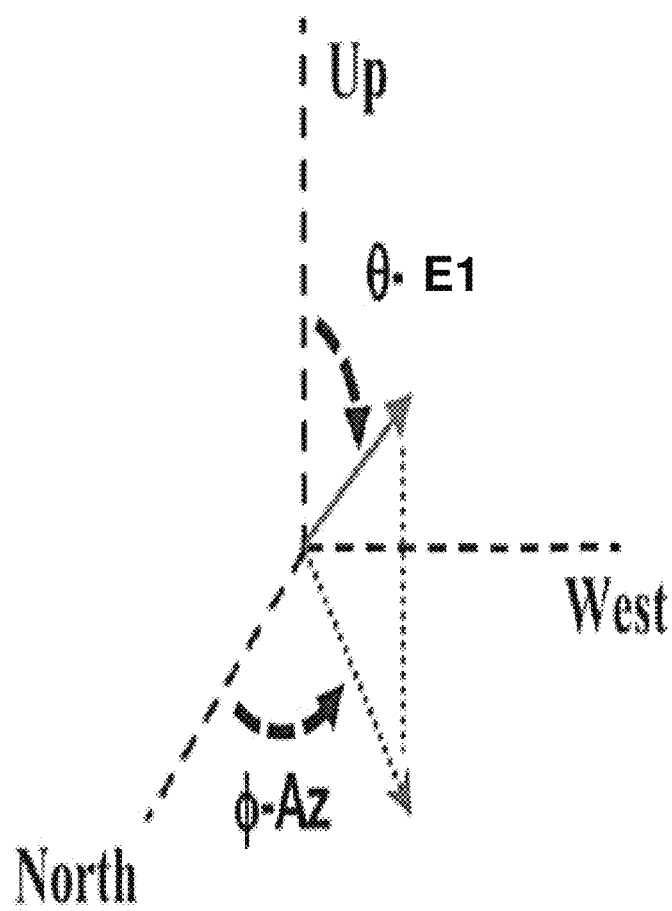

FIG. 25 illustrates the two coordinate system for a two dimensional array manifold vector with azimuth defined from North to West and elevation defined from zenith to horizon.

Figure 26A:
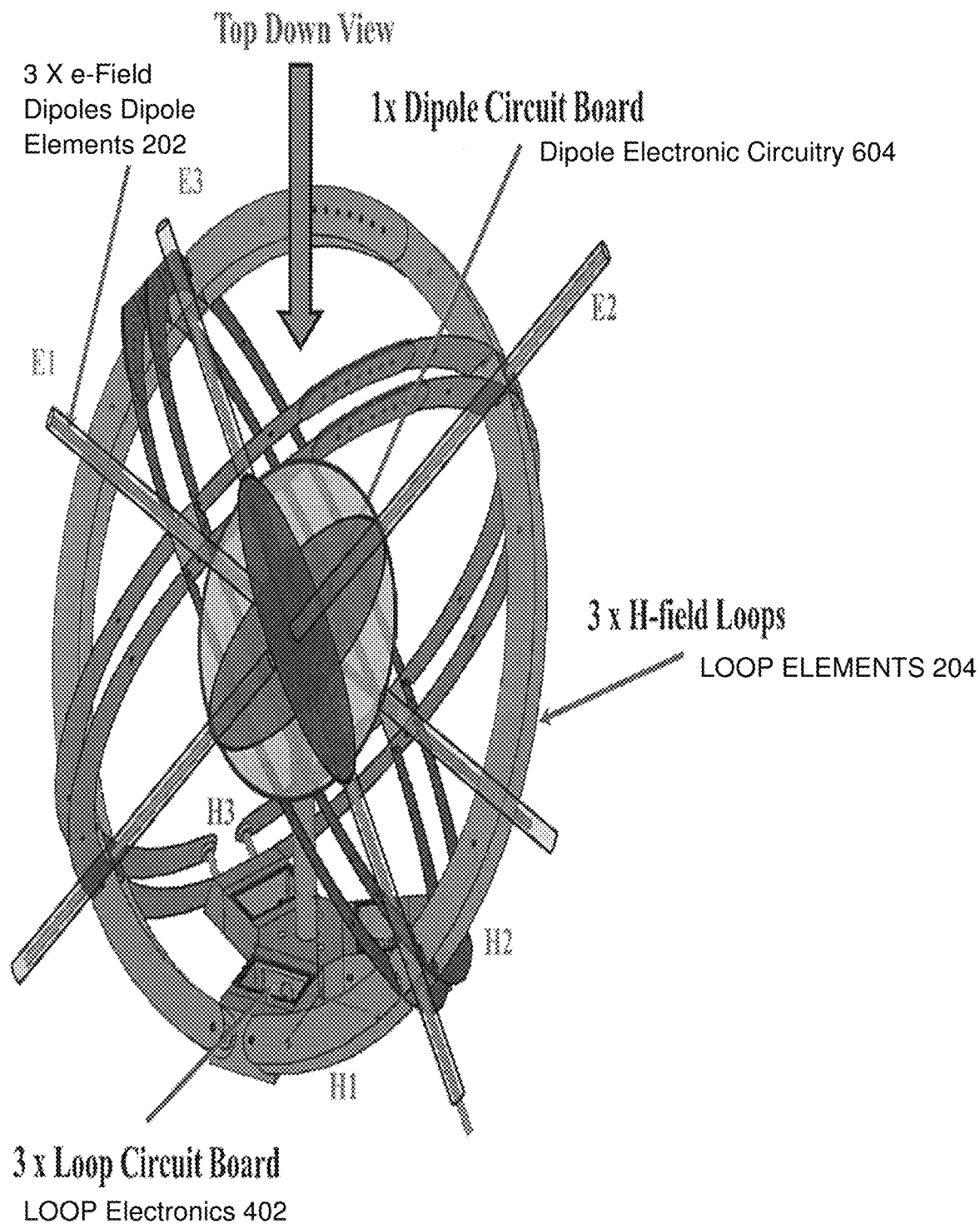

FIG. 26A illustrates an isometric view of the completed electromagnetic vector sensor 100 assembly with orthogonal E-field dipoles and H-filed loops labeled.

Figure 26B:
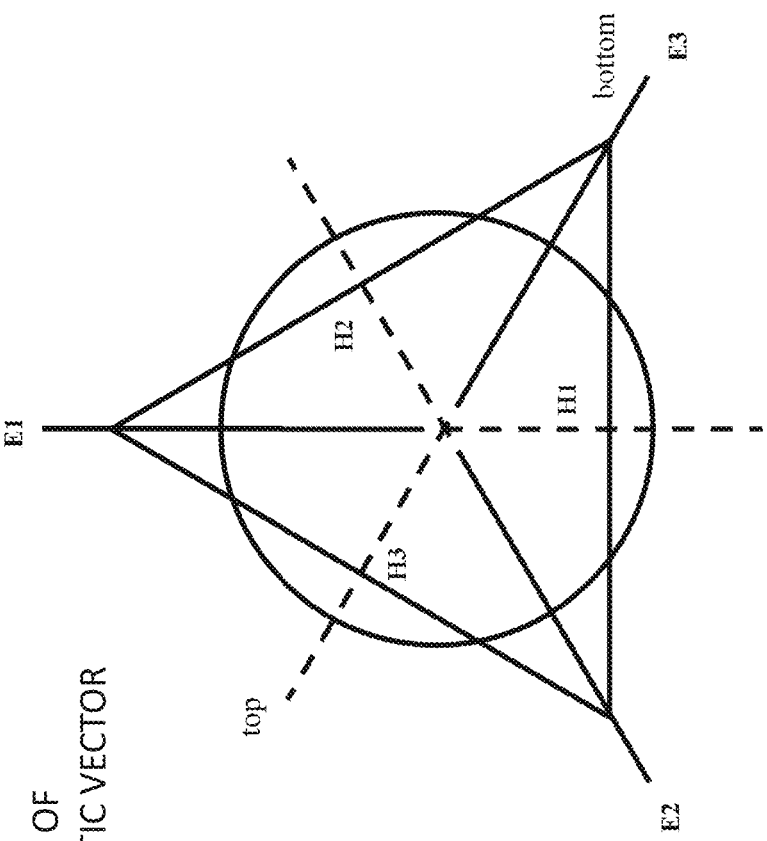

FIG. 26B illustrates a top-down view of the completed electromagnetic vector sensor 100 assembly.

Figure 26C:
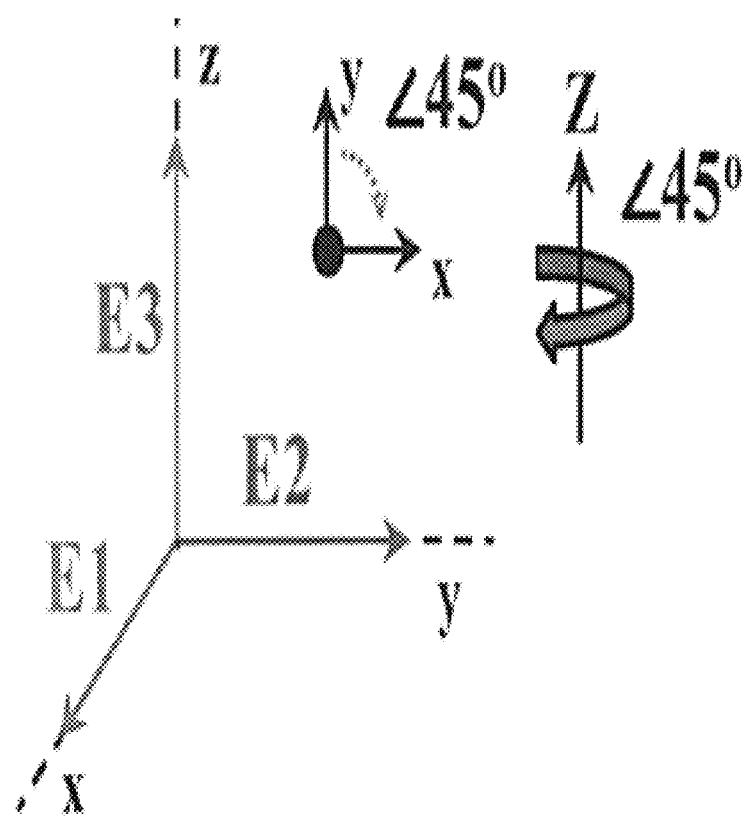

FIG. 26C illustrates EMVS E-filed dipole coordinate rotations applied about the Z axis, relative to the normal x, y, z axis, at 45 degrees.

Figure 26D:
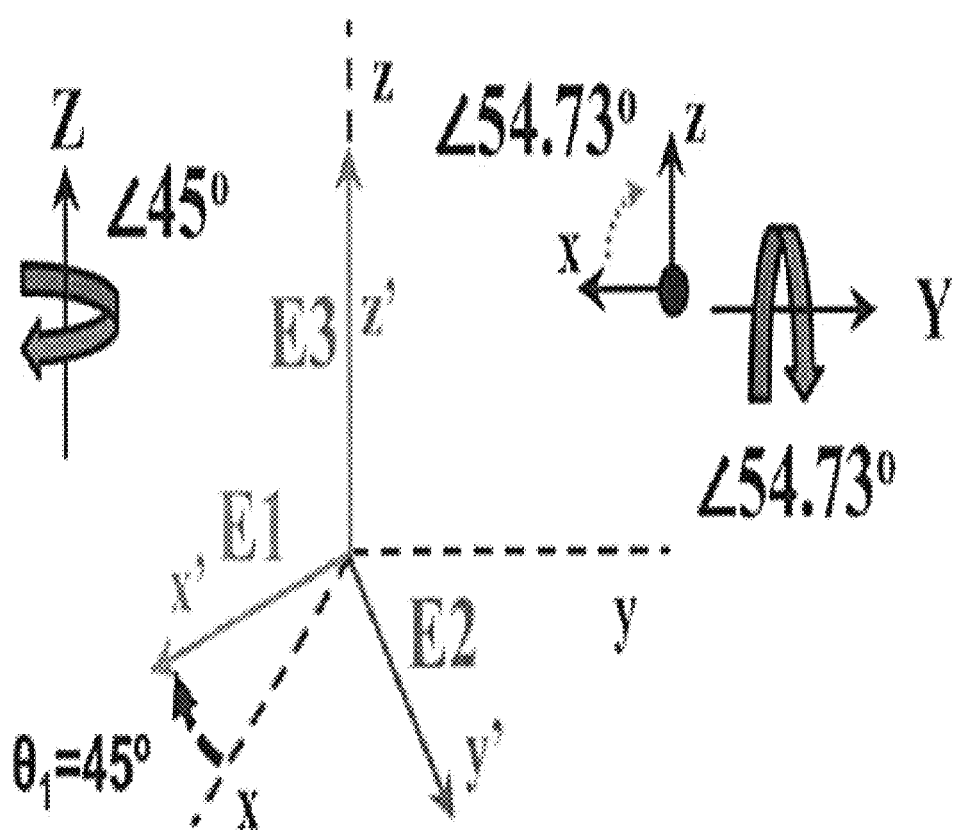

FIG. 26D illustrates EMVS E-filed dipole coordinate rotations applied about the Y axis, relative to a varying x, y, z axis, at an Ez angle of 54.73 degrees.

Figure 26E:
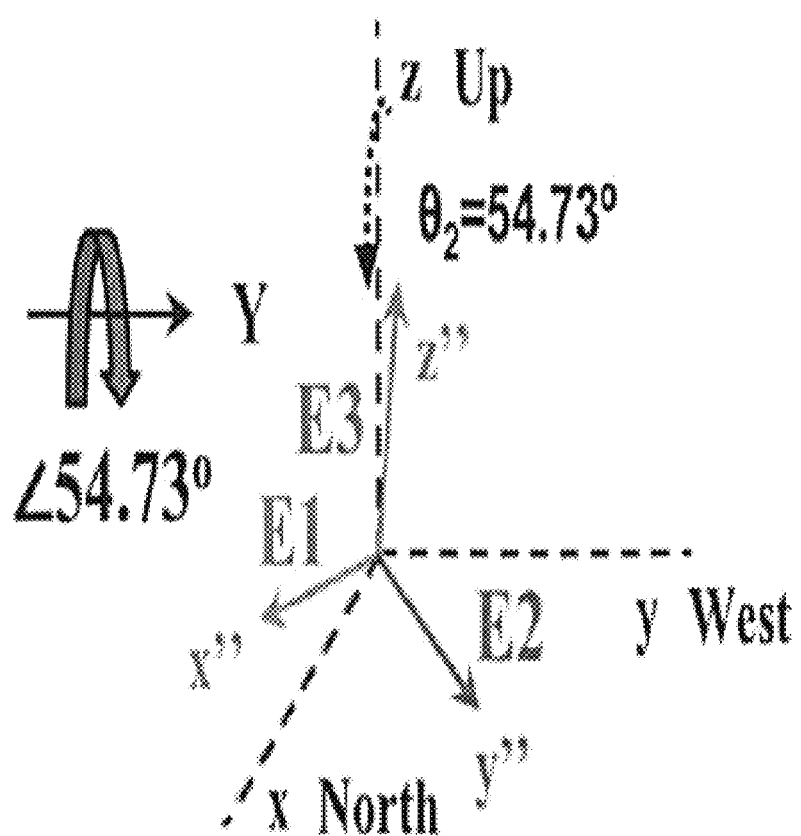

FIG. 26E illustrates E-field rotation representations, upon realignment of E-field dipole antenna elements relative to original x, y, z cartization coordinate system.

Figures 27A, 27B:
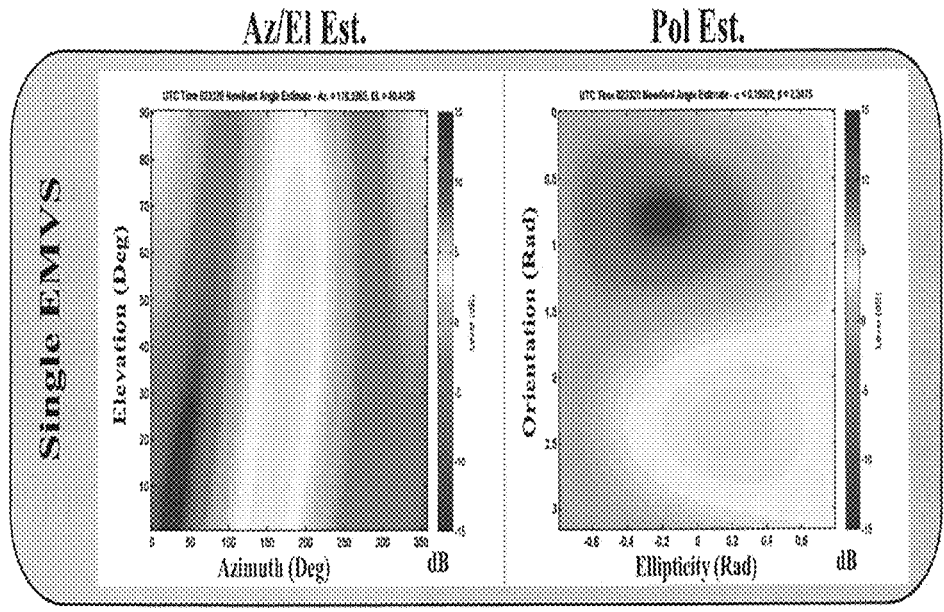

FIG. 27A illustrates an estimated Az/El obtained with a single EMVS.

FIG. 27B illustrates an estimated Az/El obtained with a 2D array of three-EMVS.

Figures 27C, 27D:
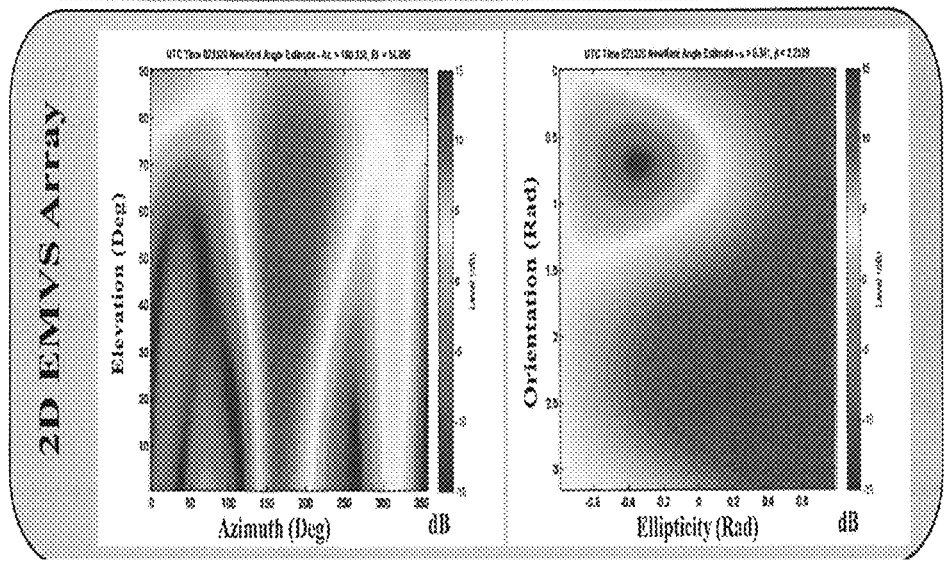

FIG. 27C illustrates an estimated orientation/ellipticity of a single EMVS.

FIG. 27D illustrates an estimated orientation and ellipticity of three EMVS.

Figure 28A:
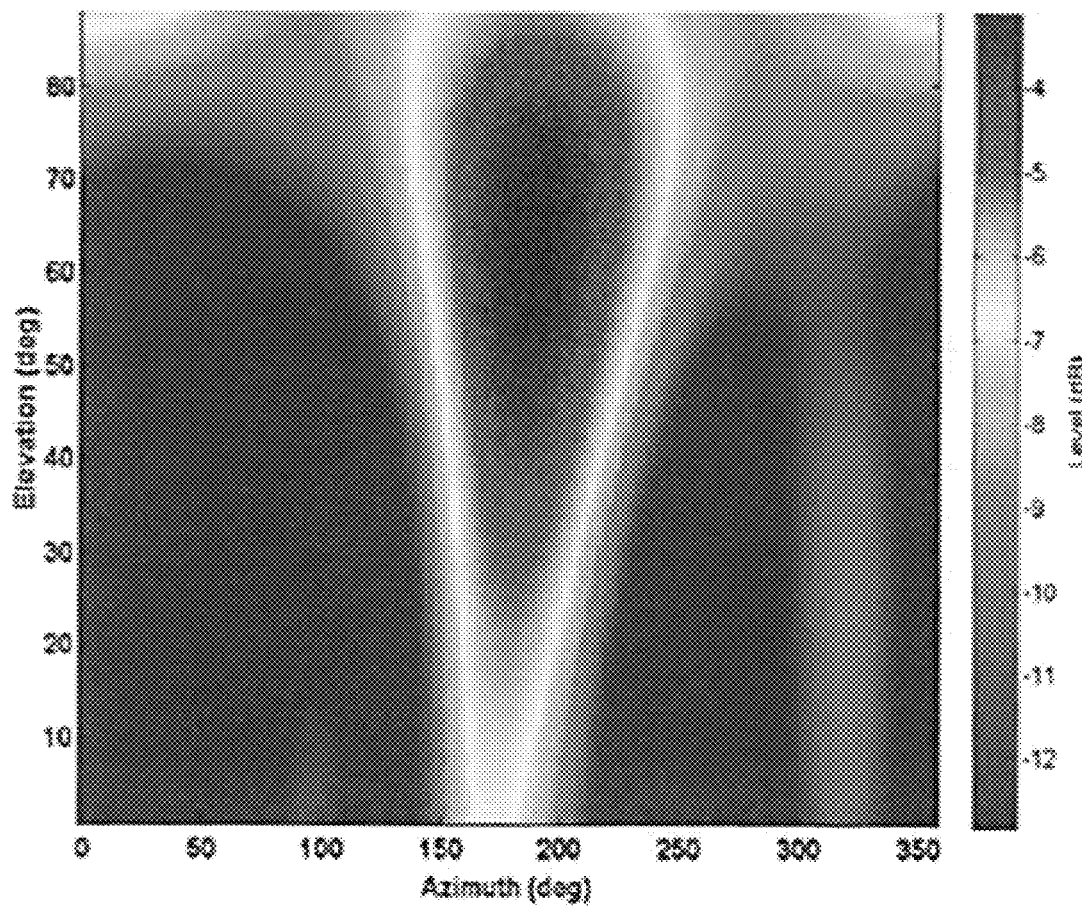

FIG. 28A illustrates estimated Az/El angle of arrival of O-mode signal of interest.

Figure 28B:
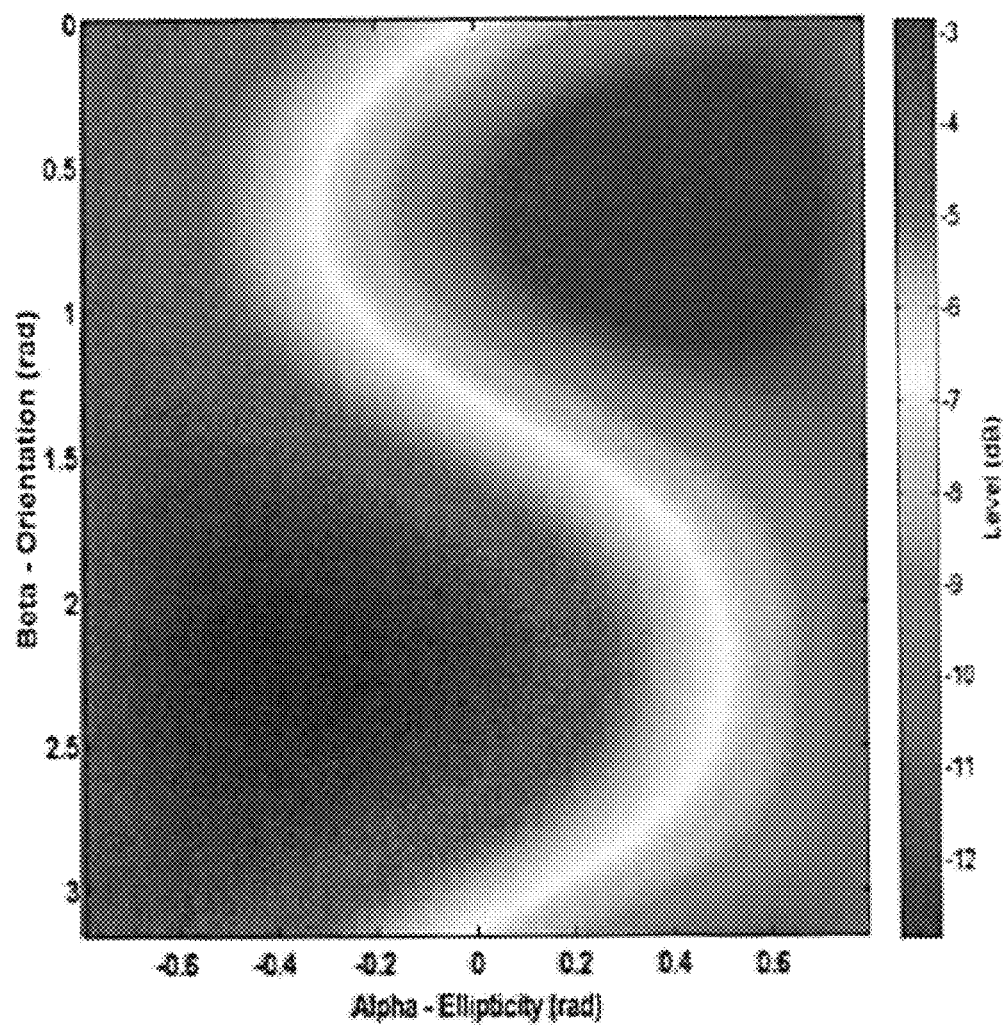

FIG. 28B illustrates signal Hop estimated left circular orientation/ellipticity of O-mode signal of interest.

Figure 28C:
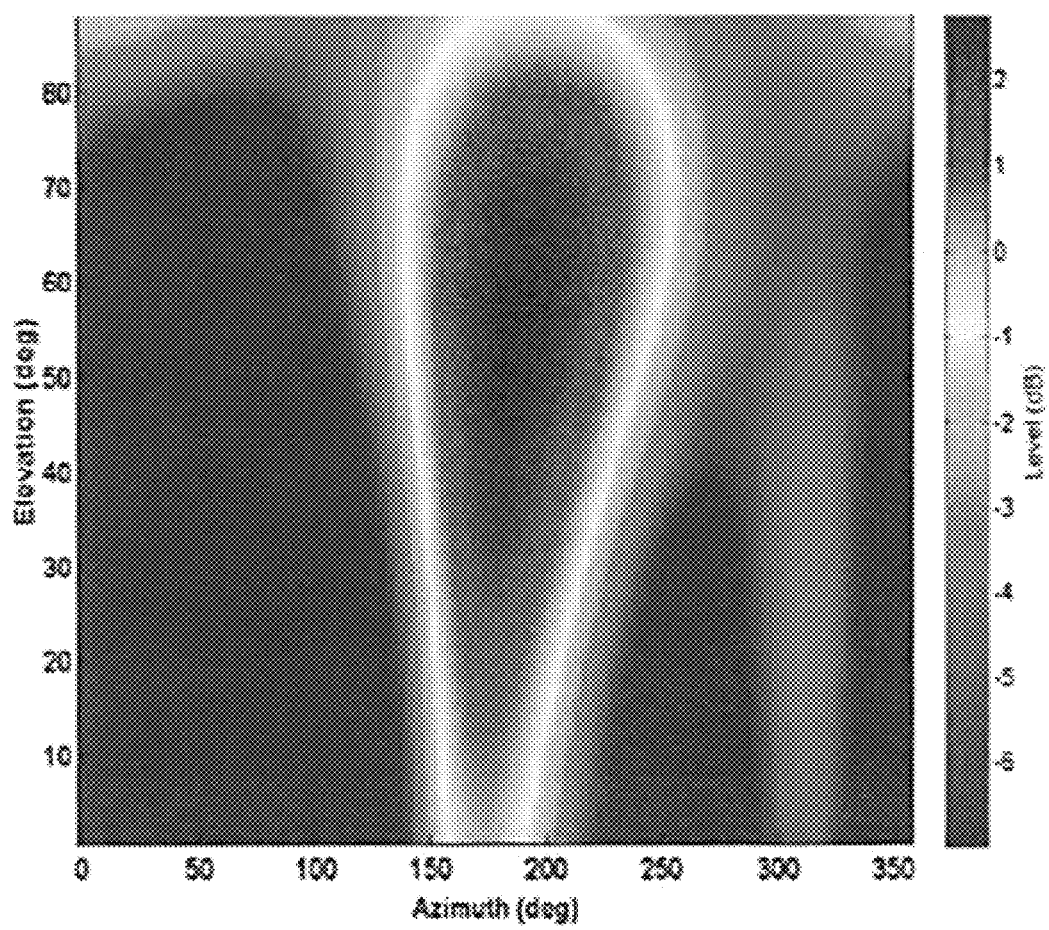

FIG. 28C illustrates signal Hop estimated right circular orientation/ellipticity of X-mode signal of interest.

Figure 28D:
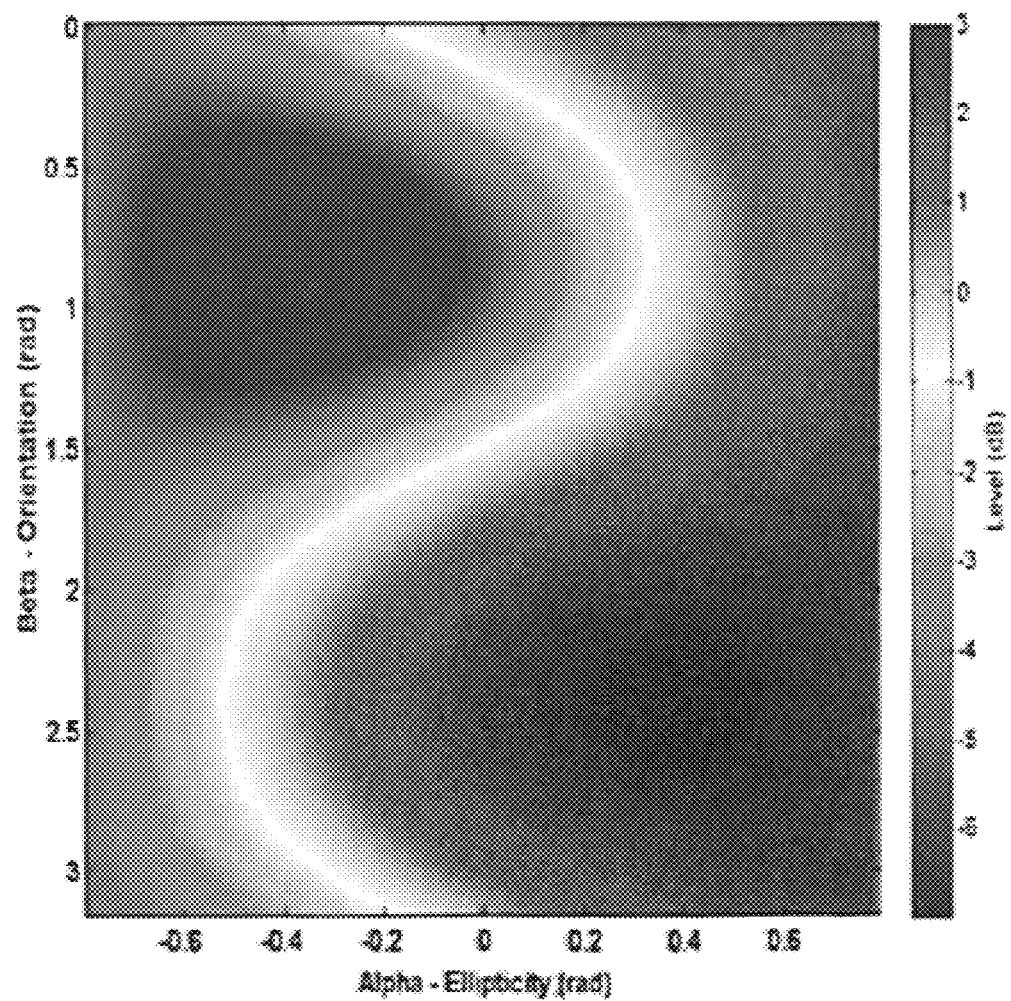

FIG. 28D illustrates signal Hop estimated Az/El of X-mode of signal of interest.

Figure 29A:
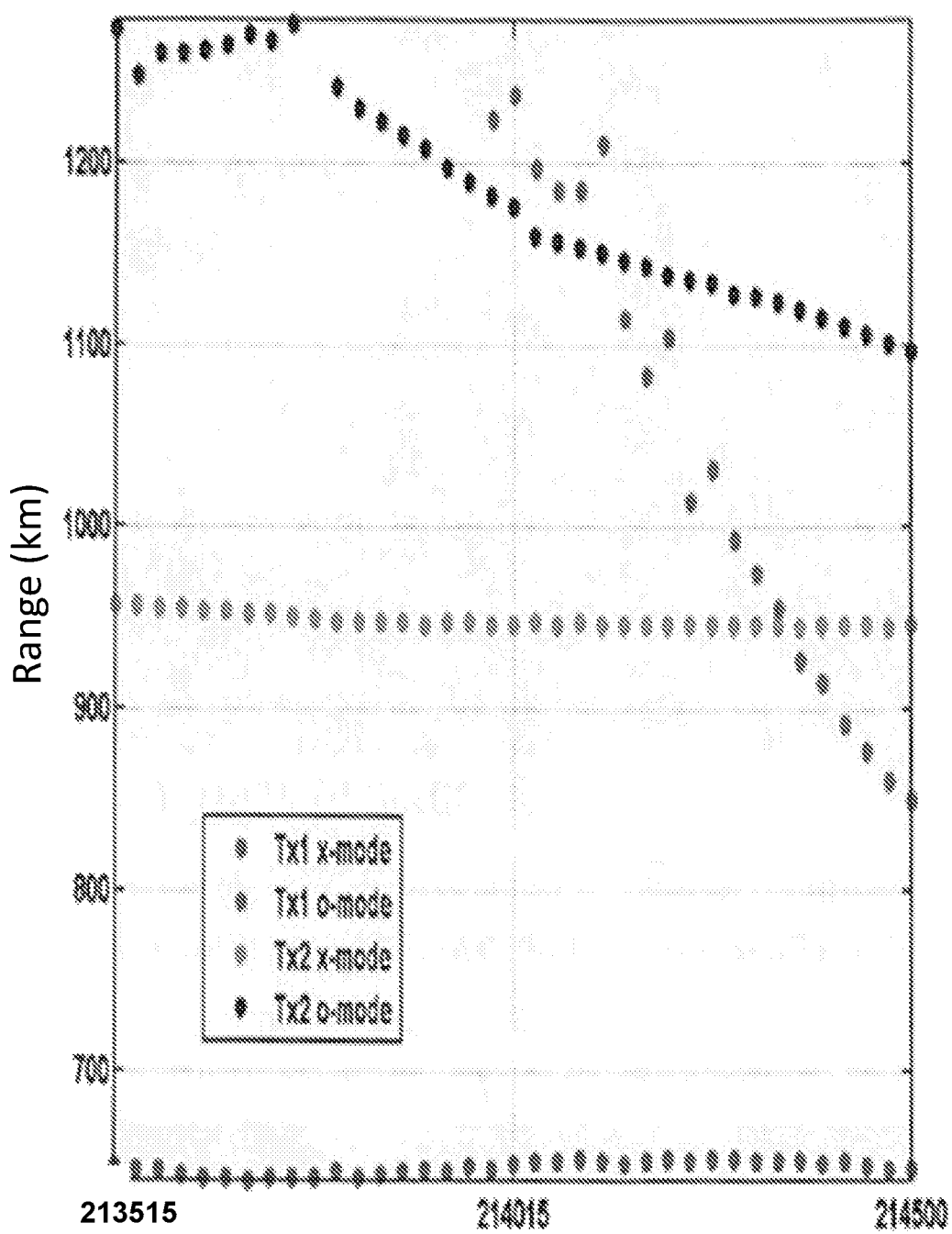

FIG. 29A illustrates a plot of estimated slant range, as a function kilometers verses UTC time.

Figure 29B:
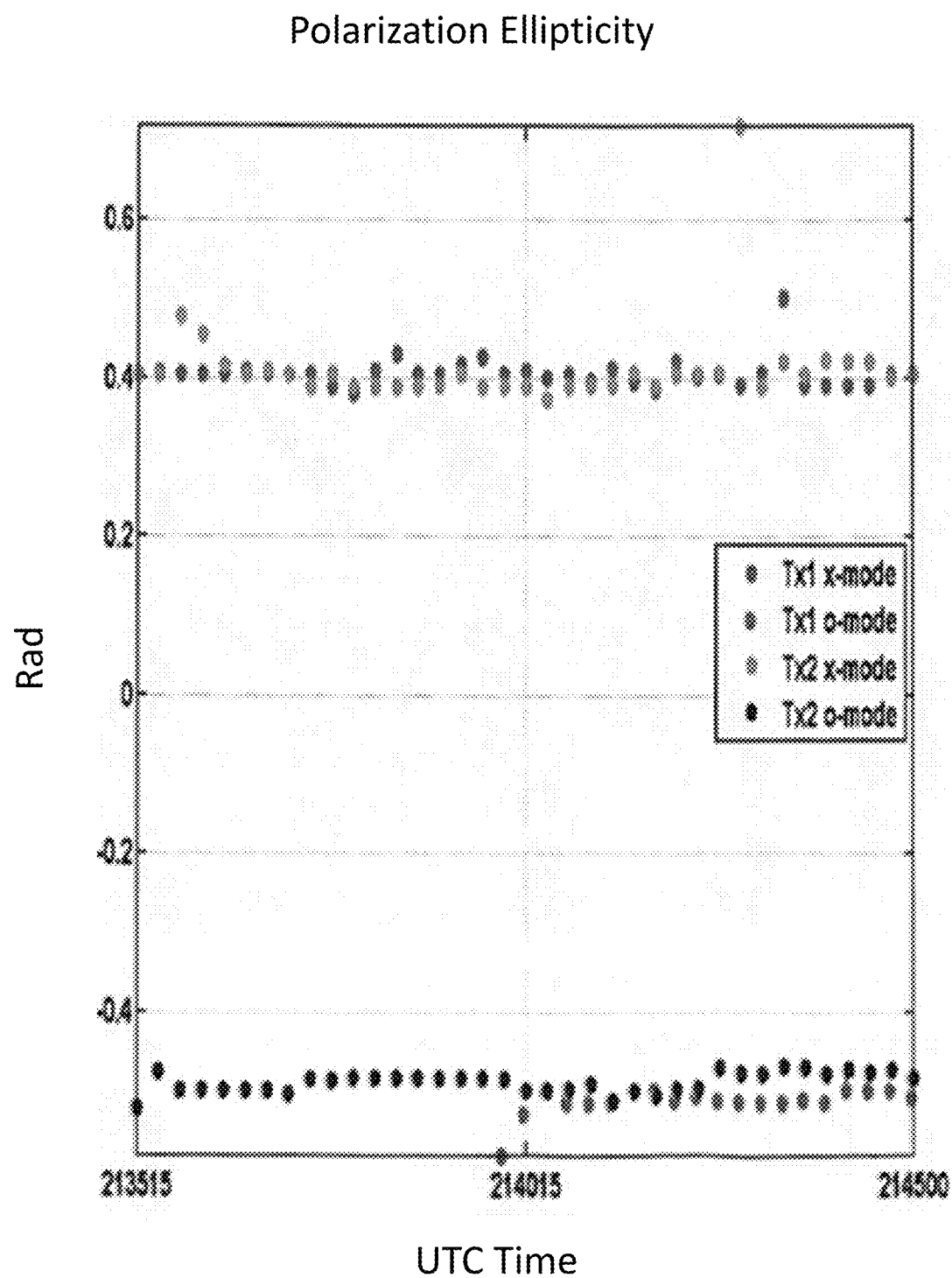

FIG. 29B illustrates a plot of polarization ellipticity, as a function of radians verses UTC time.

Figure 29C:
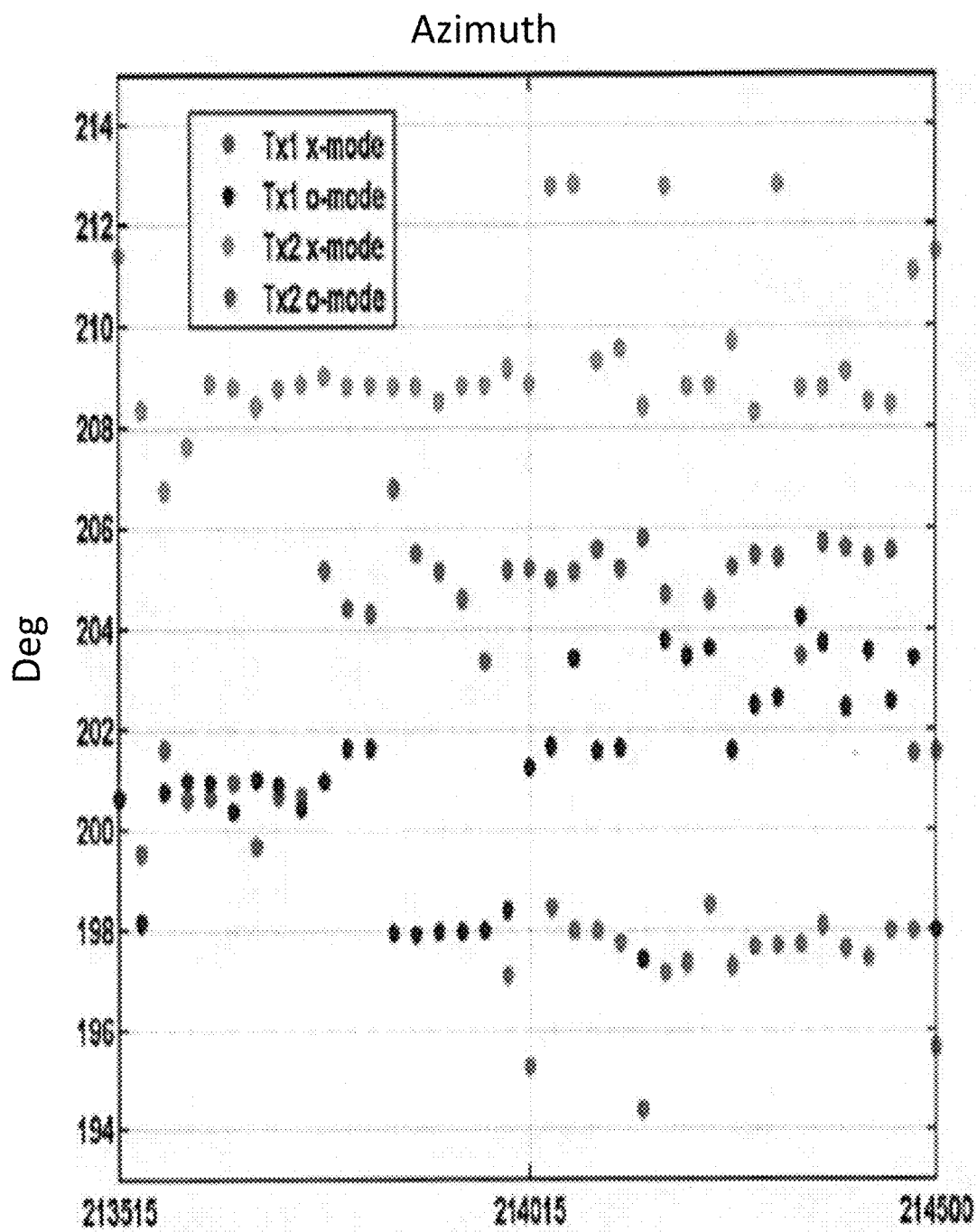

FIG. 29C illustrates an azimuth plot, as a function of degrees verses UTC time.

Figure 30:
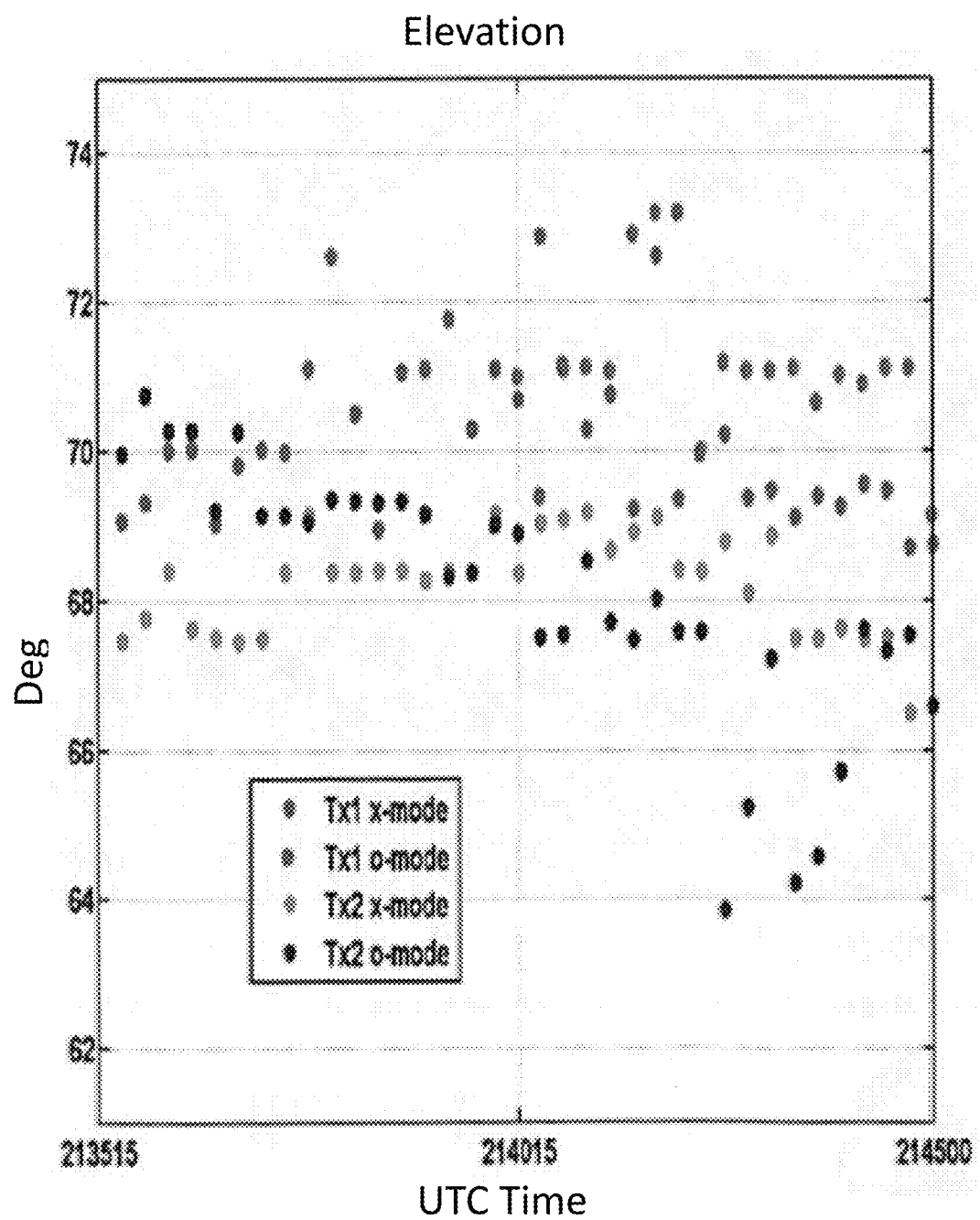

FIG. 30 illustrates a plot of elevation, as a function of degrees and UTC time.

FIG. 31A illustrates an overhead view of single active loop matching networks (low impedance).

FIG. 31B illustrates a schematic view of single active loop matching networks (low impedance).

Figure 31C:
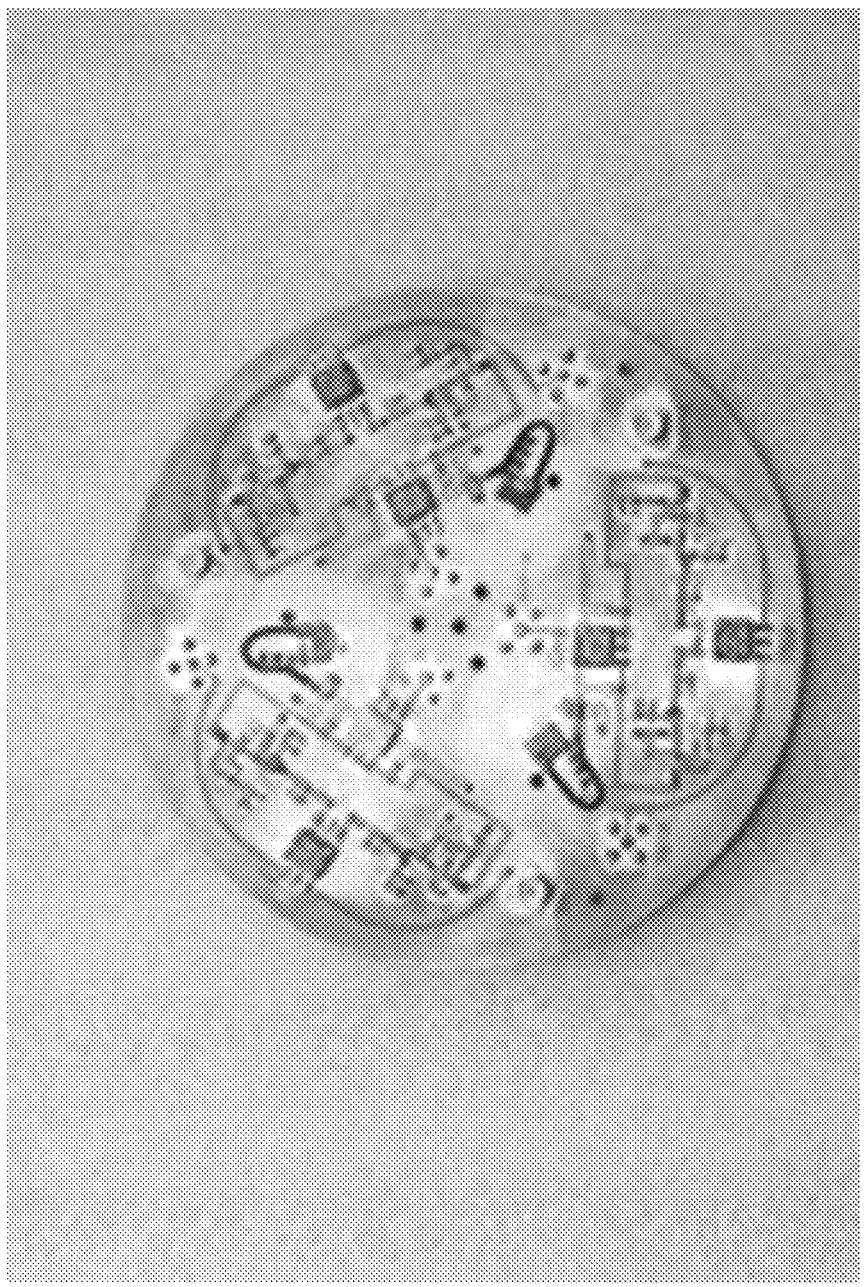

FIG. 31C illustrates an overhead view of 3 complete active dipole matching networks (high impedance).

Figure 31D:
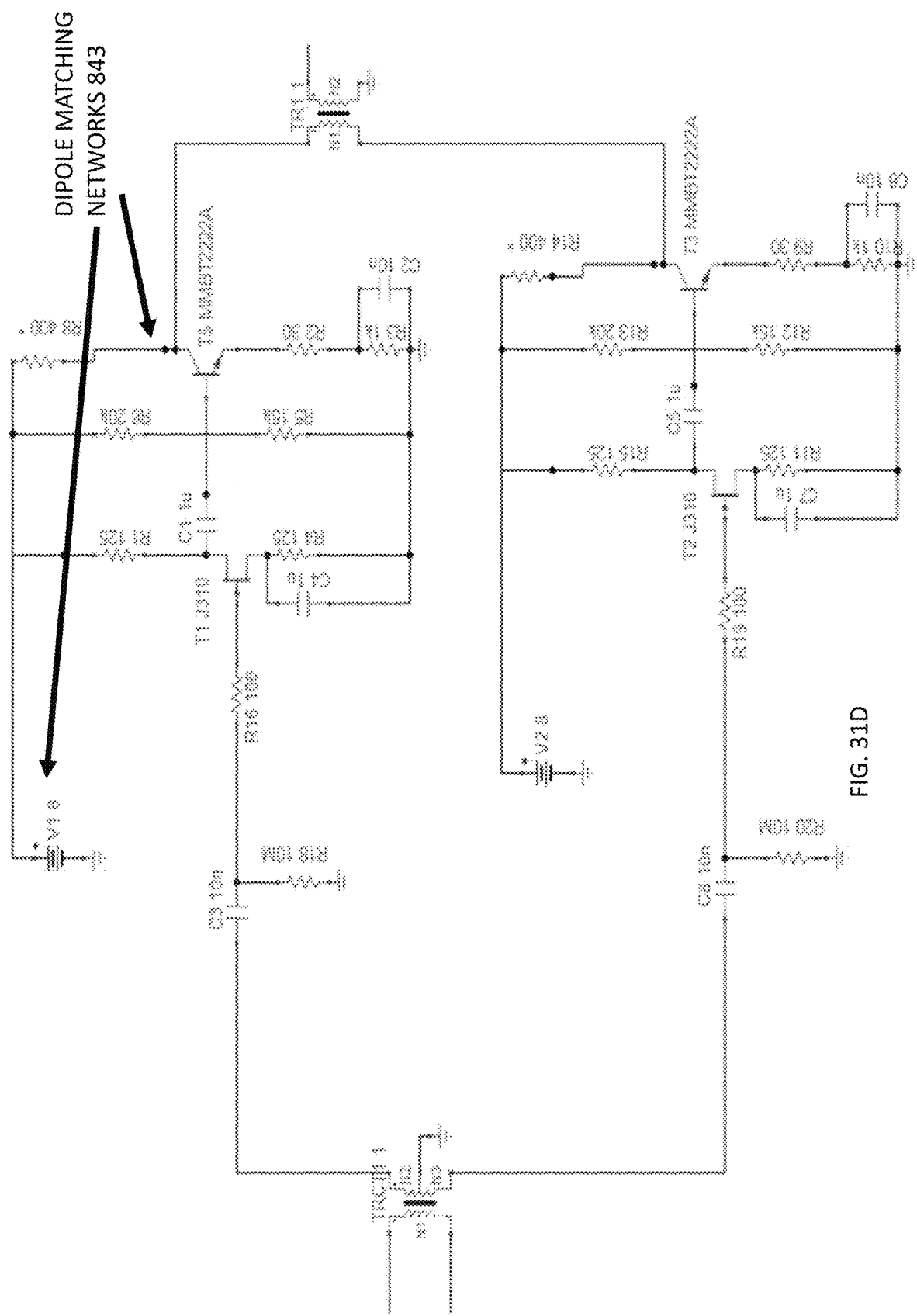

FIG. 31D illustrates a schematic view of 3 active dipole matching networks (low impedance).

Figure 32:
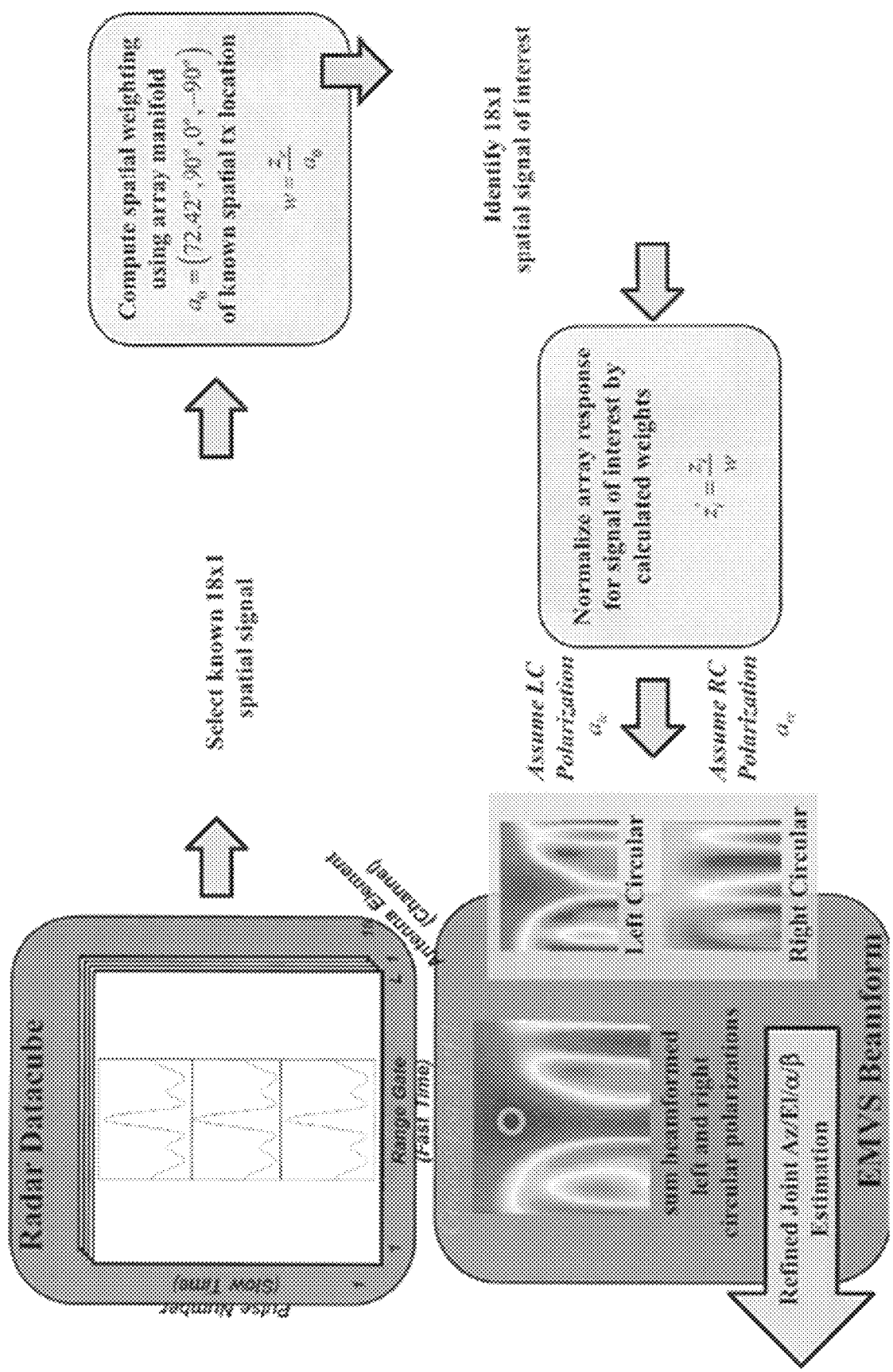

FIG. 32 illustrates In-Situ Calibration Processing flow chart.

Figure 33:
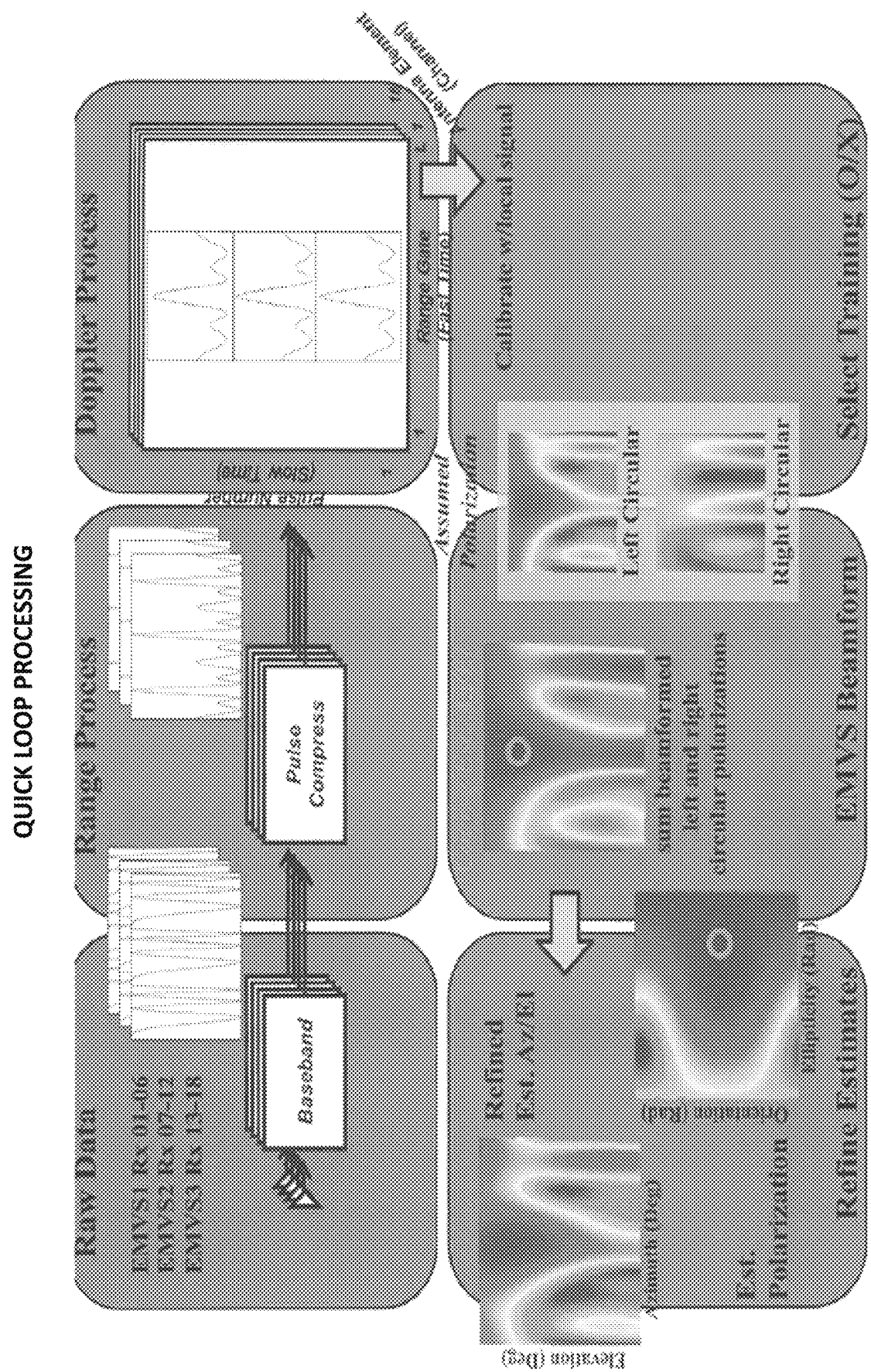

FIG. 33 illustrates Quick Look Processing flow chart.

Figure 34:
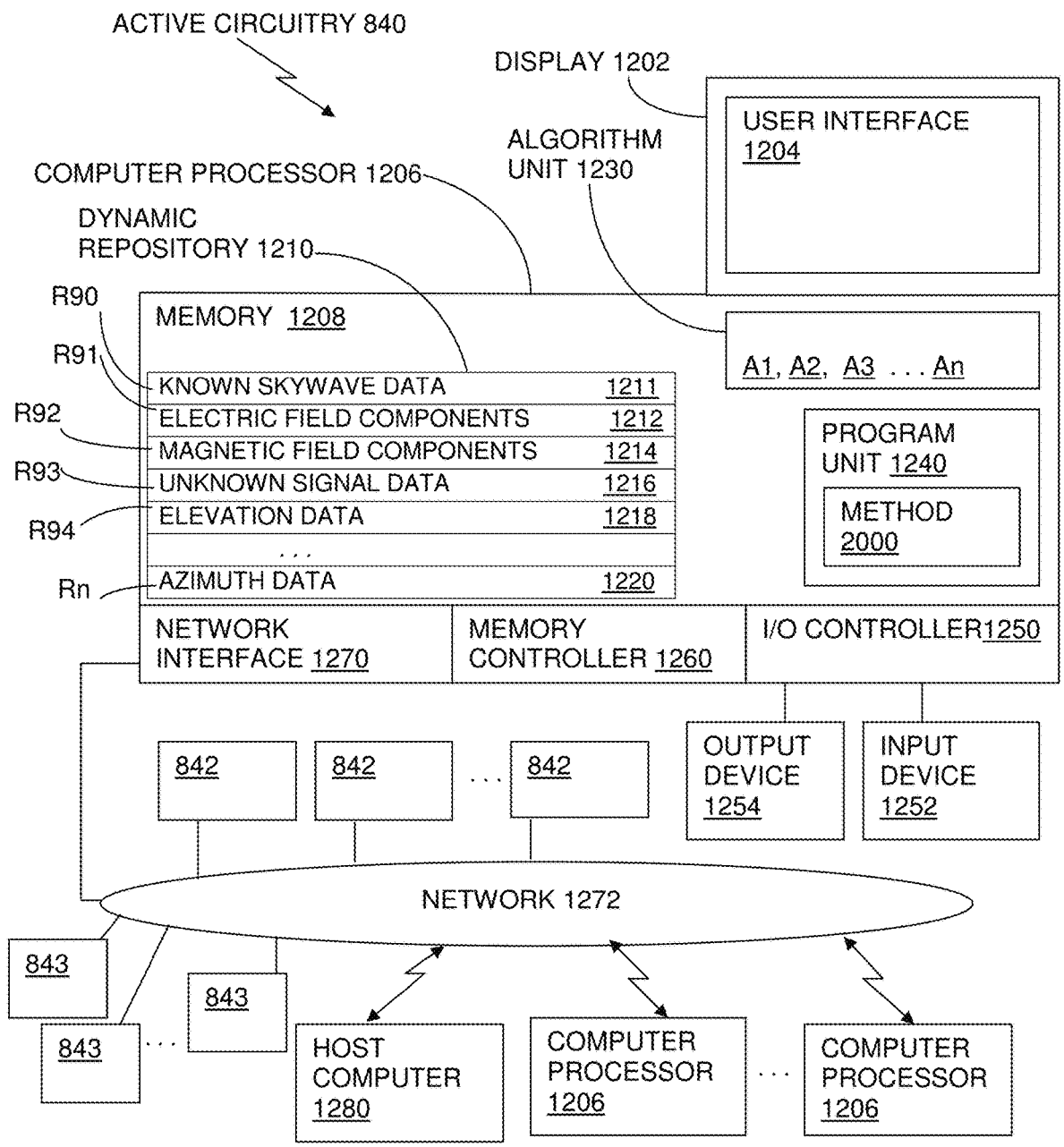

FIG. 34 illustrates active circuitry 840 and a network environment of an EMVS system.

Figure 35A:
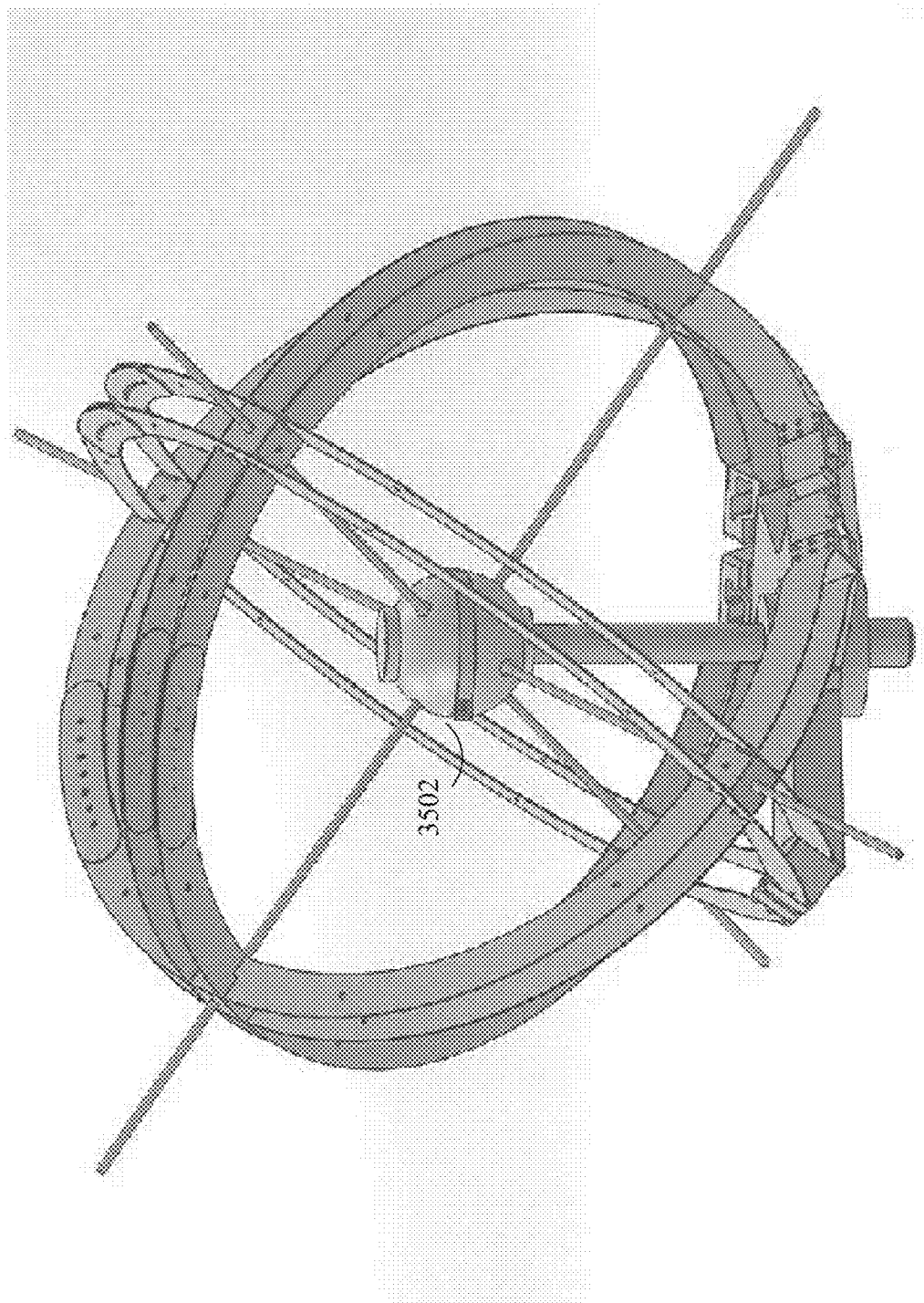

FIG. 35A is a diagram of an EMVS system in accordance with an embodiment of the present disclosure.

Figure 35B:
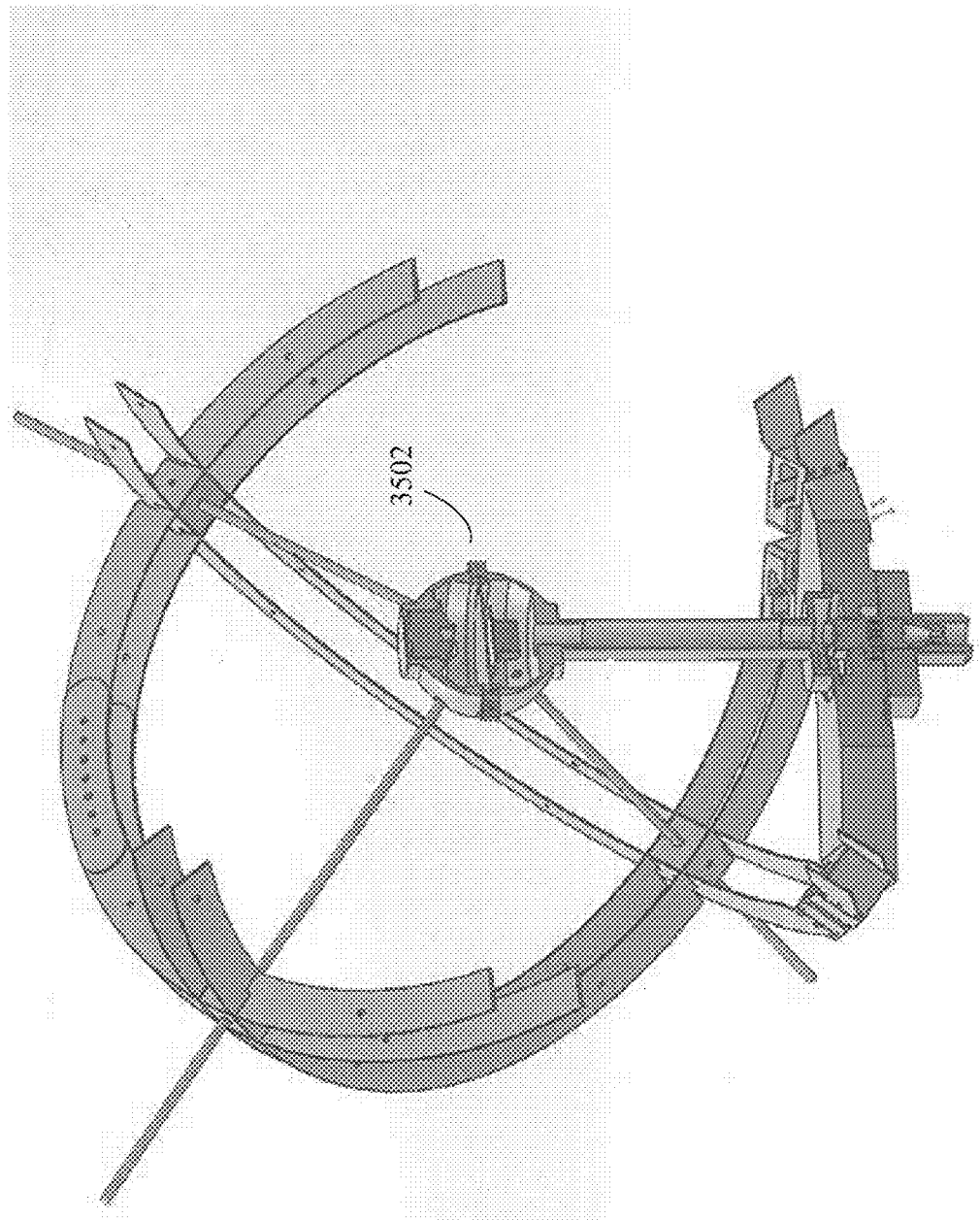

FIG. 35B is a diagram showing an interior of central housing 3502 in accordance with an embodiment of the present disclosure.

Figures 36A, 36B:
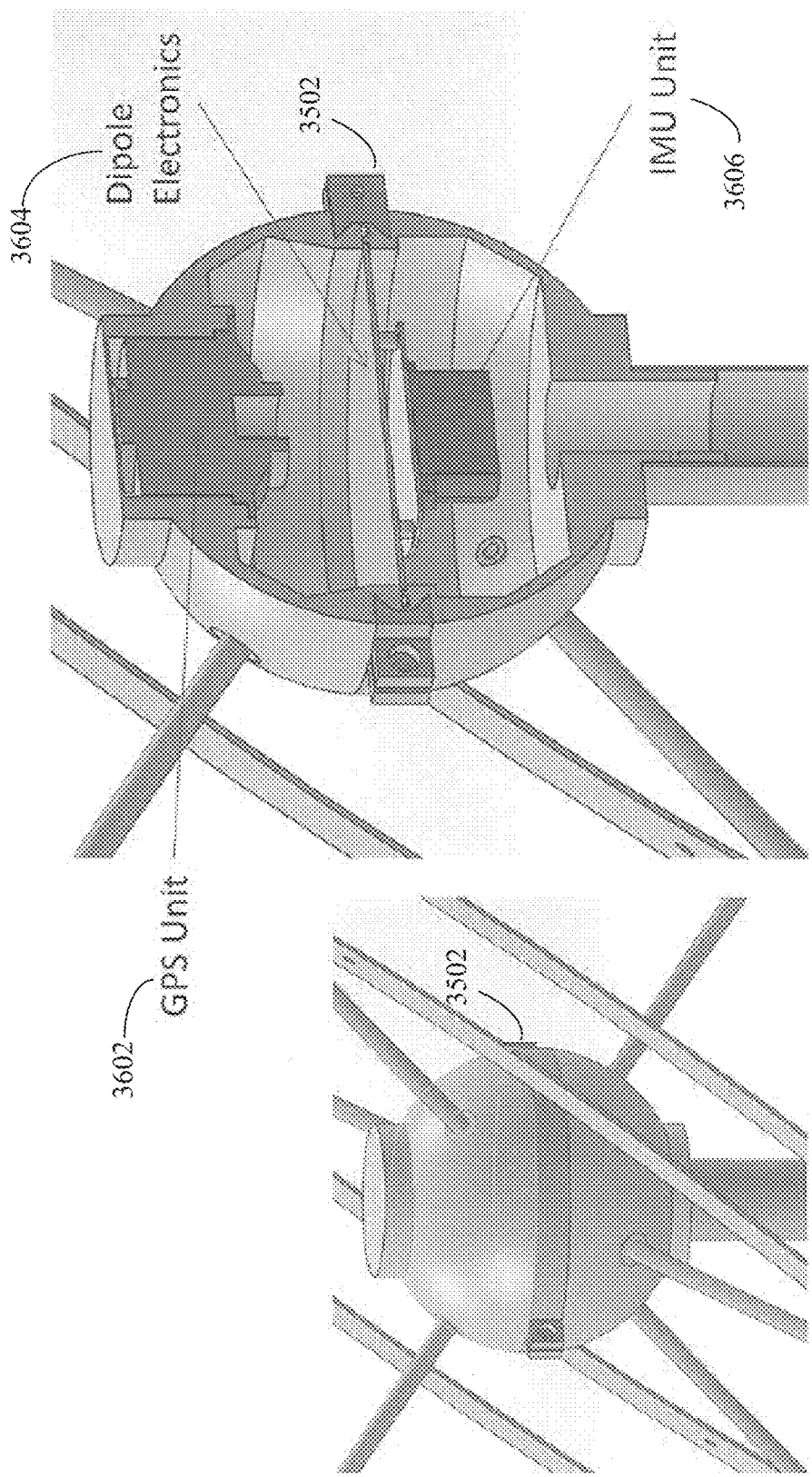

FIG. 36A is a diagram showing a close-up view of central housing 3502 in accordance with an embodiment of the present disclosure.

FIG. 36B is a diagram showing a close-up view of the interior of central housing 3502 in accordance with an embodiment of the present disclosure.

Figure 37A:
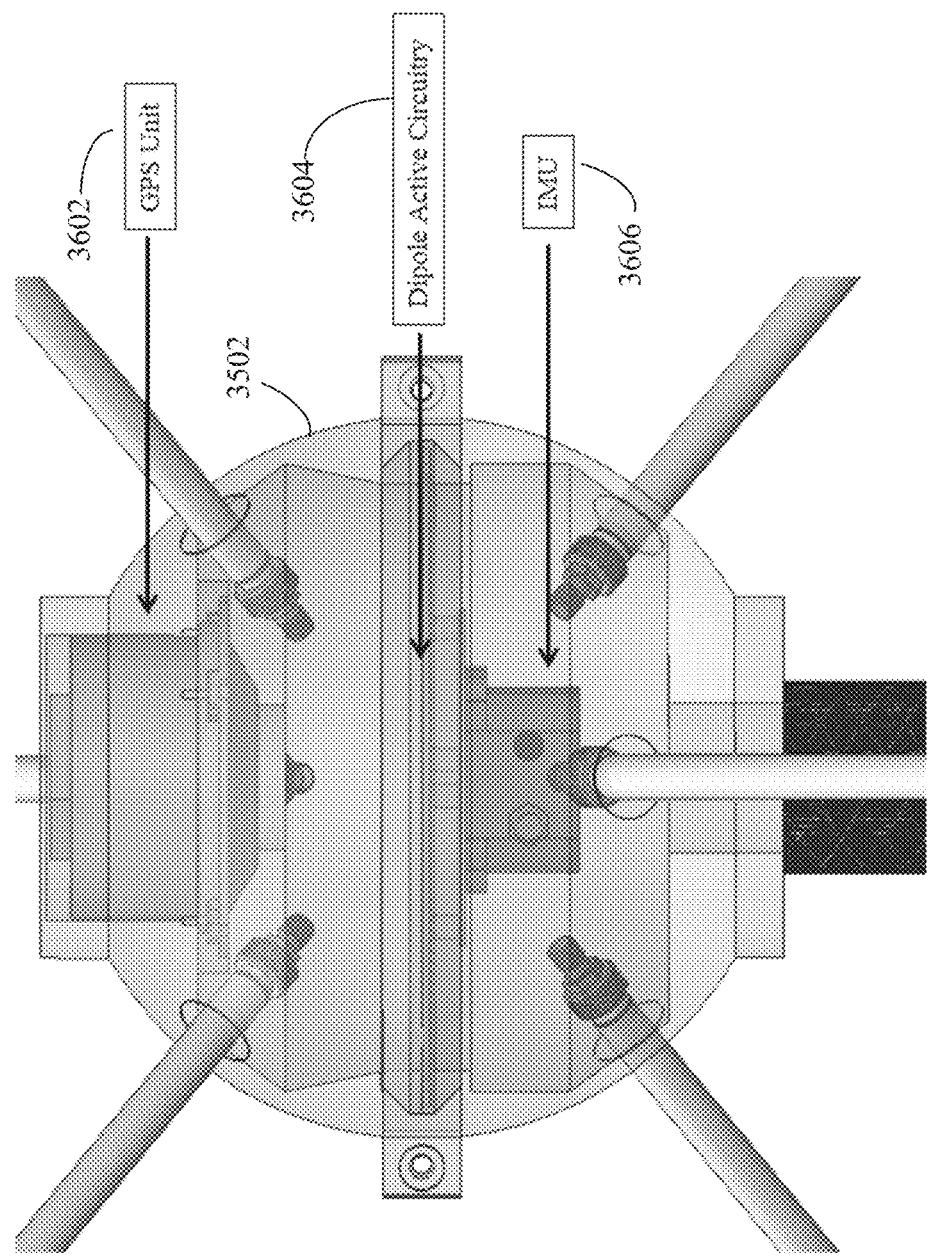

FIG. 37A is a diagram showing a close-up view of central housing 3502 in accordance with an embodiment of the present disclosure.

Figure 37B:
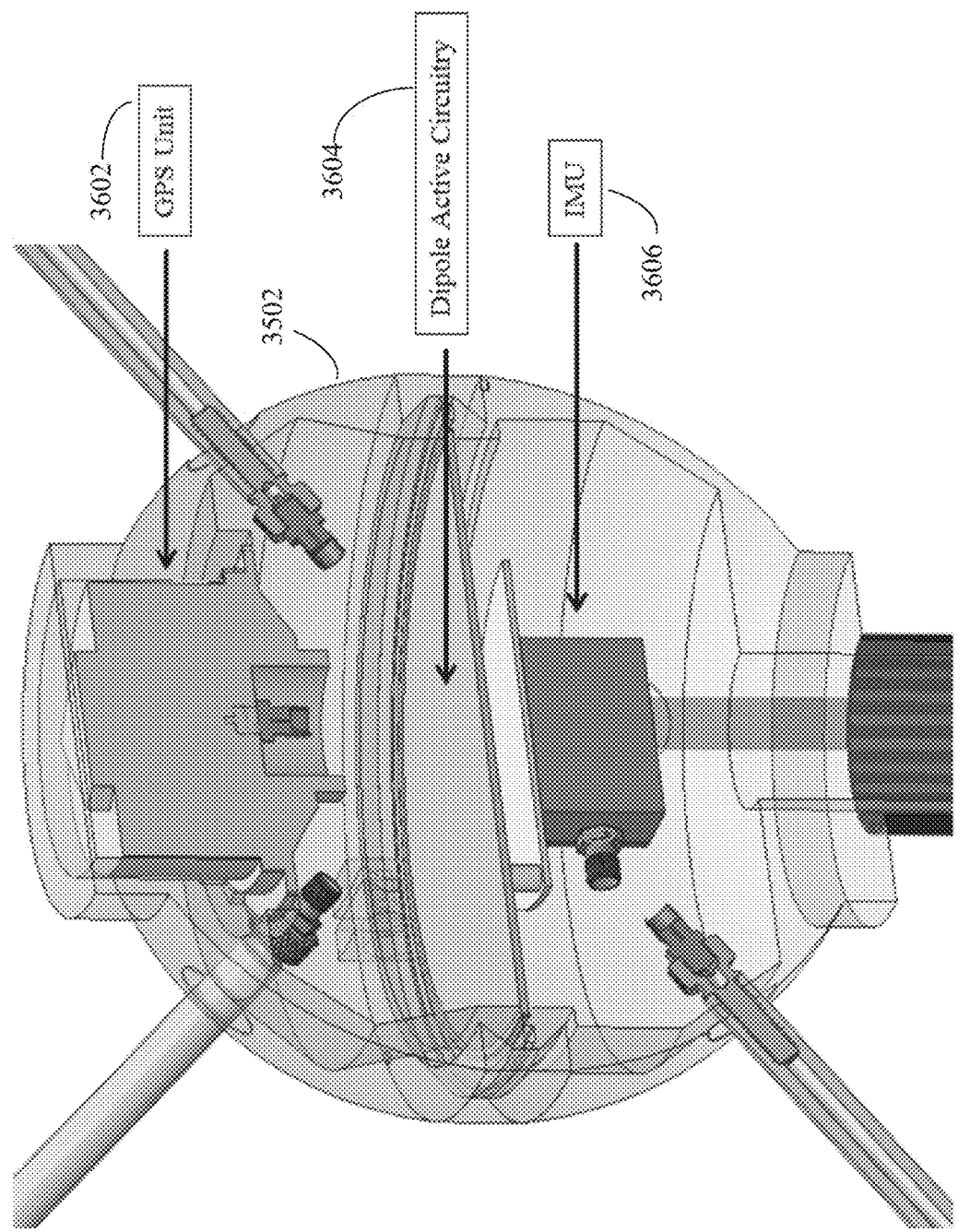

FIG. 37B is a diagram showing a close-up view of the interior of central housing 3502 in accordance with an embodiment of the present disclosure.

Figure 38A:
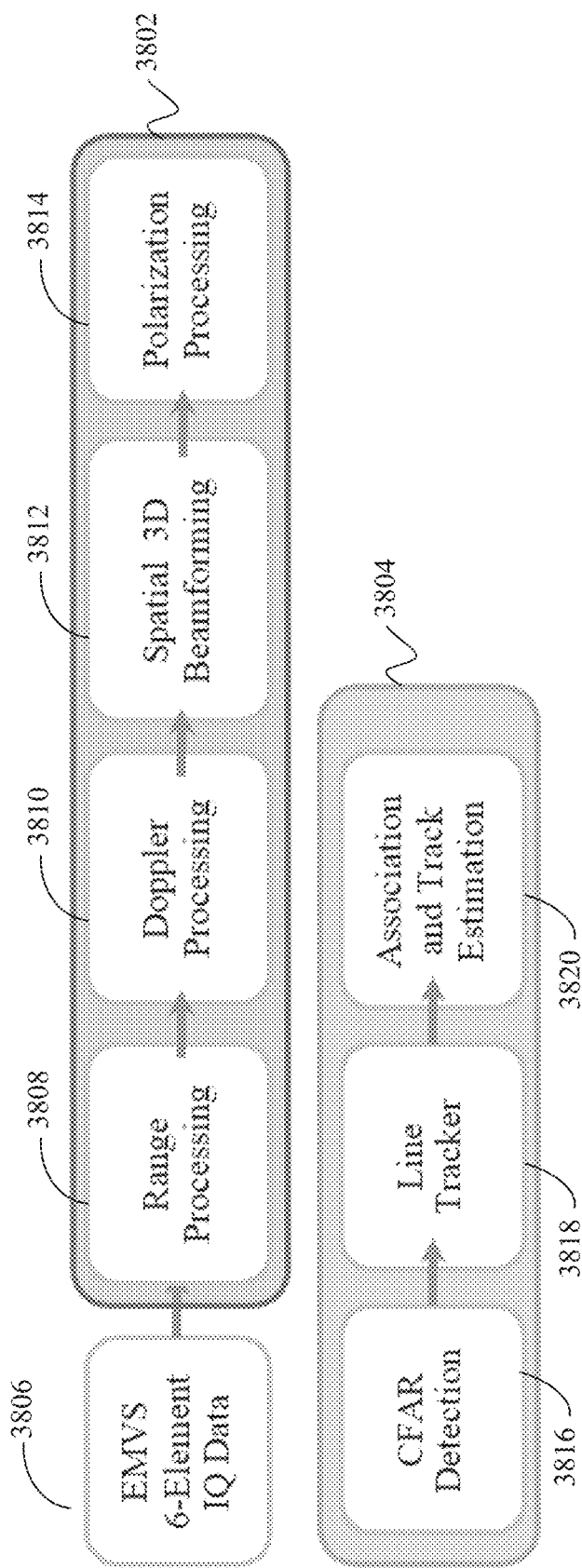

FIG. 38A is a flowchart of exemplary signal processing chains in accordance with an embodiment of the present disclosure.

Figure 38B:
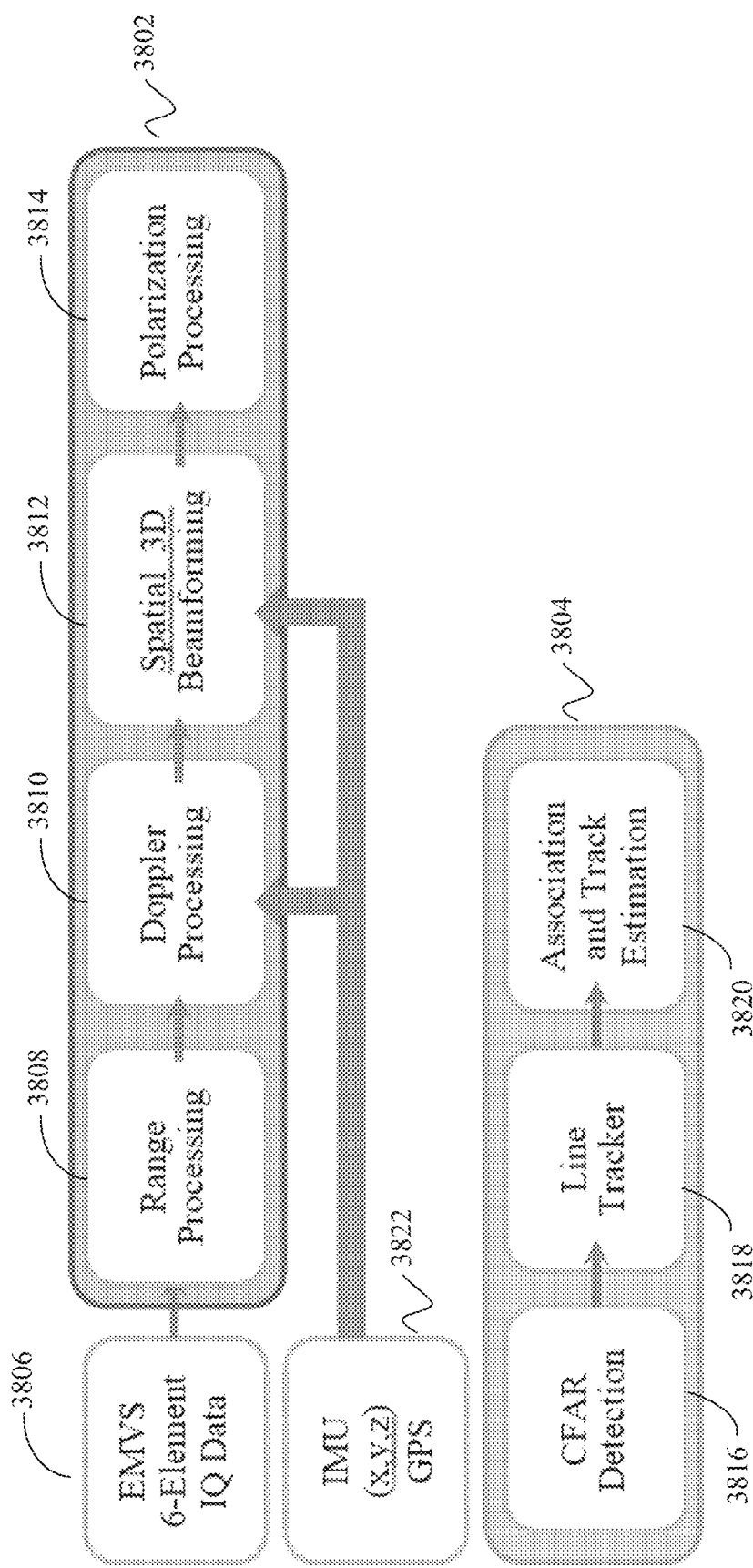

FIG. 38B is a flowchart of signal processing chains showing how GPS Unit 3602 and IMU 3606 can be used to enhance the functionality of the EMVS system in accordance with an embodiment of the present disclosure.

Figure 39A:
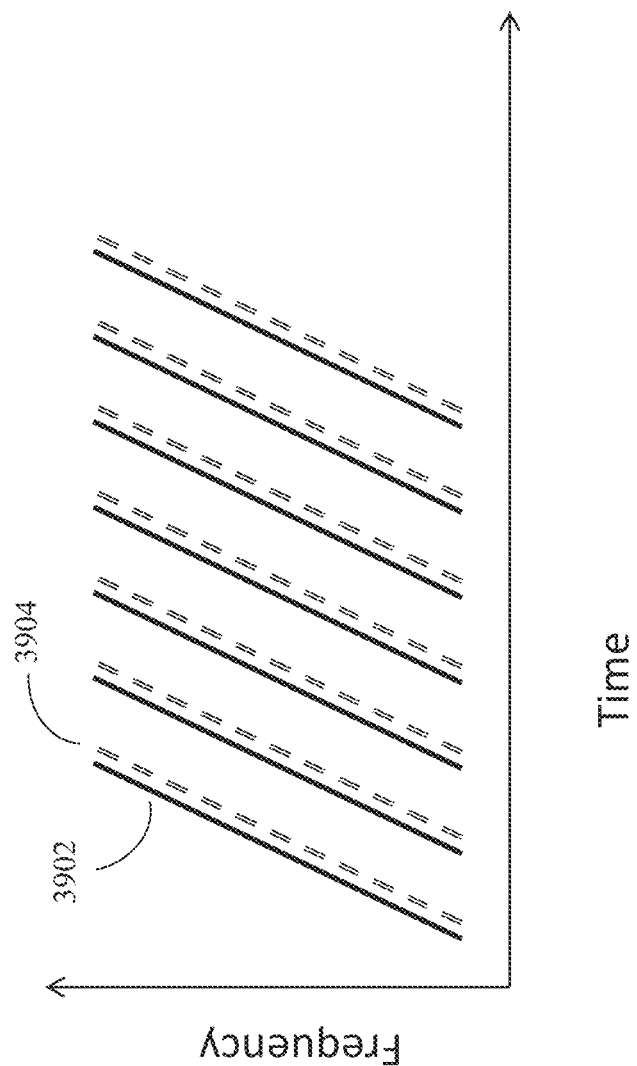

FIG. 39A is a diagram showing exemplary radar transmit signals 3902 (solid) and return signals 3904 (dashed) in accordance with an embodiment of the present disclosure.

Figure 39B:
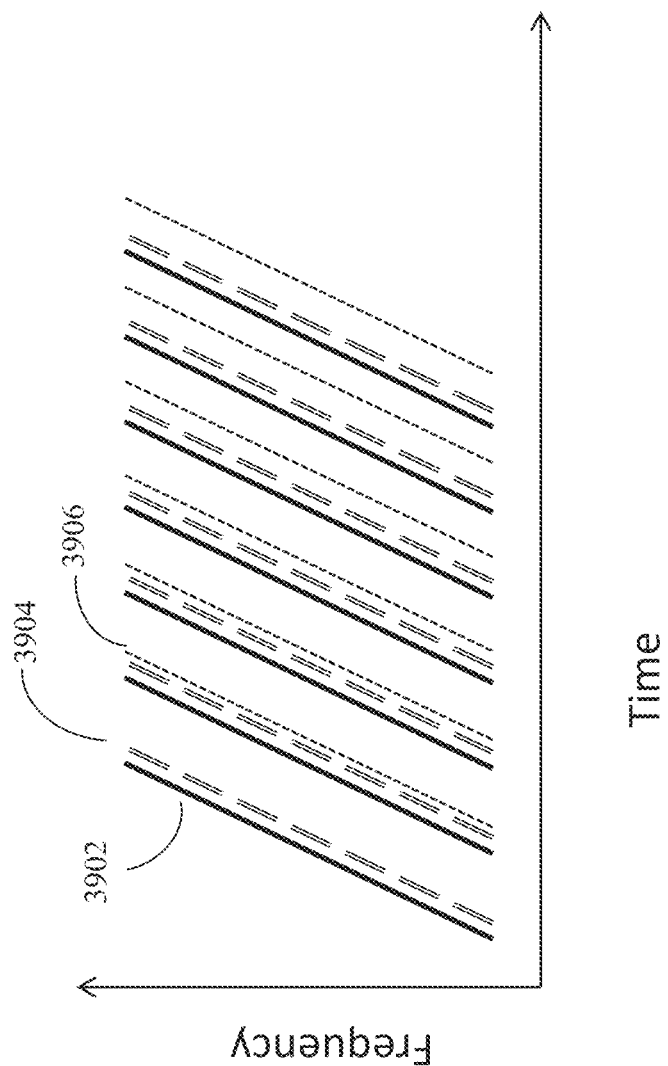

FIG. 39B is another diagram showing radar signals in accordance with an embodiment of the present disclosure.

Figure 39C:
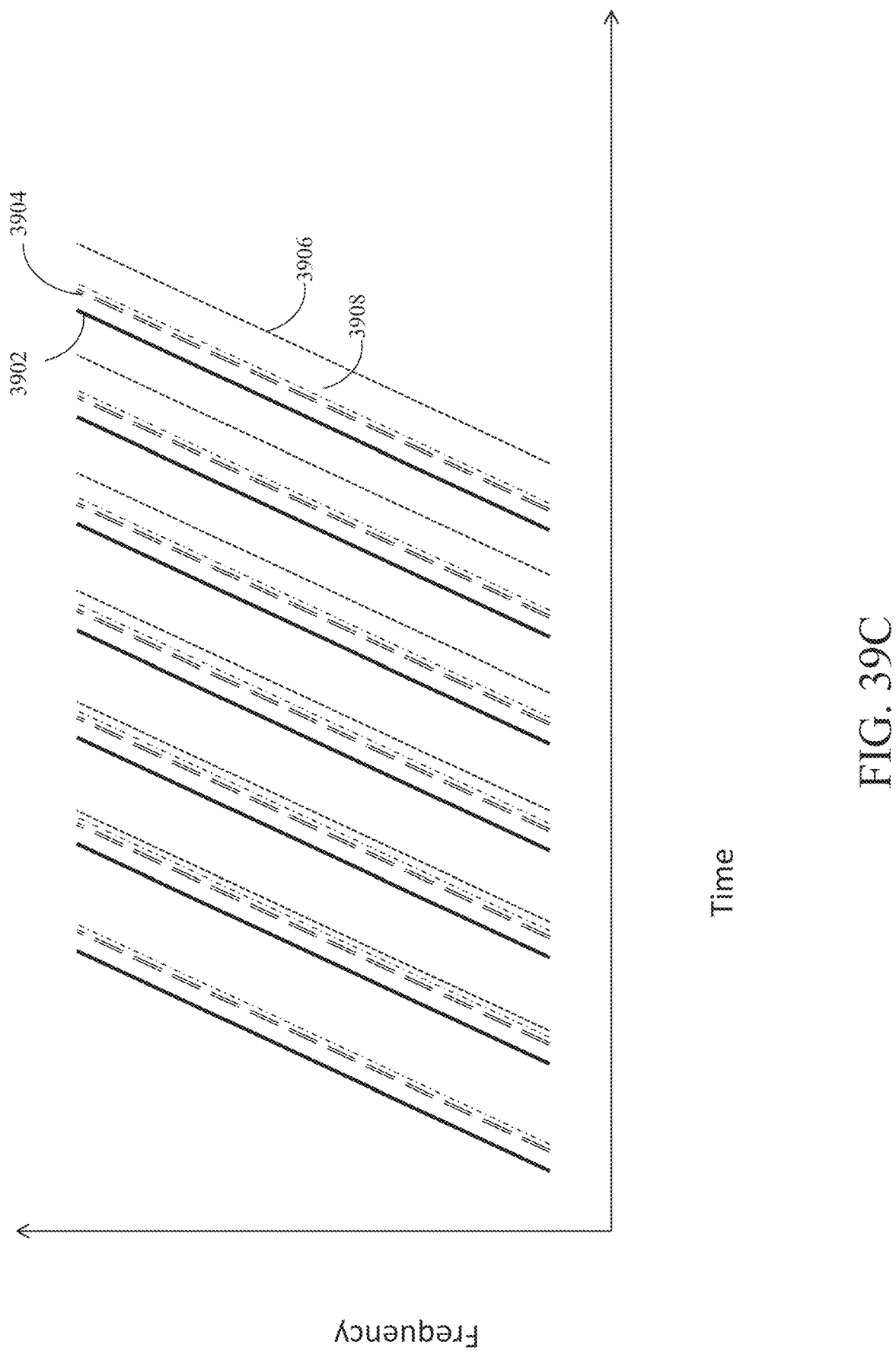

FIG. 39C is another diagram showing radar signals in accordance with an embodiment of the present disclosure.

Figure 40:
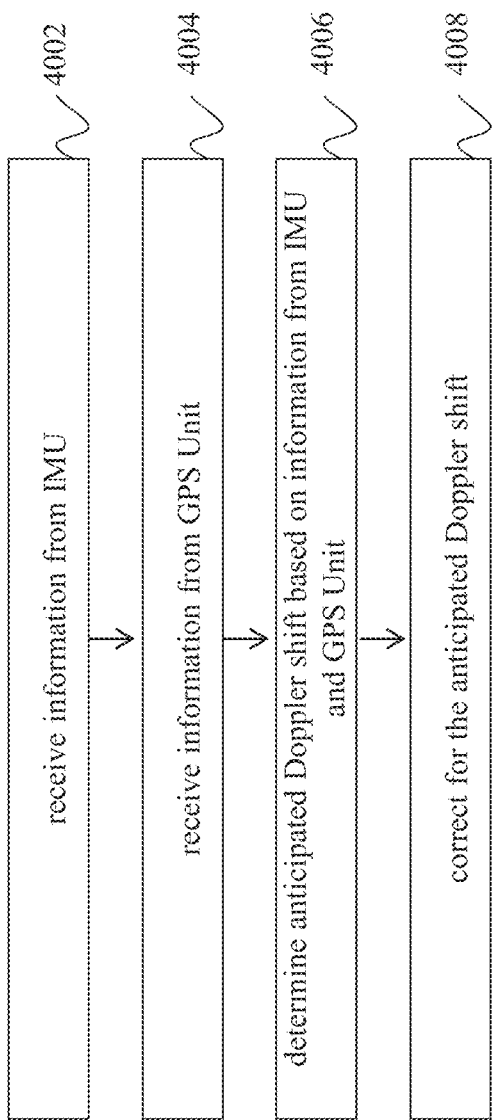

FIG. 40 is a flowchart of an exemplary method for signal correction in accordance with an embodiment of the present disclosure.

DETAILED DESCRIPTION

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that the exemplary embodiments can also be employed in other applications. Further, the terms "a", "an", "first", "second" and "third" etc. used herein do not denote limitations of quantity, but rather denote the presence of one or more of the referenced items(s).

1. EMVS Apparatus and Methods

Figure 1:
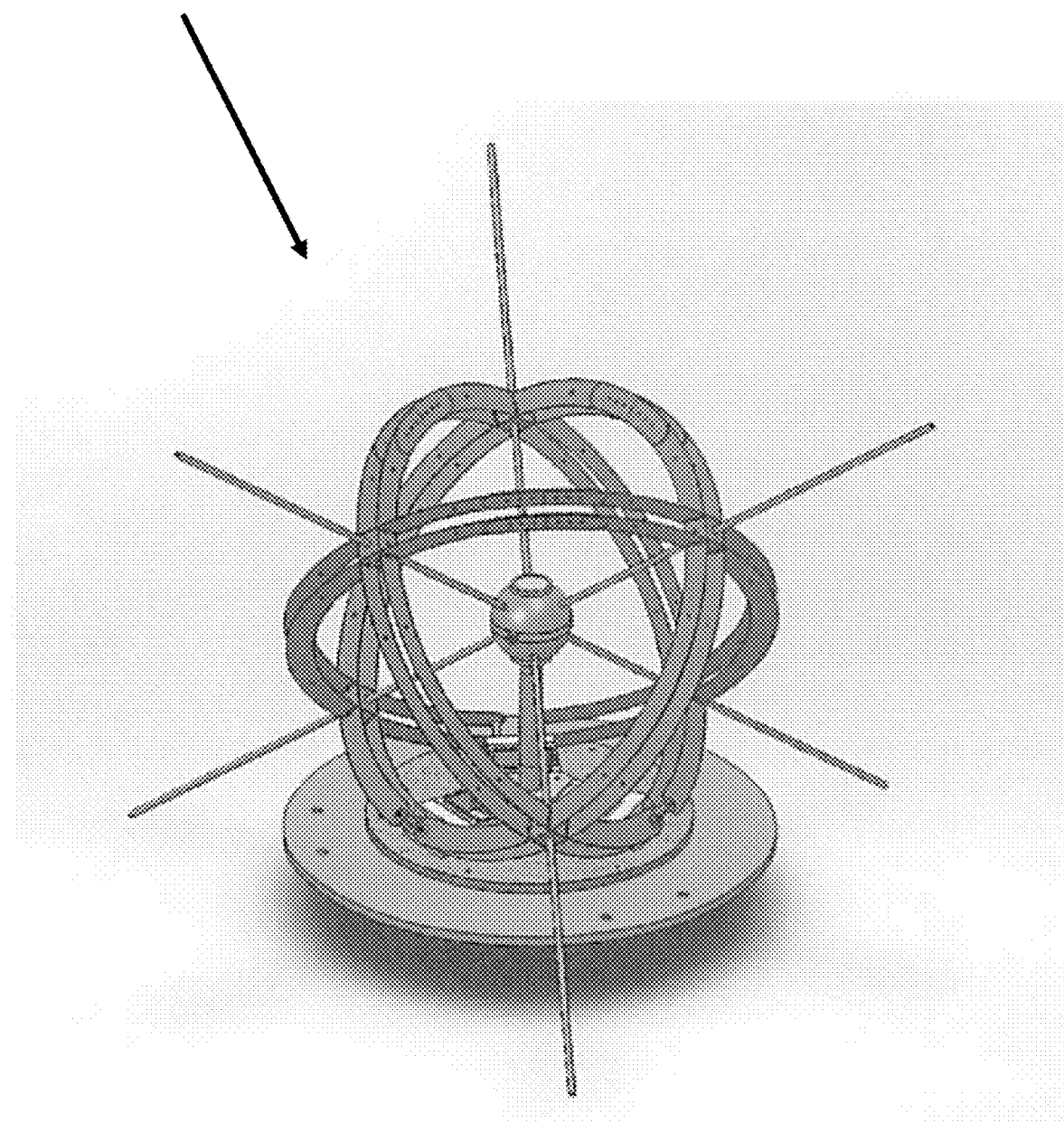
FIG. 1 illustrates an overall isometric view of a fully assembled electromagnetic vector sensor 100.
Figure 2:
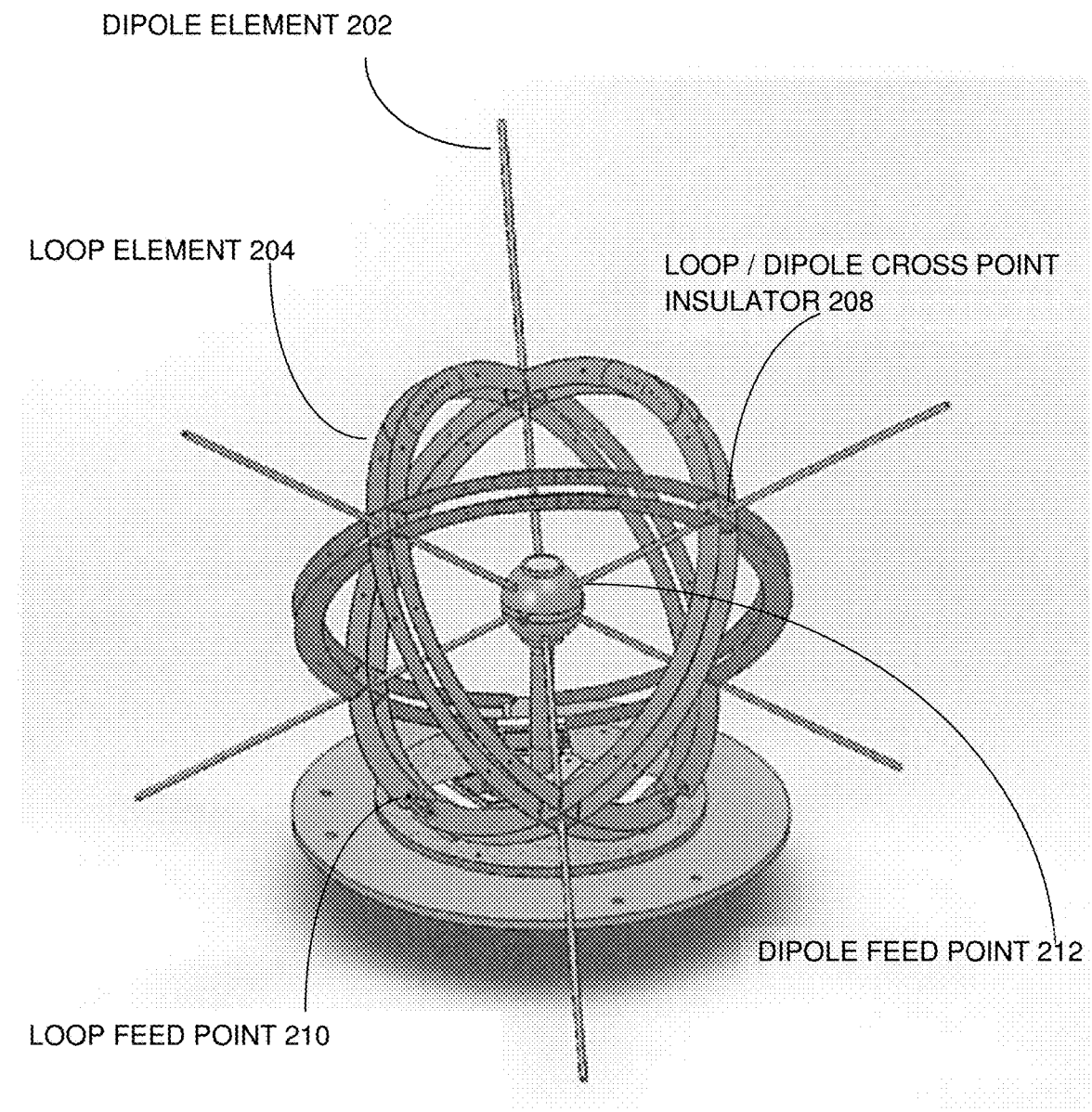
FIG. 2 illustrates a completed electromagnetic vector sensor 100 assembly showing spatially and orthogonally integrated dipole antenna and loop antenna elements.
Figure 3:
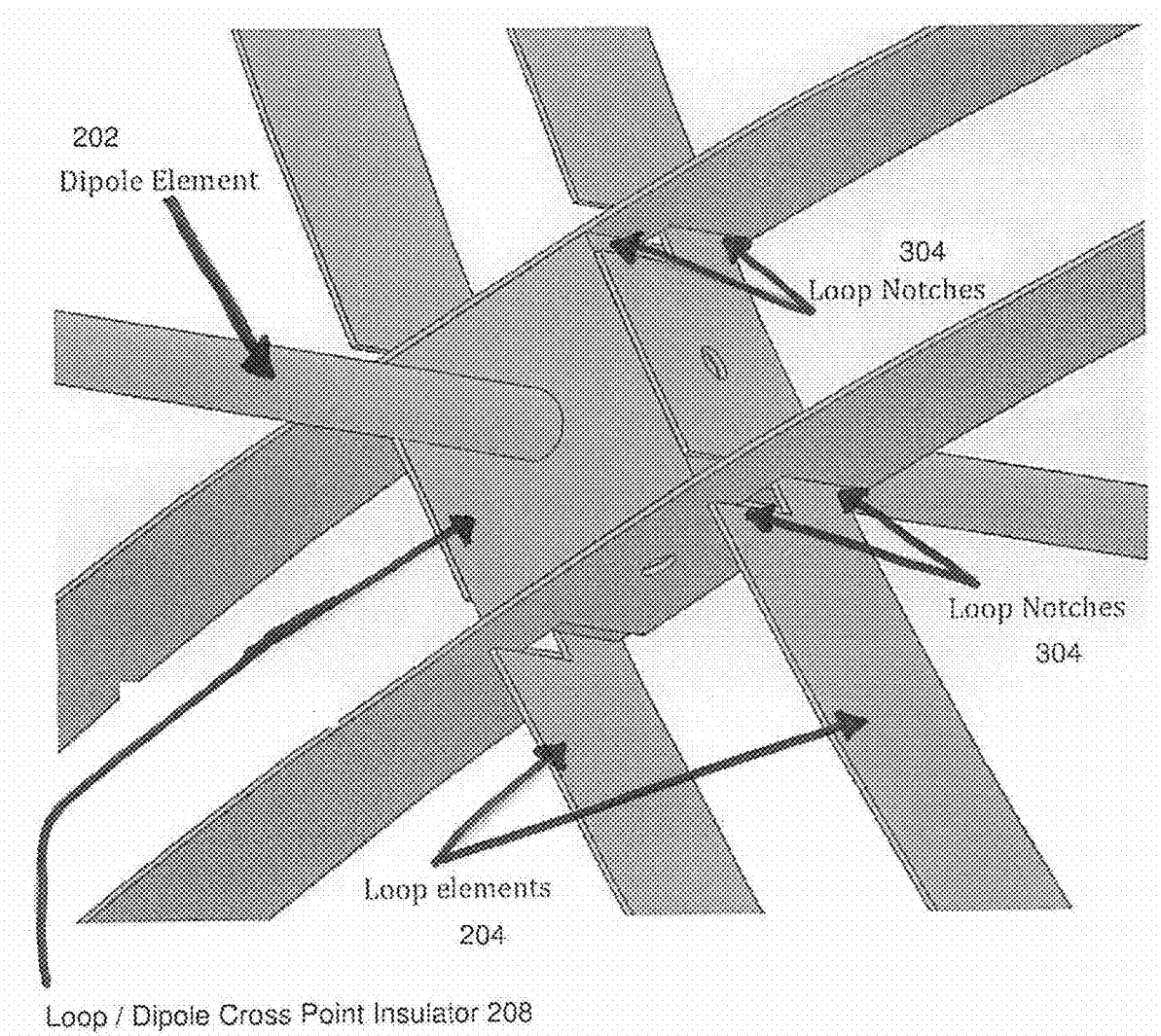
FIG. 3 illustrates a close view of a crossover region of the dipole antenna and loop antenna elements and the mechanical configuration which isolates the dipole and loop antenna elements from each other (i.e., Loop/Dipole Cross Point Insulator 208), having a dielectric block as the Loop/Dipole Cross Point Insulator 208 and loop notches 304 shown in the loop antenna blades.
Figure 4:
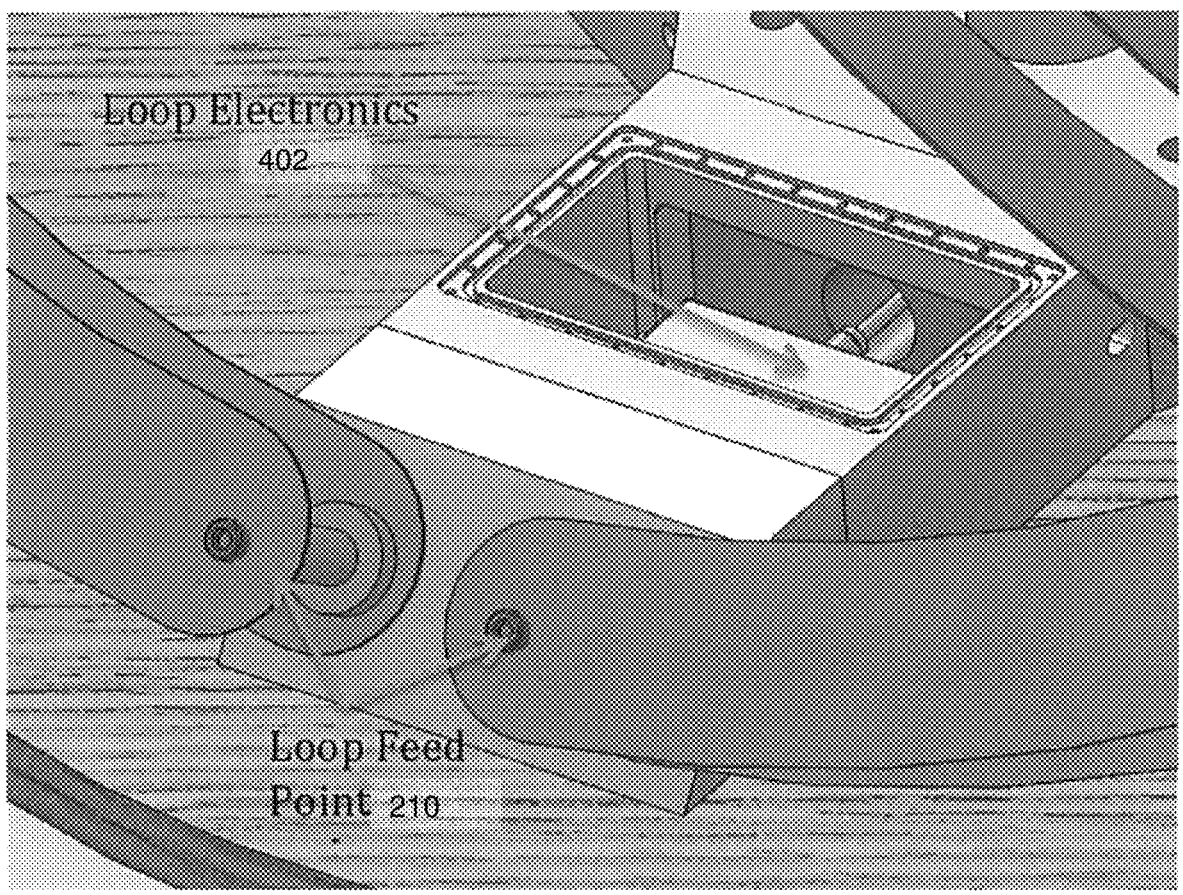
FIG. 4 illustrates loop antenna element feed points connected to a coupling section between the loop antenna elements and a loop electronics section, where the loop electronics section houses the loop antenna electronics; these elements are all contained in a portion of a base plate (platform).
Figure 5:
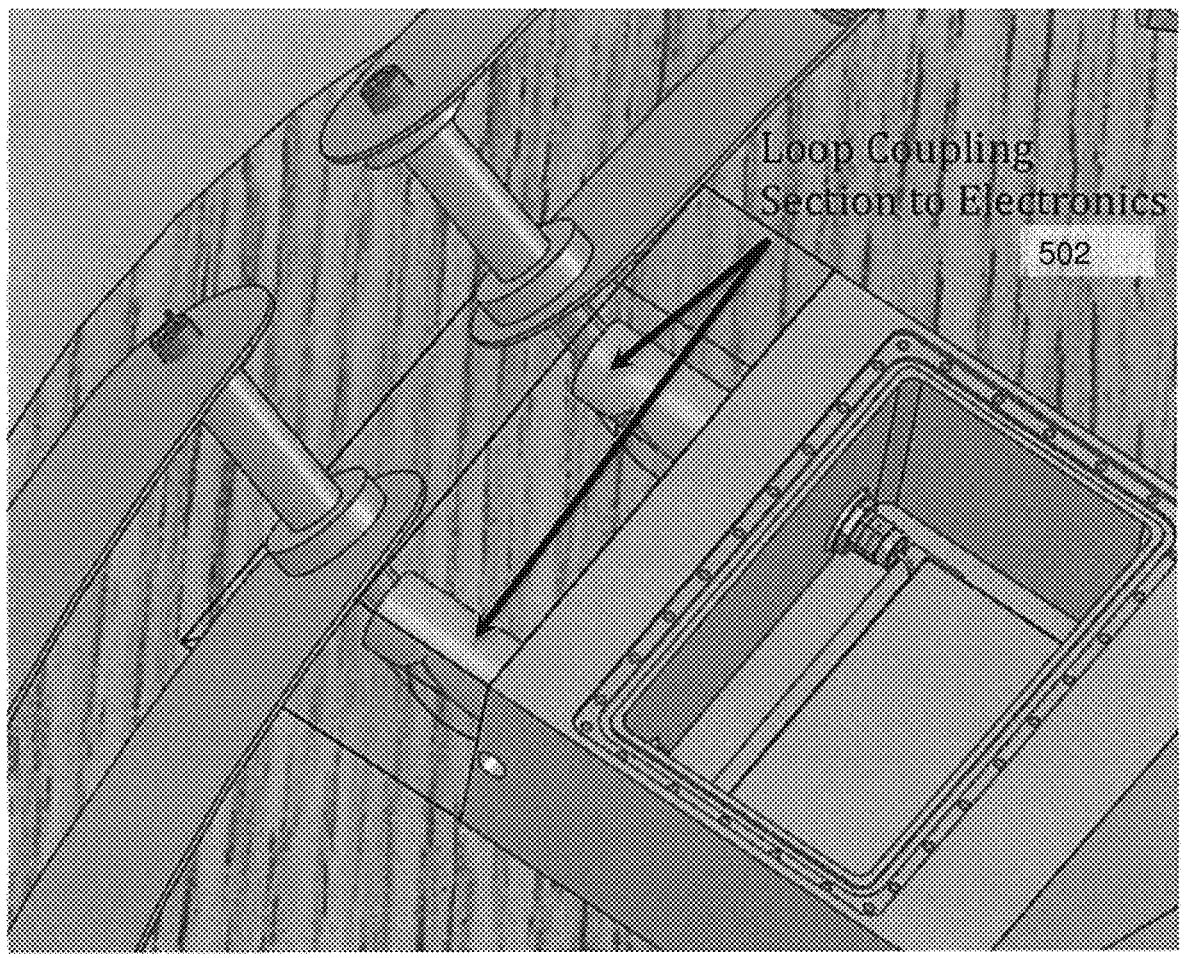
FIG. 5 illustrates two coupling sections 502 which provide RF signals to the loop antenna circuitry mounted in the loop electronics 402 section, which contains electronics circuitry (i.e., such as active balun circuits 804) for the loop antenna elements (i.e., loop elements 204); these elements are also housed in portions of the base plate 702 platform.
Figure 6:
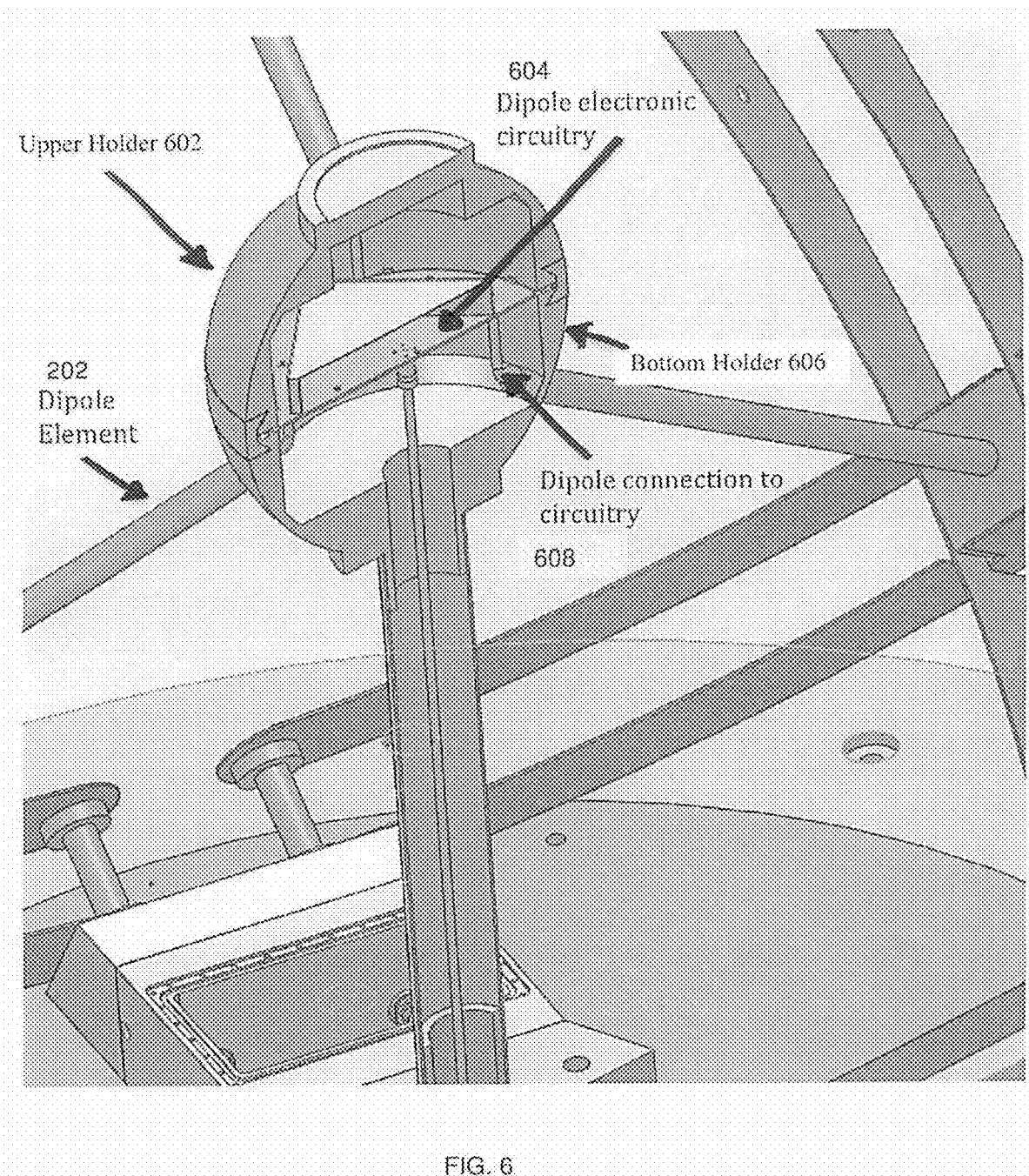
FIG. 6 illustrates a dipole electronics assembly, which consists of an upper holder 602 and a bottom holder 606; and dipole electronic circuitry 604 is housed in the dipole electronics assembly.
Figure 7:
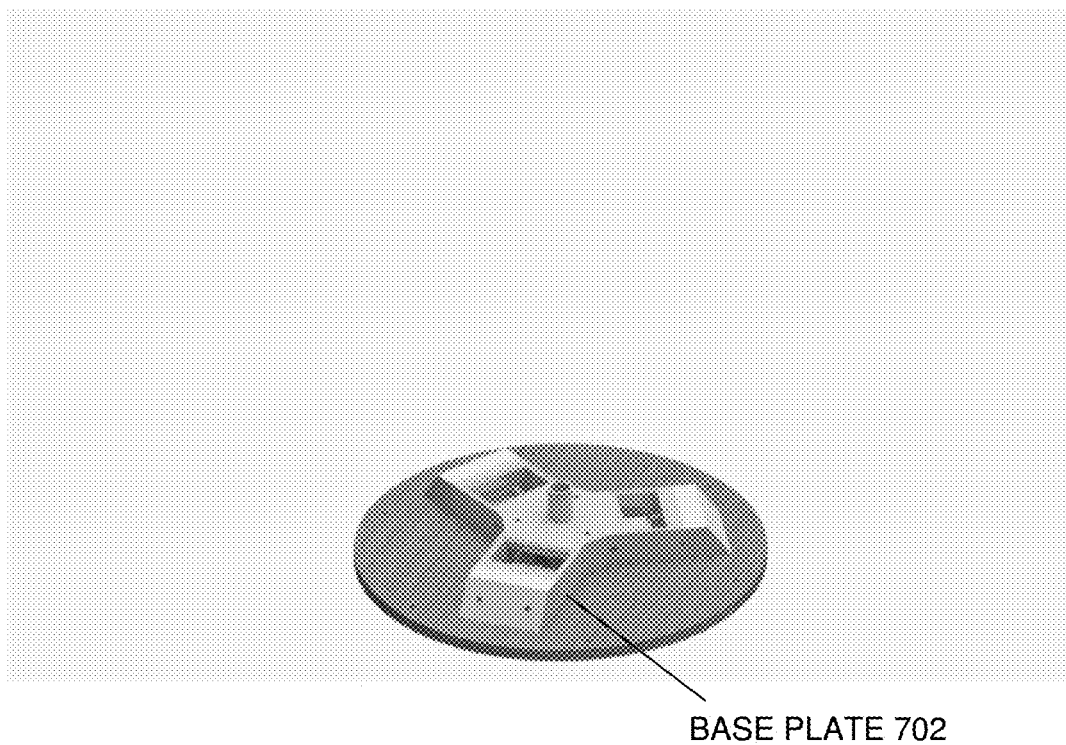
FIG. 7 illustrates a base plate 702 (platform) of the electromagnetic vector sensor 100 apparatus. The base plate 702 serves as a mounting platform in which the loop antenna element(s) 204 are configured. Also, the base plate 702 serves as the platform upon which the electromagnetic vector sensor 100 assembly is mounted.

Referring to FIG. 1, FIG. 2, and FIG. 3, it can be seen that FIG. 1 illustrates an isometric view of an overall view of a completed electromagnetic vector sensor 100 assembly, FIG. 2 illustrates the completed electromagnetic vector sensor 100 assembly showing dipole antenna and loop antenna elements, including dipole elements 202, loop elements 204, loop/dipole cross point insulator(s) 208, loop feed point(s) 210, and dipole feed point(s) 212. FIG. 3 illustrates a close view of a crossover region of the dipole antenna and loop antenna elements and the mechanical configuration which provides orthogonal integration of the dipole elements 202 and the loop elements 204, and which isolates the dipole and loop antenna elements from each other (i.e., Loop/Dipole Cross Point Insulator 208, which includes a dielectric block as the Loop/Dipole Cross Point Insulator 208. Maintaining orthogonal integration of the antenna elements and maintaining isolation of the antenna elements are essential aspects of the exemplary embodiments.

Again referring to FIG. 3, the Loop/Dipole Cross Point Insulator 208 illustrated in FIG. 3 consists of a square piece of dielectric material which is used to support the dipole element(s) 202 and loop element(s) 204 sections. This piece of dielectric material (i.e., the dielectric material used as the Loop/Dipole Cross Point Insulator 208), which is used to support the dipole element(s) 202 and the lop element(s) 204, comprises the main focus of the instant invention. Loop antenna elements i.e., loop element(s) 204 consist of double and/or twin blade like circular sections of 50 mil thick aluminum. The blade portions are 2 inches in width. As illustrated in FIG. 3, the loop element(s) 204 are designed such that a pair of the blades forming loop element(s) 204 can be collocated side-by-side, such that the blades are isolated from each other. The distance between the loop blades is 0.95 inches apart. The Loop/Dipole Cross Point insulator 208 provides the isolation, decoupling and mechanical support between the loop blades, as well as provides the structural layout and symmetry of the device. To maintain the decoupling of the double loop element(s) 204 from each other, a series of notches are cut into the loop elements, such that when the loops are integrated together the loops are not in electrical contact, while having sufficient mechanical support between the loop element(s) 204 and the dipole element(s) 202. Also, the Loop/Dipole Cross Point Insulator 208 provides the orthognallity between the loop element(s) 204 and the dipole element(s) 202, where the dipole element(s) 202 are inserted through the center of the dielectric material of the Loop/Dipole Cross Point Insulator 208 (see FIG. 3). Thus, the main advantages of this design, includes the ability to decouple both the dipole element(s) 202 from the loop element(s) 204 by using flat loop element(s) 204 in which small cut-outs and/or notches are used, such that when all of the loops are integrated together, the loops are not electrically touching each other or touching the dipoles; these design techniques provide the ability to maintain symmetry around the dipole element and maintain decoupling between the dipole element(s) 202 and the loop element(s) 204.

Referring to FIG. 2, FIG. 11, FIG. 12 and FIG. 18, integration of the dipole element(s) 202 with the loop element(s) 204 having dual loop design (also known as "loop pair") provides increased operational bandwidth (BW), because orthogonality of the antenna elements is achieved and maintained; then stable isolation between both the dipole element(s) 202 and loop element(s) 204 is maintained. Other advantages of exemplary embodiments disclosed herein include: (1) a smaller footprint than conventional array antenna sensors, (2) the ability to provide azimuth and elevation as well as polarization estimates, and (3) decoupling of antenna array elements, associated with dipole element(s) 202 and loop element(s) 204 integration. In addition, multiple loop element(s) 204 can be not only integrated with dipole element(s) 202, but can also be integrated with a plurality of loop element(s) 204 (see FIG. 11, FIG. 12 and FIG. 18).

Referring to FIG. 1, FIG. 2, FIG. 8, FIG. 10, FIG. 18, and FIG. 19, in exemplary embodiments, a three element, six axis electromagnetic vector sensor 100 array assembly has operational characteristics which include an operational frequency range from about 3 MHz up to about 15 MHz, but ideally from about 3 MHz up to about 10 MHz with an optimum NF (noise figure) at 7 MHz and estimates direction of arrival and polarization for unknown signals. And, where, each loop element(s) 204 having dual loop design (also known as "loop pair") is positioned with a tilt angle of each loop pair is about 54.74 degrees from the base of the loop holder 802 assembly.

Referring to FIG. 9, FIG. 31A, FIG. 31B, FIG. 31C, FIG. 31D and FIG. 34, active matching networks include low impedance matching networks, as well as high impedance matching networks and utilize high third-order intercept point (IP3) or (TOI) characteristics which provide a measure for nonlinear systems and devices and such IP3 characteristics concomitantly reduce the effects of interfering signals. The active circuitry 840 includes active loop balun circuit(s) 841, active loop matching networks 842 (low impedance—see FIG. 31A and FIG. 31B) or active dipole networks 843 (high impedance—see FIG. 31C and FIG. 31D). The system utilizes an algorithm unit 1230 having algorithms A1, A2, A3 . . . An, where A1 determines angle of arrival, A2 estimates direction of arrival of unknown signals, A3 determines polarization and computer program code (for process and/or method 2000 (see FIG. 34)) executed on computer processor(s) 1206, having memory 1208 residing in the computer processor (s) 1206, where the algorithms and code are required to discriminate polarization states of an incoming wavefront, provide increased accuracy in determining the direction of arrival of unknown signals, facilitate data collection of known transmitted high frequency skywave signals for achieving high frequency geolocation signal processing process and/or method 2000, to determining angle of arrival, and resolve incoming wave vectors (in elevation and azimuth directions) and polarization by measuring three complete components of the electric field and three components of the magnetic field of incoming signals, at a single point, by minimizing interactions between dipole and loop elements.

Referring to FIG. 34, further the external equipment consists of a display 1202 having a user interface 1204, memory 1208 having a dynamic repository 1210 having data repositories R90 through R94 up to Rn, where R90 can contain known skywave data 1211, R91 can contain electric field components data 1212, R92 can contain magnetic field components data 1214, R93 can contain unknown signal data 1216, R94 can contain elevation data 1218 and up to Rn, which can contain azimuth data 1220, all callable and executable by program code instructions (such as instructions from a method 2000 of geolocation processing code, which can reside in program unit 1240. Also, the external system may contain network interface 1270 modules, memory controller 1260 modules, I/O controller 1250 modules output devices 1254, input devices 1252, and can be connected in a network 1272 environment.

The completed electromagnetic vector sensor 100 can include at least three active loop matching networks 842 and at least three active dipole matching networks 843. For Active Network Calibration, each of the 3 dipole antenna (i.e., dipole element(s) 202, the bottom dipole end of each dipole element(s) 202 is physically positioned toward the center calibration whip using a counterclockwise 30 degree offset rotation, and frequency sweeps performed between 3 MHz to 15 MHz. The E-field dipole antenna, i.e., dipole element(s) 202 are then realigned to true north. Final antenna calibration is facilitated using a high fidelity model (based on method of moments) to determine antenna patterns for field site configuration. The high fidelity model includes active load matching and associated cables, for measurements collected. Because of active network variations/drift, each set of loop element(s) 204 and dipole element(s) requires both phase and amplitude alignment (i.e., matching calibration) to adjust for cable phase/amplitude variations and system receiver phase variations.

Referring to FIG. 32, regarding In-Situ Calibration processing, radar data waveform patterns are used to select a known 18×1 directional signal; then directional weighting using array manifold parameters of known directional transmit (tx) location, where $$W = Z_c/\alpha_0 \quad (1)$$

where $W$ represents directional weighting;
where $Z_c$ represents a known 18×1 directional signal; and
where $\alpha_0$ represents an array manifold for a given theta ($\theta$).

An 18×1 directional signal of interest is identified, as designated by $Z_i$; then an array response for the signal of interest is normalized by calculated weights, where $$Z'_i = Z_i/W \quad (2)$$

where $Z_i$ represents an 18×1 directional signal of interest;
where $W$ represents directional weighting; and
where $Z'_i$ represents a normalized array response for the signal of interest by calculated weights.

Assuming a right circular (RC) polarization array manifold ($\alpha_{rc}$) and a left circular (LC) polarization array manifold ($\alpha_{lc}$) estimation of the electromagnetic vector sensor Beamform, a refined Joint azimuth, elevation estimate is obtained.

Referring to FIG. 33 (also see FIG. 24), quick look mode processing requires acquiring and inputting a plurality of signal raw data for baseband processing. After range and Doppler processing in-situ known local waveform patterns are used to obtain calibration factors that are applied to Select Training O-mode and/or X-mode (O/X) transmissions. Whereby, estimates of azimuth and elevation are obtained.

Referring to FIG. 24, FIG. 25, and FIG. 33, Beamforming with a single electromagnetic vector signals is accomplished by defining a received signal y(t) as composed of signal and noise:

$$y(t) = a(\Theta)s(t) + e(t) \quad (3),$$

where s(t) is the complex signal envelope and a($\Theta$) is the array manifold defined for:

$$\Theta = [\phi, \psi, \alpha, \beta]^T \quad (4),$$

for a non-rotated x, y, z-axis, and $$a(\Theta) = B(\phi, \theta)Q(\beta)h(\alpha) \quad (5),$$

where B($\phi, \psi$) is the steering matrix for azimuth $\phi \in [-\pi, \pi]$ and
elevation $\theta \in [-\pi/2, \pi/2]$, and $$B(\phi, \psi) = \begin{pmatrix} v(\phi, \theta) & \tilde{v}(\phi, \theta) \\ \tilde{v}(\phi, \theta) & -v(\phi, \theta) \end{pmatrix} \quad (6)$$

$$(v(\phi, \theta) \; \tilde{v}(\phi, \theta)) = \begin{pmatrix} -\cos\phi\cos\theta & -\sin\phi \\ -\sin\phi\cos\theta & \cos\phi \\ \sin\theta & 0 \end{pmatrix} \quad (7)$$

with rotation matrix Q($\beta$), and h($\beta$) representing the unit-norm vector for ellipticity of polarization $$Q(\beta) = \begin{pmatrix} \cos\beta & -\sin\beta \\ \sin\beta & \cos\beta \end{pmatrix} \quad (8)$$

$$h(\alpha) = \begin{pmatrix} \cos\alpha \\ j\sin\alpha \end{pmatrix} \quad (9)$$

where $Q(\beta) \in [0,\pi]$ is the polarization orientation angle and $$\alpha \in \left[-\frac{\pi}{4}, \frac{\pi}{4}\right]$$

is the polarization ellipticity angle (see A. Nehorai, K. S. Ho, and T. T. G. Tan, "Minimum-Noise-Variance Beamformer with an Electromagnetic Vector Sensor," IEEE Trans. Signal Processing, vol. 47, pp. 601-618 Mar. 1999).

Again referring to FIG. 25 and concerning a 2D EMVS Array Manifold Vector, an EMVS positioning and/or placement can be setup in spatial 2D triangular formation with spatial positions defined by Xk, where k is defined as:

$$K = v \times \hat{v} = \begin{pmatrix} -\cos\phi\sin\Theta \\ -\sin\phi\sin\Theta \\ -\cos\Theta \end{pmatrix} \quad (10)$$

For 3 element 2D array, X is a 3×3 matrix representing the relative sensor positions and/or placement (see FIG. 25).

Conventional spatial beamforming weights are then obtained as:

$$w = v \otimes a \quad (11)$$

for $$v = e^{j\frac{2\pi}{\lambda} Xk}. \quad (12)$$

For a Single EMVS Manifold Vector, the constructed EMVS is defined with a rotation relative to the normal x, y, z-axis. Referring to FIG. 26C, the rotation about the z-axis is defined for angle $\theta_z$ as:

$$R_z(\theta_z) = \begin{pmatrix} \cos\theta_z & -\sin\theta_z & 0 \\ \sin\theta_z & \cos\theta_z & 0 \\ 0 & 0 & 1 \end{pmatrix} \quad (13)$$

Referring to FIG. 26D and FIG. 26E, the rotation about the y-axis is defined for angle $\theta_y$ as:

$$R_y(\theta_y) = \begin{pmatrix} \cos\theta_y & 0 & -\sin\theta_y \\ 0 & 1 & 0 \\ \sin\theta_y & 0 & \cos\theta_y \end{pmatrix} \quad (14)$$

The 6×6 rotation matrix for the E1, E2, E3 dipole and H1, H2, H3 loop sensors is:

$$R(\theta_y,\theta_z) = I \otimes (R_z(\theta z)R_y(\theta_y)) \quad (15)$$

The 6×1 array manifold vector is:

$$a(\theta_y,\theta_z,\phi,\theta,\beta,\alpha) = R(\theta_y,\theta_z)B(\phi,\theta)Q(\beta)h(\alpha) \quad (16).$$

2. EMVS with GPS Unit, Dipole Electronics, and IMU Unit

Embodiments of the present disclosure discussed above include EMVS systems and methods for the design of a 6-axis co-located active antenna capable of collecting 3 E-fields and 3 H-fields simultaneously at a single point, allowing for signal processing to identify an angle of arrival and polarization of incident HF electromagnetic signals.

Systems and methods according to embodiments of the present disclosure include additional components and features added to the vector sensor design discussed above. For example, in embodiments discussed above, active circuitry is utilized to amplify the signals received at the dipole and loops. To handle antenna motion and positioning, an inertial measurement unit (IMU) and Global Positioning Satellite (GPS) unit can be added to the central housing of the HF EMVS design in accordance with embodiments of the present disclosure.

FIG. 35A is a diagram of an EMVS system in accordance with an embodiment of the present disclosure. As shown in FIG. 35A, the EMVS system of FIG. 35A has a central housing 3502 (i.e., a central housing unit). FIG. 35B is a diagram showing an interior of central housing 3502 in accordance with an embodiment of the present disclosure. As will be discussed below, an IMU, GPS Unit, and dipole electronics can be added to the interior of central housing 3502 in accordance with embodiments of the present disclosure.

FIG. 36A is a diagram showing a close-up view of central housing 3502 in accordance with an embodiment of the present disclosure. FIG. 36B is a diagram showing a close-up view of the interior of central housing 3502 in accordance with an embodiment of the present disclosure. As shown by FIG. 36B, the interior of central housing 3502 includes a GPS Unit 3602, dipole active circuitry 3604 (i.e., dipole electronics), and an IMU 3606. FIG. 37A is a diagram showing a close-up view of central housing 3502 in accordance with an embodiment of the present disclosure, wherein central housing 3502 is displayed as transparent to better show interior components. FIG. 37B is a diagram showing a close-up view of the interior of central housing 3502 in accordance with an embodiment of the present disclosure, wherein central housing 3502 is displayed as transparent to better show interior components.

Embodiments of the present disclosure include systems and methods for improving signal processing target extraction using GPS Unit 3602 and IMU 3606. FIG. 38A is a flowchart of exemplary signal processing chains in accordance with an embodiment of the present disclosure. FIG. 38A shows a signal processing chain for signal processing target extraction 3802 and a signal processing chain for target tracking 3804. As shown in FIG. 38A, for the signal processing target extraction chain 3802, EMVS 6-Element IQ Data 3806 is used for range processing 3808. Afterwards, Doppler processing 3810, spatial 3D beamforming 3812, and polarization processing 3814 are performed. In target tracking chain 3804, constant false alarm rate (CFAR) detection 3816 is performed, followed by line tracking 3818, and association and track estimation 3820.

FIG. 38B is a flowchart of signal processing chains showing how GPS Unit 3602 and IMU 3606 can be used to enhance the functionality of the EMVS system in accordance with an embodiment of the present disclosure. As shown in FIG. 38B, data 3822 from GPS Unit 3602 and IMU 3606 enables the EMVS system to compensate for any potential antenna motion.

For example, in an embodiment, IMU 3606 provides roll, pitch, and yaw of the antenna, while GPS Unit 3602 provides reference positioning. This allows for processing to correct for inter-chirp phase correction for motion as well as bulk 3D steering corrections. For example, this processing can be performed by a controller (e.g., a controller device). For example, in an embodiment, the controller can be implemented as part of the EMVS system (e.g., as part of dipole active circuitry 3604). In an embodiment, the controller can be external to the EMVS system (e.g., the controller can receive information from IMU 3606 and GPS Unit 3602, can process the information, and can send a signal to the EMVS system to correct for inter-chirp phase correction for motion as well as bulk 3D steering corrections. The controller can be implemented in hardware, software, and/or a combination of hardware or software. Further, in an embodiment, IMU 3606 and GPS Unit 3602 can be implemented using hardware, software, and/or a combination of hardware and software.

In an embodiment, IMU 3606 is housed in the dipole holder assembly of the EMVS and consists of 3 axis gyroscope, 3 axis accelerometers, and 3 axis magnetometers. In an embodiment, the accelerometers are utilized to detect changes in rotational attributes like roll, pitch, and yaw of the EMVS and are therefore intentionally placed at the collocated center of the 6 elements. In an embodiment, IMU 3606 utilizes gyroscopes to maintain an absolute angular reference and magnetometers to assist in calibration against orientation drift. In an embodiment, an active GPS L1 band antenna is also incorporated into the dipole holder assembly to obtain satellite positioning and timing for data collected by the EMVS.

FIG. 39A is a diagram showing exemplary radar transmit signals 3902 (solid) and return signals 3904 (dashed) in accordance with an embodiment of the present disclosure. In FIG. 39A, the returned signal 3904 corresponds to a constant delayed in time from the transmitted pulse. FIG. 39B is another diagram showing radar signals in accordance with an embodiment of the present disclosure. FIG. 39B shows the signals in FIG. 39A and further includes a dotted line corresponding to an exaggerated delay 3906 on a per pulse basis from the transmitted signal 3902. In addition to the range off-set 3904, the exaggerated delay 3906 represents a Doppler off-set.

FIG. 39C is another diagram showing radar signals in accordance with an embodiment of the present disclosure. FIG. 39C shows the signals in FIG. 39B and further includes an additional dotted line 3908 representing motion correction in accordance with embodiments of the present disclosure. Embodiments of the present disclosure (e.g., for a maritime non-stationary environment) anticipate antenna motion to affect the returned signal and thereby expect a Doppler shift that matches position measurements obtained via IMU 3606. Utilizing data 3822 from GPS unit 3602 and IMU 3606, embodiments of the present disclosure can correct 3908 for the motion by shaping the chirp, thereby removing the antenna motion and reconstructing the actual observed target Doppler shift and range.

FIG. 40 is a flowchart of an exemplary method for signal correction in accordance with an embodiment of the present disclosure. In step 4002, information is received from IMU 3606. For example, in an embodiment, the controller receives roll, pitch, and yaw information for the antenna from IMU 3606. In step 4004, information is received from GPS Unit 3602. For example, in an embodiment, the controller receives reference positioning information from GPS Unit 3602.

In step 4006, the anticipated Doppler shift is determined based on the information from IMU 3606 and GPS Unit 3602. For example, based on information from IMU 3606 and GPS Unit 3602, the controller can anticipate antenna motion to affect the returned signal and thereby expect a Doppler shift that matches position measurements obtained via IMU 3606. In step 4008, the anticipated Doppler shift is corrected. For example, in an embodiment, utilizing data 3822 from GPS Unit 3602 and IMU 3606, the controller can correct 3908 for the motion by shaping the chirp, thereby removing the antenna motion and reconstructing the actual observed target Doppler shift and range. In an embodiment, the controller can also initiate bulk 3D steering corrections.

3. Conclusion

While the exemplary embodiments have been particularly shown and described with reference to preferred embodiments thereof, it will be understood, by those skilled in the art that the preferred embodiments have been presented by way of example only, and not limitation; furthermore, various changes in form and details can be made therein without departing from the spirit and scope of the invention. Thus, the breadth and scope of the present exemplary embodiments should not be limited by any of the above described preferred exemplary embodiments, but should be defined only in accordance with the following claim and/or claims and their equivalents. Any and/or all references cited herein are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. The foregoing description of the specific embodiments will so fully reveal the general nature of the invention that others can, by applying knowledge within the art, readily modify and/or adapt for various applications such specific embodiments, without undue experimentation, without departing from the general concept of the exemplary embodiments. Therefore, such adaptations and modifications are intended to be within the meaning and range of equivalents of the disclosed embodiments, based on the teaching and guidance presented herein.

What is claimed is:

1. An electromagnetic vector sensor (EMVS) system, comprising:
   a global positioning satellite (GPS) unit;
   an inertial measurement unit (IMU) comprising:
     a 3-axis accelerometer configured to determine positioning of 3 components of an electric field, and
     a 3-axis magnetometer configured to determine positioning of 3 components of a magnetic field; and
   a controller in communication with the GPS and the IMU, wherein the controller is configured to:
     receive position information from the 3-axis accelerometer and the 3-axis magnetometer,
     receive GPS information from the GPS unit,
     determine a Doppler shift based on the positioning of the 3 components of the electric field and the GPS information from the GPS unit, determine a polarization change based on the positioning of the 3 components of the magnetic field, and
initiate a correction for the Doppler shift and the polarization change.

2. The EMVS system of claim 1, wherein the controller is configured to receive roll, pitch, and yaw information from the IMU.

3. The EMVS system of claim 1, wherein the controller is configured to receive reference positioning information from the GPS unit.

4. The EMVS system of claim 1, wherein the controller is further configured to:
determine an anticipated antenna motion based on the information from the GPS unit and the information from the IMU.

5. The EMVS system of claim 1, wherein the controller is further configured to:
shape a chirp of the EMVS system to initiate the correction for the anticipated Doppler shift.

6. The EMVS system of claim 1, wherein the controller is further configured to:
initiate a steering correction based on the determined Doppler shift.

7. The EMVS system of claim 1, wherein the EMVS system further comprises:
a central housing, wherein the central housing houses the GPS unit, the IMU, and the controller.

8. The EMVS system of claim 7, wherein the central housing further houses dipole active circuitry.

9. The EMVS system of claim 8, wherein the dipole active circuitry includes the controller.

10. The EMVS system of claim 1, wherein the EMVS system further comprises:
a group of loop radio frequency (RF) connections, mechanically and electrically attached in a spoke formation, wherein the group of loop RF connections comprises a loop RF connection and a loop holder.

11. The EMVS system of claim 1, wherein the EMVS system further comprises:
a central housing, wherein the central housing houses the GPS unit, the IMU, and the controller.

12. A method, comprising:
receiving, using a controller device, positioning of 3 components of an electric field from a 3-axis accelerometer of an inertial measurement unit (IMU);
receiving, using the controller device, positioning of 3 components of a magnetic field from a 3-axis magnetometer of the IMU;
receiving, using the controller device, global positioning satellite (GPS) information from a GPS unit;
determining, using the controller device, a Doppler shift based on the positioning of the 3 components of the electric field from the 3-axis accelerometer and and the GPS information from the GPS unit;
determining, using the controller device, a polarization change based on the positioning of the 3 components of the magnetic field from the 3-axis magnetometer;
initiating, using the controller device, a correction for the Doppler shift and the polarization change.

13. The method of claim 12, wherein the controller receives roll, pitch, and yaw information from the IMU.

14. The method of claim 12, wherein the controller receives reference positioning information from the GPS unit.

15. The method of claim 12, further comprising:
determining an anticipated antenna motion based on the information from the GPS unit and the information from the IMU.

16. The method of claim 12, further comprising:
shaping a chirp of an electromagnetic vector sensor (EMVS) system to initiate the correction for the anticipated Doppler shift.

17. The method of claim 12, further comprising:
initiating a steering correction based on the determined Doppler shift.

18. An electromagnetic vector sensor (EMVS) device, comprising:
a central housing unit, comprising:
a global positioning satellite (GPS) unit,
an inertial measurement unit (IMU), comprising:
a 3-axis accelerometer configured to determine positioning of 3 components of an electric field, and
a 3-axis magnetometer configured to determine positioning of 3 components of a magnetic field, and
a controller in communication with the GPS and the IMU, wherein the controller is configured to:
receive position information from the 3-axis accelerometer and the 3-axis magnetometer,
receive GPS information from the GPS unit,
determine a Doppler shift based on the positioning of the 3 components of the electric field and the GPS information from the GPS unit,
determine a polarization change based on the positioning of the 3 components of the magnetic field, and
initiate a correction for the Doppler shift and the polarization change; and
a group of loop radio frequency (RF) connections, mechanically and electrically attached in a spoke formation.

19. The EMVS device of claim 18, further comprising:
a dipole balun circuitry element residing between an upper and a lower dipole holder.

20. The EMVS device of claim 18, wherein the group of loop RF connections comprises a loop RF connection and a loop holder.

* * * * *